United States Patent
Kanbayashi et al.

(10) Patent No.: US 12,111,490 B2
(45) Date of Patent: Oct. 8, 2024

(54) ILLUMINATION DEVICE AND DISPLAY DEVICE

(71) Applicant: Sharp Display Technology Corporation, Kameyama (JP)

(72) Inventors: Yuuichi Kanbayashi, Kameyama (JP); Shugo Yagi, Kameyama (JP); Junichi Masuda, Kameyama (JP); Satoshi Tsubooka, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/213,518

(22) Filed: Jun. 23, 2023

(65) Prior Publication Data

US 2023/0417978 A1 Dec. 28, 2023

(30) Foreign Application Priority Data

Jun. 27, 2022 (JP) ................................. 2022-102358

(51) Int. Cl.
*F21V 8/00* (2006.01)

(52) U.S. Cl.
CPC ........... *G02B 6/0053* (2013.01); *G02B 6/003* (2013.01); *G02B 6/0036* (2013.01)

(58) Field of Classification Search
CPC ..... G02B 6/0053; G02B 6/003; G02B 6/0036

USPC ......................................................... 362/606
See application file for complete search history.

(56) References Cited

U.S. PATENT DOCUMENTS

| | | | |
|---|---|---|---|
| 2006/0120111 | A1 | 6/2006 | Onishi |
| 2015/0168631 | A1* | 6/2015 | Umekawa ............ G02B 6/0073 362/613 |
| 2016/0357046 | A1* | 12/2016 | Choi ..................... G02F 1/1336 |
| 2018/0321553 | A1* | 11/2018 | Robinson .......... G02F 1/133528 |
| 2019/0179161 | A1* | 6/2019 | Shinohara .............. G03B 35/18 |

FOREIGN PATENT DOCUMENTS

JP 4169000 B2 10/2008

* cited by examiner

*Primary Examiner* — Elmito Breval
*Assistant Examiner* — Hana S Featherly
(74) *Attorney, Agent, or Firm* — ScienBiziP, P.C.

(57) ABSTRACT

An illumination device includes a plurality of light sources arranged in a row, a light guide plate having a plate shape and including a first end face at an outer peripheral end face of the light guide plate and a first main surface included in a pair of main surfaces of the light guide plate, the first end face facing the plurality of light sources and being configured to receive incident light, the first main surface being configured to emit light, and a plurality of first lenses disposed at the first main surface, arranged along a first direction, and extending along a second direction, the first direction being an arrangement direction of the plurality of light sources, the second direction intersecting the first direction and extending along the first main surface.

11 Claims, 30 Drawing Sheets

ILLUMINATION DEVICE AND DISPLAY DEVICE

CROSS-REFERENCE TO RELATED APPLICATIONS

This application claims the benefit of priority to Japanese Patent Application Number 2022-102358 filed on Jun. 27, 2022. The entire contents of the above-identified application are hereby incorporated by reference.

BACKGROUND

Technical Field

The techniques disclosed in the present specification relate to illumination devices and display devices.

As an example of an illumination device to be used in a liquid crystal display device and the like in the related art, an illumination device described in JP 4169000 B is known. The illumination device described in JP 4169000 B includes a light guide plate including a light exit surface from which light is emitted, a reflective surface, and a light incident end face on which light from light sources is incident. A predetermined pattern is formed on each surface of the light guide plate. As an example of the predetermined pattern, the reflective surface is formed having a diffusing pattern formed of a plurality of fine irregularities and the like, and incident light incident on the light guide plate is diffused in the arrangement direction of the light sources. The light exit surface is formed having a prismatic shape, such as a substantially concave inverted triangle. The light incident end face is formed having a corrugated pattern in which a concave semicircle and a convex semicircle are continuously arranged.

SUMMARY

According to the light guide plate included in the illumination device described in JP 4169000 B, the reflectivity of light inside the light guide plate can be increased by the pattern of the light exit surface, and incident light can be diffused in a direction parallel to the arrangement direction of the light sources by the patterns of the reflective surface and the light incident end face, thereby preventing brightness unevenness. However, for example, when the light sources cannot be disposed on an end side along the arrangement direction of the light sources, there is a concern that a sufficient amount of emission light cannot be obtained at or near an end portion of the light exit surface of the light guide plate along the arrangement direction of the light sources. In addition, for example, when high-brightness light sources are used, the light sources tend to be less likely to emit light at a wide angle, and thus there is a concern that a sufficient amount of emission light cannot be obtained at or near the end portion of the light exit surface of the light guide plate along the arrangement direction of the light sources. In such a case, even when the patterns of the light incident end face or the like are adjusted as described in JP 4169000 B, it is difficult to suppress the brightness unevenness in the emission light emitted from the light exit surface.

The technique described herein has been made based on the circumstances described above, and an object thereof is to suppress the occurrence of brightness unevenness.

(1) An illumination device according to a technique described in the present specification includes: a plurality of light sources arranged in a row; a light guide plate having a plate shape and including a first end face at an outer peripheral end face of the light guide plate and a first main surface included in a pair of main surfaces of the light guide plate, the first end face facing the plurality of light sources and being configured to receive incident light, the first main surface being configured to emit light; and a plurality of first lenses disposed at the first main surface, arranged along a first direction, and extending along a second direction, the first direction being an arrangement direction of the plurality of light sources, the second direction intersecting the first direction and extending along the first main surface. The first lenses are configured such that, when an end portion of the first main surface on a side of the light sources along the first direction is divided into a first region located on a center side along the first direction and a second region located on an end side along the first direction, a first occupancy of the first lenses in the first region is lower than a second occupancy of the first lenses in the second region.

(2) In addition to (1) described above, the illumination device may further include a plurality of second lenses disposed at the first end face, arranged along the first direction, and extending along a third direction, the third direction intersecting the first direction and extending along the first end face.

(3) In addition to (2) described above, in the illumination device, when the first end face is divided into a third region located on a center side along the first direction and corresponding to the first region and a fourth region located on an end side along the first direction and corresponding to the second region, more than one of the second lenses may be disposed in each of the third region and the fourth region.

(4) In addition to (3) described above, in the illumination device, each of the second lenses may be a cylindrical lens including a peripheral surface having an arc shape, and when an angle formed by a tangent line at a base end portion of the peripheral surface of the cylindrical lens with respect to the first direction is defined as a contact angle of the cylindrical lens, the contact angle of the cylindrical lens disposed in the fourth region may be larger than the contact angle of the cylindrical lens disposed in the third region.

(5) In addition to any one of (1) to (4) described above, in the illumination device, the first lenses need not be disposed in the first region and the first occupancy may be 0%.

(6) In addition to any one of (1) to (5) described above, the illumination device may further include a protruding portion disposed at an end portion of the first end face of the light guide plate along a third direction and protruding from the first end face along the second direction, and a receiving portion spaced apart from the first end face of the light guide plate in the second direction and configured to receive the protruding portion.

(7) In addition to any one of (1) to (6) described above, in the illumination device, the light guide plate may further include a second main surface on a side opposite to the first main surface, and a plurality of third lenses disposed at the second main surface, extending along the first direction, and arranged along the second direction. The third lenses are configured such that, when an end portion of the second main surface on a side of the light sources along the first direction is divided into a fifth region located on a center side along the first direction and a sixth region located on an end side along the first direction, a third occupancy of the third lenses in the fifth region may be lower than a fourth occupancy of the third lenses in the sixth region.

(8) In addition to any one of (1) to (7) described above, the illumination device may further include a first prism sheet disposed facing the first main surface with respect to the light guide plate, and a second prism sheet disposed on a side opposite to the light guide plate with respect to the first prism sheet. The first prism sheet may include a third main surface facing a side opposite to the light guide plate, and the third main surface may be provided with a plurality of first prisms extending along the first direction and arranged along the second direction. The second prism sheet may include a fourth main surface facing a side opposite to the first prism sheet, and the fourth main surface may be provided with a plurality of second prisms extending along the first direction and arranged along the second direction.

(9) In addition to any one of (1) to (7) described above, the illumination device may further include a third prism sheet disposed facing the first main surface with respect to the light guide plate. The third prism sheet may include a fifth main surface facing the first main surface, and the fifth main surface may be provided with a plurality of third prisms extending along the first direction and arranged along the second direction.

(10) A display device according to a technique described in the present specification includes the illumination device according to any one of (1) to (9) described above, and a display panel disposed overlapping with the first main surface and configured to perform display by using light from the illumination device.

(11) In addition to (10) described above, in the display device, the display panel may include a display region in which an image is displayed and a non-display region surrounding the display region. In the first lenses, the first region may overlap with a part of the non-display region and not overlap with the display region, and a length of the first region along the second direction may be 2 mm or more.

According to the technique described herein, the occurrence of brightness unevenness can be suppressed.

BRIEF DESCRIPTION OF DRAWINGS

The disclosure will be described with reference to the accompanying drawings, wherein like numbers reference like elements.

DESCRIPTION OF EMBODIMENTS

First Embodiment

A first embodiment will be described with reference to FIGS. 1 to 20. In the present embodiment, a liquid crystal display device 10 (a display device) is exemplified. Note that an X axis, a Y axis, and a Z axis are illustrated in part in each drawing, and each axial direction is illustrated to represent a direction in each drawing. Furthermore, a vertical direction is based on the vertical direction of FIGS. 2, 3, 8 and 9, an upper side in the same drawings is referred to as a front side, and a lower side in the same drawings is referred to as a back side.

Figure 1:
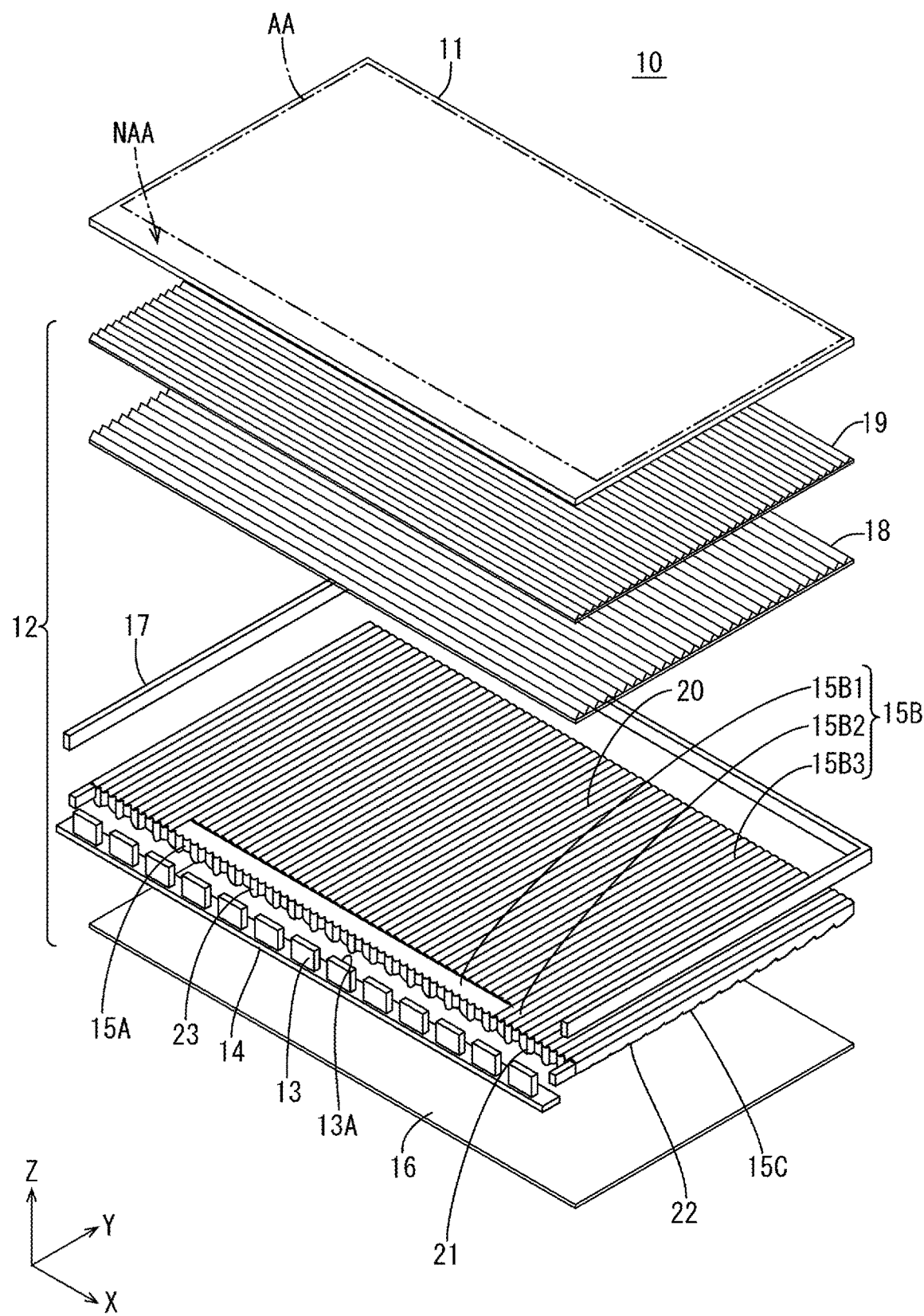
FIG. 1 is an exploded perspective view of a liquid crystal display device according to a first embodiment.

As illustrated in FIG. 1, the liquid crystal display device 10 includes a liquid crystal panel (display panel) 11 configured to display an image, and a backlight device (illumination device) 12 disposed on the back side of the liquid crystal panel 11 and configured to irradiate the liquid crystal panel 11 with light to be used for display. In the present embodiment, the liquid crystal display device 10 being for vehicle application is exemplified. For example, the liquid crystal display device 10 for vehicle application is mounted on a car navigation system for displaying a map and the like as an image, a multi-function display that displays an operation situation and the like of equipment such as an air conditioner, in addition to a map and the like, as an image, an instrument panel that displays gauges, alerts, and the like as an image, an infotainment system for displaying a television image, audio information, and the like, in addition to a map and the like, as an image, and the like.

The liquid crystal panel 11 has a horizontally elongated rectangular plate shape as a whole. A long-side direction, a short-side direction, and a plate-thickness direction (normal direction of a main surface) of the liquid crystal panel 11 coincide with an X-axis direction, a Y-axis direction, and a Z-axis direction, respectively. A screen size of the liquid crystal panel 11 is set to, for example, approximately 17 inches. In the liquid crystal panel 11, a center side portion of the main surface is a display region AA that can display an image, and an outer circumferential end side portion surrounding the display region AA and having a frame shape is a non-display region NAA. The liquid crystal panel 11 includes a pair of substrates and a liquid crystal layer sealed between the pair of substrates. Of the pair of substrates constituting the liquid crystal panel 11, a CF substrate (counter substrate) is disposed on the front side, and an array substrate (TFT substrate) is disposed on the back side. Color filters that exhibit red (R), green (G), blue (B), and the like, a light blocking portion (black matrix) that partitions adjacent color filters, and the like are provided on the CF substrate. The array substrate (TFT substrate) is provided with at least a gate wiring line and a source wiring line that are orthogonal to each other, a switching element (for example, a TFT) connected to the gate wiring line and the source wiring line, and a pixel electrode connected to the switching element and constituting a pixel. Note that an alignment film is provided on each inner face of the array substrate and the CF substrate constituting the liquid crystal panel 11. Further, a polarizer is attached to each outer face of the array substrate and the CF substrate constituting the liquid crystal panel 11.

Next, the backlight device 12 will be described. As illustrated in FIG. 1, the backlight device 12 includes at least an LED 13 as a light source, an LED substrate (light source substrate) 14 on which the LED 13 is mounted, a light guide plate 15 that guides light from the LED 13, a reflective sheet 16 disposed on the back side (side opposite to a light emission side) of the light guide plate 15, a frame 17 surrounding the periphery of the light guide plate 15, a first prism sheet 18 disposed on the front side (light emission side) of the light guide plate 15, and a second prism sheet 19 disposed on the front side of the first prism sheet 18. The backlight device 12 is an edge light type of a one-side light entering type in which light of the LED 13 is incident on the light guide plate 15 only from one side.

As illustrated in FIG. 1, the LED 13 is configured such that an LED chip is sealed with a sealing material on a substrate portion affixed to the LED substrate 14. The LED 13 is configured such that the LED chip emits, for example, blue light in a single light, and a phosphor is dispersed and mixed in the sealing material to emit white light as a whole. Examples of the phosphor include yellow phosphor, green phosphor, and red phosphor. Here, the liquid crystal display device 10 according to the present embodiment is for vehicle application, and thus assumed to be used in an environment in which strong external light is present in the surroundings during daytime. Thus, the backlight device 12 is required to have emission light of high front brightness, and for this purpose, the LED 13 as a light source is required to have high brightness. The high-brightness LED 13 tends to have a narrow light distribution, and has difficulty in emitting light at a wide angle. The LED 13 is a so-called side light emitting type in which a side face thereof adjacent to a mounting face of the LED substrate 14 is a light-emitting face 13A. The LED substrate 14 is disposed in an orientation in which a main surface of the LED substrate 14 is parallel to a main surface of the light guide plate 15, and the main surface of the LED substrate 14 on the front side is a mounting face for the LED 13. A plurality of LEDs 13 are arranged side by side at substantially equal intervals along the X-axis direction (first direction) on the mounting face of the LED substrate 14. The arrangement interval between the LEDs 13 (interval between center positions along the X-axis direction) is, for example, approximately 4.84 mm. The arrangement direction of the plurality of LEDs 13 coincides with the X-axis direction.

The light guide plate 15 is made of a synthetic resin material (for example, acrylic resin such as PMMA or the like) that has a sufficiently higher refractive index than that of the air and that is substantially transparent. As illustrated in FIG. 1, the light guide plate 15 has a plate shape, and the main surface of the light guide plate 15 is parallel to a main surface of the liquid crystal panel 11. Note that the light guide plate 15 is configured such that a long-side direction of the main surface, a short-side direction of the main surface, and a plate-thickness direction that is the normal direction of the main surface coincide with the X-axis direction, the Y-axis direction, and the Z-axis direction, respectively. The light guide plate 15 is disposed immediately below the liquid crystal panel 11. Among outer peripheral end faces of the light guide plate 15, an end face on the side of one long side is a light incident end face (first end face) 15A which faces the light-emitting faces 13A of the LEDs 13 and on which light from the light-emitting faces 13A is directly incident. A long-side direction and a short-side direction of the light incident end face 15A coincide with the X-axis direction (first direction) and the Z-axis direction (third direction), respectively. Of a pair of main surfaces of the light guide plate 15, the main surface on the front side facing the liquid crystal panel 11 is a light emission main surface (first main surface) 15B that emits light guided therein, and the main surface on the back side facing the reflective sheet 16 is an opposite main surface (second main surface) 15C. The light guide plate 15 has a function of introducing light emitted from the LED 13 toward the light guide plate 15 from the light incident end face 15A, propagating the light therein, and then, causing the light to rise along the Z-axis direction such that the light is directed toward the front side (light emission side) and emitted. A detailed structure of the light guide plate 15 will be described later. Note that the normal direction of the light incident end face 15A coincides with the Y-axis direction (second direction) that is an arrangement direction of the LEDs 13 and the light guide plate 15.

As illustrated in FIG. 1, the reflective sheet 16 includes a main surface parallel to the respective main surfaces of the liquid crystal panel 11 and the light guide plate 15, and is disposed covering the opposite main surface 15C of the light guide plate 15. The reflective sheet 16 has excellent light reflectivity, and can efficiently cause light leaked from the opposite main surface 15C of the light guide plate 15 to rise toward the front side, that is, toward the light emission main surface 15B. The reflective sheet 16 has an outer shape slightly larger than that of the light guide plate 15, and is disposed so as to overlap substantially an entirety of the opposite main surface 15C.

The frame 17 is made of synthetic resin (for example, made of polycarbonate) that exhibits white color with excellent light reflectivity on its surface. As illustrated in FIG. 1, the frame 17 has an outer shape slightly larger than that of the light guide plate 15, with one long side of the frame body removed. The frame 17 does not have a portion facing the light incident end face 15A among the outer peripheral end faces of the light guide plate 15, and has portions facing the remaining three end faces of the light guide plate 15. According to such a configuration, when light leaks out from the three end faces other than the light incident end face 15A among the outer peripheral end faces of the light guide plate 15, the leaked light is diffused (scattered) and reflected by the surfaces of the frame 17 facing the three end faces. The light reflected by the frame 17 is incident again on the three end faces other than the light incident end face 15A among the outer peripheral end faces of the light guide plate 15, and is emitted from the light emission main surface 15B. Thus, the usage efficiency of light can be improved. In addition, the frame 17 is fixed to another member (such as the liquid crystal panel 11) by using a fixing member such as double-sided tape.

As illustrated in FIG. 1, the first prism sheet 18 and the second prism sheet 19 have a sheet shape, and respective main surfaces thereof are parallel to the respective main surfaces of the liquid crystal panel 11 and the light guide plate 15. Note that the respective main surfaces of the first prism sheet 18 and the second prism sheet 19 are parallel to the X-axis direction and the Y-axis direction, and a normal direction (thickness direction) of the main surfaces coincides with the Z-axis direction. The first prism sheet 18 and the second prism sheet 19 are layered on the front side of the light guide plate 15, and have a function of imparting a predetermined optical action to light emitted from the light emission main surface 15B of the light guide plate 15 to emit the light, and the like.

Figure 2:
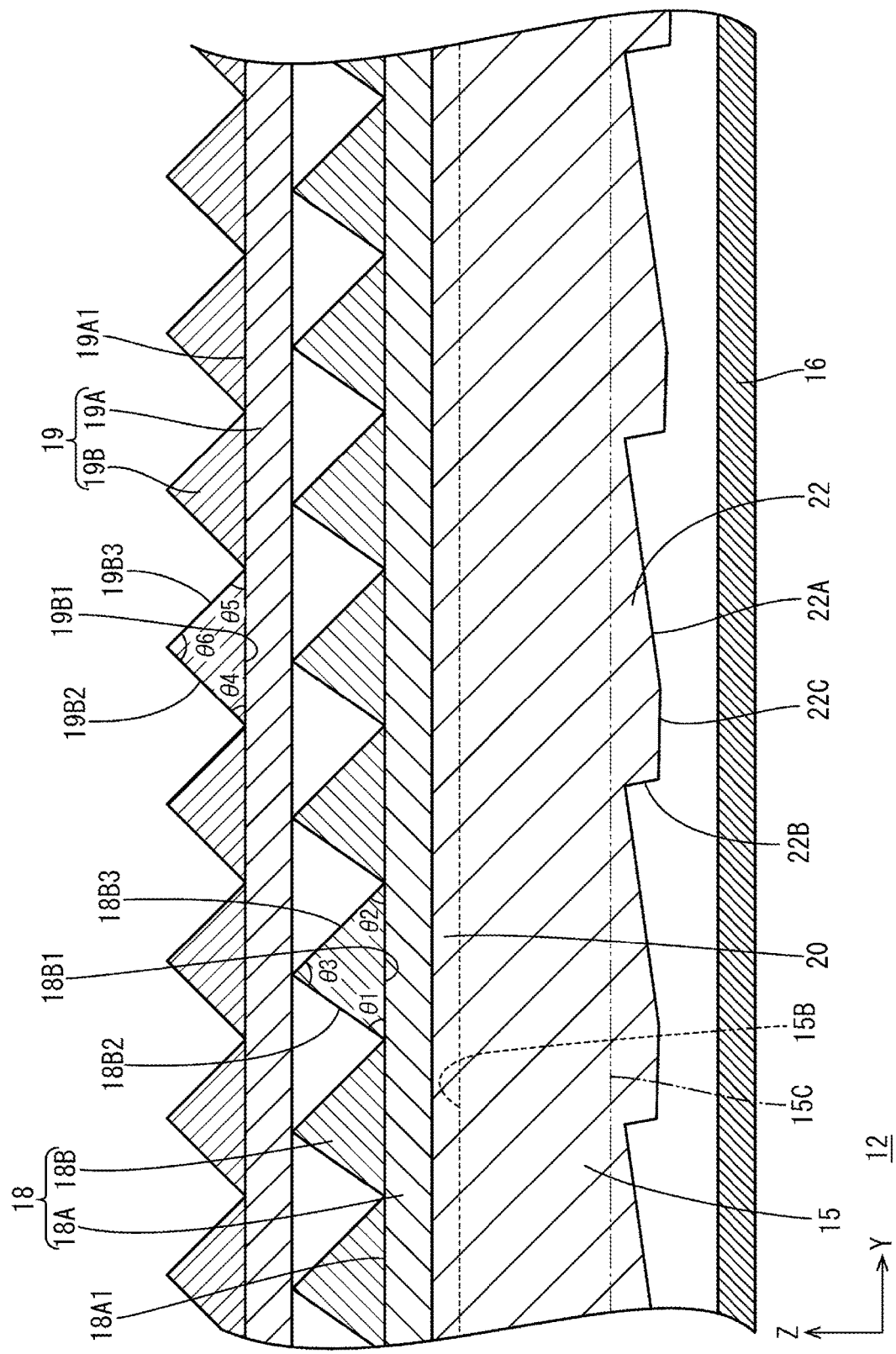
FIG. 2 is a cross-sectional view of a backlight device, which is taken along a Y-axis direction, constituting the liquid crystal display device.

As illustrated in FIGS. 1 and 2, the first prism sheet 18 includes a first base material 18A having a sheet shape, and a first prism 18B provided on a light emission main surface (third main surface) 18A1 on the front side (light emission side) of the first base material 18A. The first base material 18A is made of substantially transparent synthetic resin, and specifically, is formed of, for example, a crystalline transparent resin material such as polyethylene terephthalate (PET). The first base material 18A is formed into a sheet shape by stretching the crystalline transparent resin material serving as a raw material in a biaxially stretching process in manufacturing, which is suitable for reducing manufacturing costs. The first prism 18B is formed of an ultraviolet-curing resin material being substantially transparent and being a type of photo-curable resin material. In manufacturing the first prism sheet 18, for example, the uncured ultraviolet-curing resin material is filled into a mold for molding, and the first base material 18A is applied to an opening end of the mold to dispose the uncured ultraviolet-curing resin material so as to contact the main surface on the front side, and in this state, when the ultraviolet-curing resin material is irradiated with ultraviolet rays through the first base material 18A, the ultraviolet-curing resin material is cured, and the first prism 18B is integrally provided with the first base material 18A. The ultraviolet-curing resin material constituting the first prism 18B is, for example, an acrylic resin such as PMMA. A refractive index of the ultraviolet-curing resin material constituting the first prism 18B is preferably set within a range from 1.49 to 1.52, and is most preferably set to 1.49.

As illustrated in FIGS. 1 and 2, the first prism 18B is provided so as to protrude from the light emission main surface 18A1 of the first base material 18A toward the front side (side opposite to the light guide plate 15) along the Z-axis direction. The first prism 18B has a substantially triangular shape (is substantially mountain shaped) in a cross section taken along the Y-axis direction and extends linearly along the X-axis direction (first direction), and a plurality of the first prisms 18B are continuously arranged side by side with substantially no interval along the Y-axis direction (second direction) on the light emission main surface 18A1 of the first base material 18A. The first prism 18B includes a base 18B1 parallel to the Y-axis direction, and a pair of oblique sides 18B2 and 18B3 rising from both ends of the base 18B1. Of the pair of oblique sides 18B2 and 18B3 of the first prism 18B, the oblique side located on the side of the LED 13 in the Y-axis direction is referred to as a first LED-side oblique side (first oblique side) 18B2, and the oblique side located on the side opposite to the LED 13 is referred to as a first opposite-to-LED-side oblique side (second oblique side) 18B3. Of the pair of oblique sides, the first opposite-to-LED-side oblique side 18B3 is exposed mainly to light traveling in a direction away from the LED 13 in the Y-axis direction out of light incident on the first prism 18B, refracting the light. On the other hand, the first LED-side oblique side 18B2 is exposed mainly to light traveling in a direction approaching the LED 13 in the Y-axis direction out of the light incident on the first prism 18B, refracting the light. In any case, most of the light refracted by the pair of oblique sides 18B2 and 18B3 of the first prism 18B is selectively raised in the Y-axis direction and condensed.

As illustrated in FIGS. 1 and 2, in the first prism 18B, when an inclination angle (first bottom angle) θ1 of the first LED-side oblique side 18B2 with respect to the base 18B1, and an inclination angle (second bottom angle) θ2 of the first opposite-to-LED-side oblique side 18B3 with respect to the base 18B1 are compared, the former is set to be larger than the latter. That is, the first prism 18B has an asymmetric cross-sectional shape, which is that of a scalene triangle. Specifically, the inclination angle θ1 of the first LED-side oblique side 18B2 with respect to the base 18B1 in the first prism 18B is preferably within a range from 50° to 60°, and is most preferably set to 55°. On the other hand, the inclination angle θ2 of the first opposite-to-LED-side oblique side 18B3 with respect to the base 18B1 in the first prism 18B is preferably within a range from 35° to 50°, and is most preferably set to 45°. Further, an angle (first apex angle) θ3 formed by the pair of oblique sides 18B2 and 18B3 of the first prism 18B is preferably set within a range from 70° to 95°, and is most preferably set to 80°. Note that all the plurality of first prisms 18B arranged along the X-axis direction have substantially the same height dimension, substantially the same width dimension for the base 18B1, substantially the same inclination angles for the oblique sides 18B2 and 18B3 with respect to the base 18B1, and the like, and are arranged such that the arrangement intervals between adjacent first prisms 18B are substantially constant and equal.

As illustrated in FIGS. 1 and 2, the second prism sheet 19 includes a second base material 19A having a sheet shape, and a second prism 19B provided on a light emission main surface (fourth main surface) 19A1 on the front side (light emission side) of the second base material 19A. The second base material 19A is made of substantially transparent synthetic resin, and is specifically formed of, for example, a crystalline transparent resin material such as PET that is the same as the first base material 18A. The second prism 19B is formed of an ultraviolet-curing resin material being substantially transparent and being a type of photo-curable resin material. A manufacturing method of the second prism sheet 19 is similar to the manufacturing method of the first prism sheet 18 described above. The ultraviolet-curing resin material constituting the second prism 19B is, for example, an acrylic resin such as PMMA, and a refractive index of the ultraviolet-curing resin material is set higher than the refractive index of the material of the first prism 18B, and is set to, for example, approximately 1.61.

As illustrated in FIGS. 1 and 2, the second prism 19B is provided so as to protrude from the light emission main surface 19A1 of the second base material 19A toward the front side (side opposite to the first prism sheet 18) along the Z-axis direction. The second prism 19B has a substantially triangular shape (is substantially mountain shaped) in a cross section taken along the Y-axis direction and extends linearly along the X-axis direction, and a plurality of the second prisms 19B are continuously arranged side by side with substantially no interval along the Y-axis direction on the light emission main surface 19A1 of the second base material 19A. The second prism 19B includes a base 19B1 parallel to the Y-axis direction, and a pair of oblique sides 19B2 and 19B3 rising from both ends of the base 19B1. Of the pair of oblique sides 19B2 and 19B3 of the second prism 19B, the oblique side located on the side of the LED 13 in the Y-axis direction is referred to as a second LED-side oblique side (third oblique side) 19B2, and the oblique side located on the side opposite to the LED 13 is referred to as a second opposite-to-LED-side oblique side (fourth oblique side) 19B3. Of the pair of oblique sides, the second opposite-to-LED-side oblique side 19B3 is exposed mainly to light traveling in a direction away from the LED 13 in the Y-axis direction out of light incident on the second prism 19B, refracting the light. On the other hand, the second LED-side oblique side 19B2 is exposed mainly to light traveling in a direction approaching the LED 13 in the Y-axis direction out of the light incident on the second prism 19B, refracting the light. In any case, most of the light refracted by the pair of oblique sides 19B2 and 19B3 of the second prism 19B is selectively raised in the Y-axis direction and condensed.

As illustrated in FIGS. 1 and 2, in the second prism 19B, an inclination angle (third bottom angle) θ4 of the second LED-side oblique side 19B2 with respect to the base 19B1, and an inclination angle (fourth bottom angle) θ5 of the second opposite-to-LED-side oblique side 19B3 with respect to the base 19B1, are identical. That is, the second prism 19B has a symmetric cross-sectional shape, which is that of an isosceles triangle. Moreover, the inclination angle θ4 of the second LED-side oblique side 19B2 with respect to the base 19B1 in the second prism 19B is made smaller than the inclination angle θ1 of the first LED-side oblique side 18B2 with respect to the base 18B1 in the first prism 18B provided on the first prism sheet 18. Specifically, the respective inclination angles θ4 and θ5 of the pair of oblique sides 19B2 and 19B3 with respect to the base 19B1 in the second prism 19B are preferably within a range from 40° to 50°, and are most preferably set to 45°. On the other hand, an angle (second apex angle) θ6 formed by the pair of oblique sides 19B2 and 19B3 of the second prism 19B is preferably set within a range from 80° to 100°, and is most preferably set to 90°, that is, a right angle. Note that all the plurality of second prisms 19B arranged along the X-axis direction have substantially the same height dimension, substantially the same width dimension for the base 19B1, substantially the same inclination angles for the oblique sides 19B2 and 19B3 with respect to the base 19B1, and the like, and are arranged such that the arrangement intervals between adjacent second prisms 19B are substantially constant and equal. In addition, the height dimension and the arrangement intervals of the second prisms 19B preferably differ from the height dimension and the arrangement intervals of the first prism 18B, respectively, in terms of suppressing the occurrence of interference fringes called moire.

The actions and effects of the first prism sheet 18 and the second prism sheet 19 having the configurations described above will be described. Light emitted from the LED 13 and incident on the light incident end face 15A of the light guide plate 15 is propagated inside the light guide plate 15, emitted from the light emission main surface 15B, and incident on the first prism sheet 18. Most of the light incident on the first prism sheet 18 is incident on and refracted by the first opposite-to-LED-side oblique side 18B3 that is the oblique side located on the side opposite to the LED 13 in the Y-axis direction among the pair of oblique sides 18B2 and 18B3 of the first prism 18B, and then is raised and emitted, or is directed toward the first LED-side oblique side 18B2 that is the oblique side located on the side of the LED 13 in the Y-axis direction. Here, in the first prism 18B, the angle formed by the first LED-side oblique side 18B2, which is the oblique side located on the side of the LED 13 in the Y-axis direction, with respect to the base 18B1 is larger than the corresponding angle in the second prism 19B. Thus, compared with the case where the angles are identical or the magnitude relationship between the angles is reversed, the light incident on the first prism sheet 18 is less likely to be incident on the first LED-side oblique side 18B2 of the first prism 18B that is the oblique side located on the side of the LED 13. When the incident light incident on the first prism sheet 18 is incident on the first LED-side oblique side 18B2 of the first prism 18B that is the oblique side located on the side of the LED 13, the light is not raised when being emitted from the first prism 18B, and tends to be more likely to be emitted as stray light. Thus, when the incident light incident on the first prism sheet 18 becomes less likely to be directly incident on the first LED-side oblique side 18B2 of the first prism 18B that is the oblique side located on the side of the LED 13, the occurrence of stray light is suppressed, and as a result, the usage efficiency of light is improved.

Most of the light emitted from the first prism sheet 18 and incident on the second prism sheet 19 is incident on and refracted by the second opposite-to-LED-side oblique side 19B3 that is the oblique side located on the side opposite to the LED 13 in the Y-axis direction among the pair of oblique sides 19B2 and 19B3 of the second prism 19B, and then is raised and emitted, or is directed toward the second LED-side oblique side 19B2 that is the oblique side located on the side of the LED 13 in the Y-axis direction. Here, in the second prism 19B, the angle formed by the second LED-side oblique side 19B2, which is the oblique side located on the side of the LED 13 in the Y-axis direction, with respect to the base 19B1 is smaller than the corresponding angle in the first prism 18B. Thus, compared with the case where the angles are identical or the magnitude relationship between the angles is reversed, the light refracted by the second opposite-to-LED-side oblique side 19B3 that is the oblique side located on the side opposite to the LED 13 in the Y-axis direction and directed toward the second LED-side oblique side 19B2 that is the oblique side located on the side of the LED 13 in the Y-axis direction is easily returned to the side of the first prism sheet 18 by the second LED-side oblique side 19B2 that is the oblique side located on the side of the LED 13 in the Y-axis direction. As a result, the amount of light returned from the second prism sheet 19 toward the first prism sheet 18 side (hereinafter referred to as recursive light) is increased. This recursive light reaches the second prism sheet 19 again by being reflected or the like inside the backlight device 12, and is raised and emitted by either of the pair of oblique sides 19B2 and 19B3 of the second prism 19B, so the usage efficiency of light is improved. Since an optical path until the recursive light is emitted from the second prism sheet 19 is complicated, a rise angle provided by the second prism 19B is also diversified, thereby improving viewing angle characteristics. As described above, the viewing angle characteristics and brightness (front brightness) can be improved, which is suitable for the liquid crystal display device 10 for vehicle application.

Figure 3:
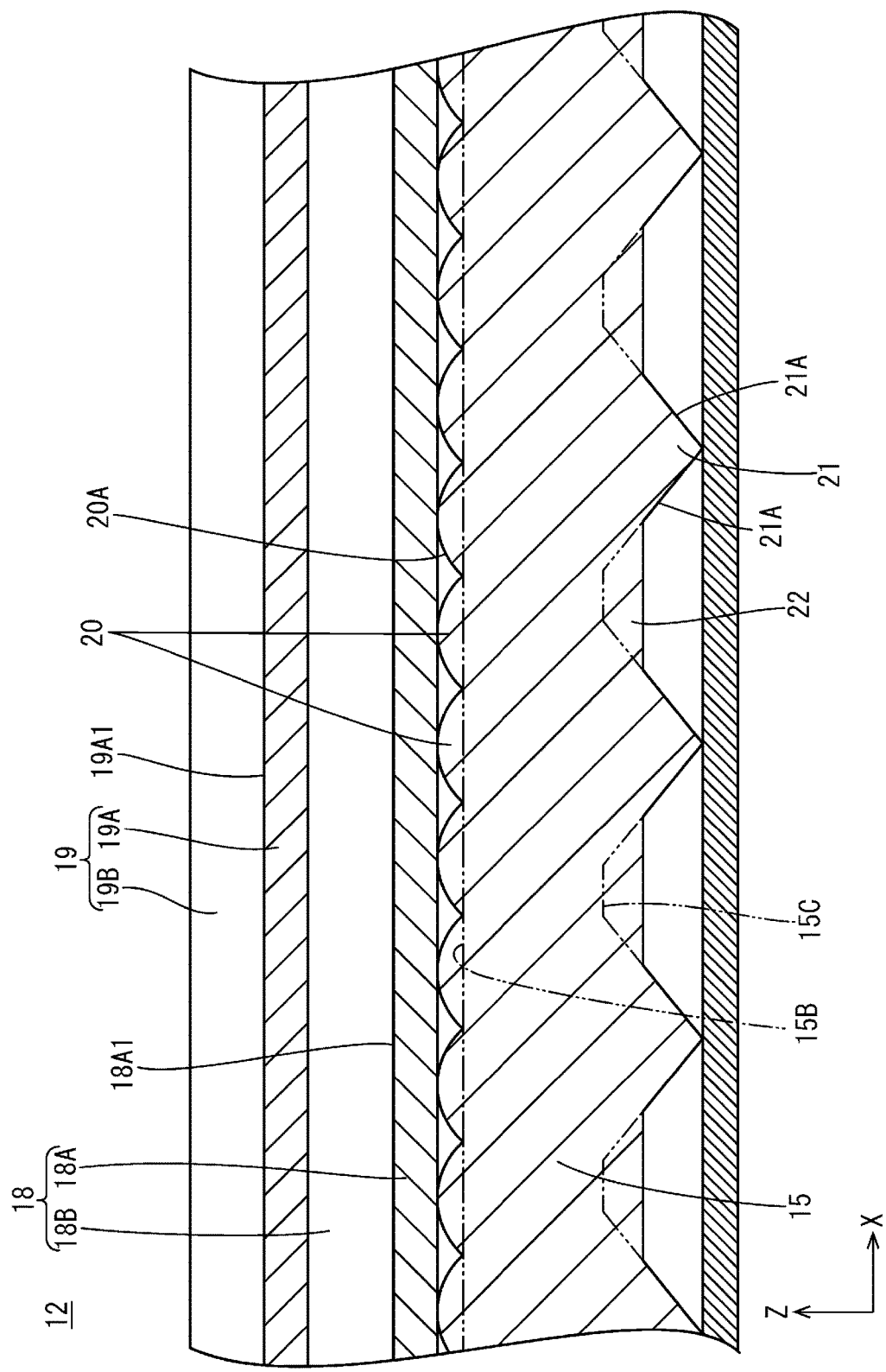
FIG. 3 is a cross-sectional view of the backlight device taken along an X-axis direction.

Here, a detailed structure of the light guide plate 15 will be described. As illustrated in FIGS. 2 and 3, the light guide plate 15 is provided with a first light guide plate lens (first lens) 20, a second light guide plate lens 21, a third light guide plate lens 22, and a fourth light guide plate lens (second lens) 23.

As illustrated in FIG. 3, the first light guide plate lens 20 is provided on the light emission main surface 15B of the light guide plate 15. The first light guide plate lens 20 extends along the Y-axis direction (second direction), and a plurality of first light guide plate lenses 20 are arranged side by side along the X-axis direction (first direction). The plurality of first light guide plate lenses 20 are continuously arranged along the X-axis direction with substantially no interval therebetween. In the present embodiment, the first light guide plate lens 20 is a so-called cylindrical lens. The first light guide plate lens 20 has a convex shape protruding from the light emission main surface 15B to the front side. Specifically, the first light guide plate lens 20 has a semicircular shape in a cross section taken along the X-axis direction and a semi-cylindrical shape linearly extending along the Y-axis direction, and a surface of the first light guide plate lens 20 is a first circular arc-shaped face 20A. When an angle formed by a tangent line at a base end portion of the first circular arc-shaped face 20A with respect to the X-axis direction is defined as a "contact angle", the contact angle of the first light guide plate lens 20 is, for example, approximately 51°. The arrangement interval between the first light guide plate lenses 20 (interval between center positions along the X-axis direction) is, for example, approximately 0.041 mm. All the plurality of first light guide plate lenses 20 arranged along the X-axis direction have substantially the same contact angle, substantially the same width dimension, substantially the same arrangement interval, and substantially the same height dimension. In order to integrally provide the light guide plate 15 with the first light guide plate lens 20 having such a configuration, for example, the light guide plate 15 may be manufactured by injection molding, and a transfer shape for transferring the first light guide plate lens 20 may be formed in advance in a molding die for the light guide plate 15 at a molding face for molding the light emission main surface 15B.

As illustrated in FIG. 3, the second light guide plate lens 21 is provided on the opposite main surface 15C of the light guide plate 15. The second light guide plate lens 21 extends along the Y-axis direction, and a plurality of second light guide plate lenses 21 are arranged side by side along the X-axis direction. In the present embodiment, the second light guide plate lens 21 is a convex-shaped prism protruding from the opposite main surface 15C to the back side. Specifically, the second light guide plate lens 21 has a substantially triangular shape (is substantially mountain shaped) in a cross section taken along the X-axis direction and extends linearly along the Y-axis direction. The width dimension (dimension along the X-axis direction) of the second light guide plate lens 21 is constant throughout its entire length along the Y-axis direction. The second light guide plate lens 21 has an approximately isosceles triangle cross-sectional shape and includes a pair of first light guide plate inclined surfaces 21A. An apex angle of the second light guide plate lens 21 is preferably set to an obtuse angle (angle greater than 90°), specifically, within a range from 100° to 150°, and is most preferably set to 140°. All the plurality of second light guide plate lenses 21 arranged along the X-axis direction have substantially the same apex angle, substantially the same width dimension, substantially the same arrangement interval, and substantially the same height dimension. In the present embodiment, the arrangement interval of the second light guide plate lenses 21 is greater than the arrangement interval of the first light guide plate lenses 20. In order to integrally provide the light guide plate 15 with the second light guide plate lens 21 having such a configuration, for example, the light guide plate 15 may be manufactured by injection molding, and a transfer shape for transferring the second light guide plate lens 21 may be formed in advance in a molding die for the light guide plate 15 at a molding face for molding the opposite main surface 15C.

According to the light guide plate 15 having such a configuration, as illustrated in FIG. 3, light propagating inside the light guide plate 15 is totally reflected in a repetitive manner by being incident on the first circular arc-shaped face 20A of each of the first light guide plate lenses 20 on the side of the light emission main surface 15B along the Z-axis direction, and travels in a zigzag manner substantially along the X-axis direction. Light propagating inside the light guide plate 15 is totally reflected in a repetitive manner by being incident on the pair of first light guide plate inclined surfaces 21A of each of the second light guide plate lenses 21 on the side of the opposite main surface 15C along the Z-axis direction, and travels in a zigzag manner substantially along the Y-axis direction. In this way, light propagating inside the light guide plate 15 is restricted from spreading in the X-axis direction, and thus unevenness of darkness and brightness is less likely to occur between a vicinity of the LED 13 and surroundings thereof in the X-axis direction. On the other hand, in the light emission main surface 15B, light that is not totally reflected by the first circular arc-shaped face 20A of the first light guide plate lens 20 is refracted by the first circular arc-shaped face 20A and promoted to be emitted from the light emission main surface 15B.

As illustrated in FIG. 2, the third light guide plate lens 22 is provided on the opposite main surface 15C of the light guide plate 15. A plurality of third light guide plate lenses 22 are arranged side by side at intervals along the Y-axis direction. The third light guide plate lens 22 protrudes from the opposite main surface 15C toward the back side along the Z-axis direction. The third light guide plate lens 22 includes a second light guide plate inclined surface 22A disposed on the side opposite to the LED 13 (right side in FIG. 2) along the Y-axis direction, a third light guide plate inclined surface 22B disposed on the side of the LED 13 (left side in FIG. 2) along the Y-axis direction, and a fourth light guide plate inclined surface 22C located between the second light guide plate inclined surface 22A and the third light guide plate inclined surface 22B. The second light guide plate inclined surface 22A has an inclination rising from the side of the LED 13 (left side in FIG. 2) toward the side opposite to the LED 13 (right side in FIG. 2) along the Y-axis direction in the light guide plate 15. The third light guide plate inclined surface 22B has an inclination rising from the side opposite to the LED 13 (right side in FIG. 2) toward the side of the LED 13 (left side in FIG. 2) along the Y-axis direction in the light guide plate 15. The fourth light guide plate inclined surface 22C has an inclination rising from the side of the LED 13 (left side in FIG. 2) toward the side opposite to the LED 13 (right side in FIG. 2) along the Y-axis direction in the light guide plate 15.

As illustrated in FIG. 2, the second light guide plate inclined surface 22A and the third light guide plate inclined surface 22B reflect light propagating inside the light guide plate 15, raise the light toward the front side so as to be at an angle close to the Z-axis direction, and thus can promote emission from the light emission main surface 15B. Specifically, the second light guide plate inclined surface 22A mainly functions to reflect and raise light traveling away from the LED 13 in the Y-axis direction. On the other hand, the third light guide plate inclined surface 22B mainly functions to reflect and raise light traveling toward the LED 13 in the Y-axis direction. The second light guide plate inclined surface 22A has a gradient in which a distance from the light emission main surface 15B (a portion on which the third light guide plate lens 22 is not installed) becomes smaller while getting farther from the LED 13 in the Y-axis direction. The second light guide plate inclined surface 22A has an inclination angle of, for example, approximately 8° with respect to the Y-axis direction. The third light guide plate inclined surface 22B has a gradient in which a distance from the light emission main surface 15B becomes larger while getting farther from the LED 13 in the Y-axis direction, that is, a gradient opposite to the gradient of the second light guide plate inclined surface 22A. The third light guide plate inclined surface 22B has a steep, near-vertical gradient at an inclination angle of, for example, approximately 80° with respect to the Y-axis direction, and the inclination angle is greater than the inclination angle of the second light guide plate inclined surface 22A.

Figure 4:
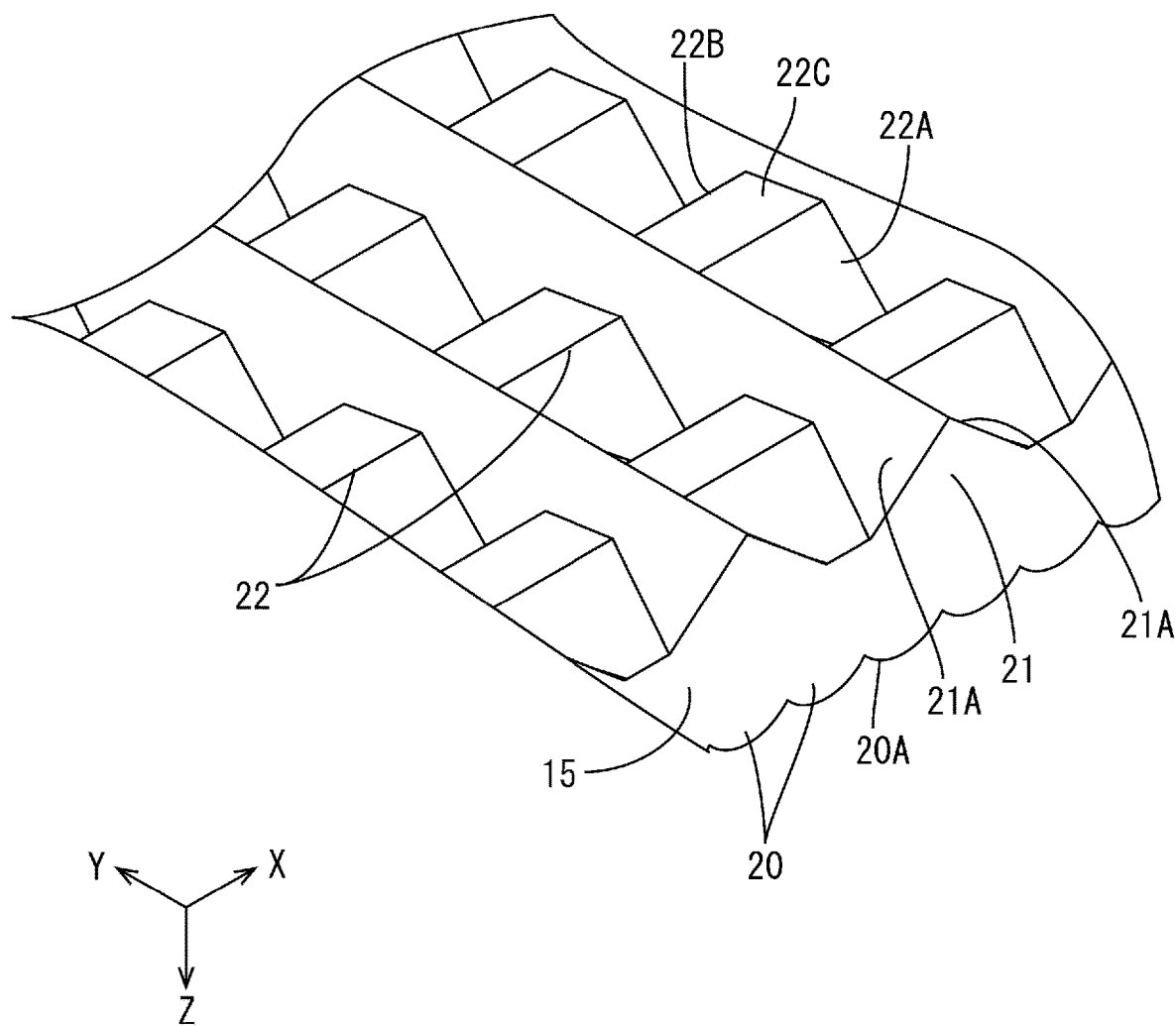
FIG. 4 is a perspective view of a light guide plate constituting the backlight device as viewed from the side of an opposite main surface.
Figure 5:
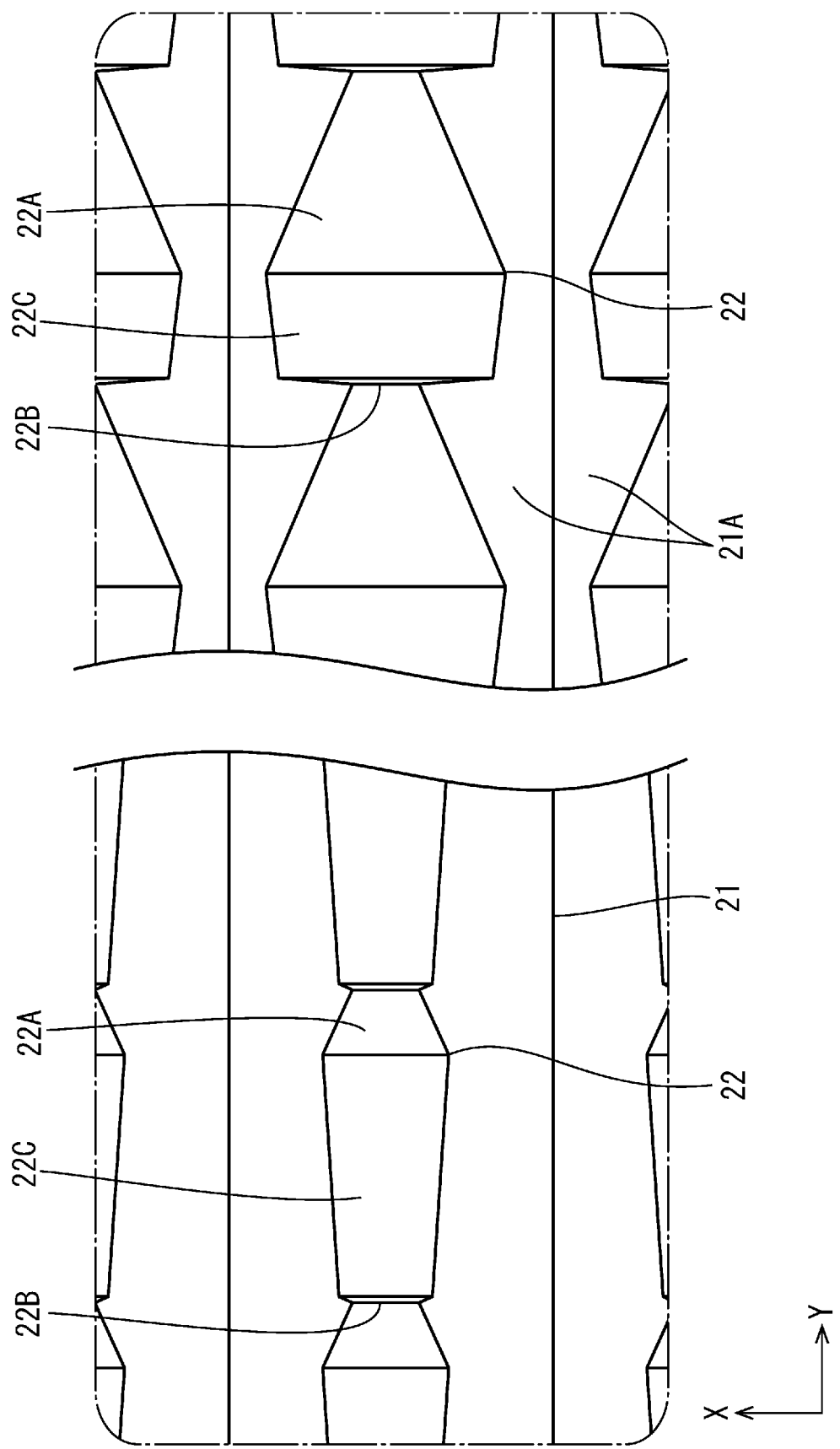
FIG. 5 is a bottom view illustrating a configuration on the opposite main surface of the light guide plate.

Further, as illustrated in FIGS. 2, 4, and 5, the plurality of third light guide plate lenses 22 arranged along the Y-axis direction are designed such that the height dimension (dimension along the Z-axis direction) and the length dimension (dimension along the Y-axis direction) respectively increase while getting farther from the LED 13 in the Y-axis direction. More specifically, comparing the third light guide plate lens 22 closer to the LED 13 in the Y-axis direction and the third light guide plate lens 22 farther from the LED 13 in the Y-axis direction, the respective areas of the second light guide plate inclined surface 22A and the third light guide plate inclined surface 22B of the latter are larger than those of the former. In this way, on a side closer to the LED 13 in the Y-axis direction, light is less likely to be incident on the second light guide plate inclined surface 22A and the third light guide plate inclined surface 22B of the third light guide plate lens 22, and light emission is suppressed, while on a side farther from the LED 13 in the Y-axis direction, light is more likely to be incident on the second light guide plate inclined surface 22A and the third light guide plate inclined surface 22B of the third light guide plate lens 22, and light emission is promoted. As a result, the amount of emission light from the light emission main surface 15B is made uniform between the side of the LED 13 and the side opposite to the LED 13 in the Y-axis direction.

As illustrated in FIG. 2, in the fourth light guide plate inclined surface 22C, an end portion on the side opposite to the LED 13 along the Y-axis direction (right side in FIG. 2) is continuous with the second light guide plate inclined surface 22A, and an end portion on the side of the first LED 13 along the Y-axis direction (left side in FIG. 2) is continuous with the third light guide plate inclined surface 22B. The fourth light guide plate inclined surface 22C has a gradient in which a distance from the light emission main surface 15B (a portion on which the third light guide plate lens 22 is not installed) becomes larger while getting farther from the LED 13 in the Y-axis direction. That is, the fourth light guide plate inclined surface 22C has the gradient similar to that of the third light guide plate inclined surface 22B. The fourth light guide plate inclined surface 22C has an inclination angle of, for example, approximately 1.4° with respect to the Y-axis direction, and the inclination angle is smaller than the inclination angle of each of the second light guide plate inclined surface 22A and the third light guide plate inclined surface 22B. The fourth light guide plate inclined surface 22C having such a configuration reflects light traveling away from the LED 13 inside the light guide plate 15, and thus the light is directed to the light emission main surface 15B, but an angle of incidence of the light with respect to the light emission main surface 15B does not exceed a critical angle. Thus, the light is totally reflected by the light emission main surface 15B, and is guided so as to get farther from the LED 13. Accordingly, emission light from the light emission main surface 15B is less likely to be biased toward the side of the LED 13 in the Y-axis direction. As described above, the light guide plate 15 is configured such that the inclination angle with respect to the Y-axis direction increases in the order of the fourth light guide plate inclined surface 22C, the second light guide plate inclined surface 22A, and the third light guide plate inclined surface 22B. Further, a plurality of fourth light guide plate inclined surfaces 22C arranged along the Y-axis direction are designed such that the length dimension decreases while getting farther from the LED 13 in the Y-axis direction. The reason is that the length dimension of the third light guide plate lens 22 increases while getting farther from the LED 13 in the Y-axis direction, and an occupancy range of the third light guide plate lens 22 increases.

As illustrated in FIGS. 3 to 5, the third light guide plate lens 22 having the configuration described above is sandwiched between two second light guide plate lenses 21 adjacent to each other in the X-axis direction. Thus, the third light guide plate lens 22 is repeatedly arranged alternately with the second light guide plate lens 21 in the X-axis direction. In the third light guide plate lens 22, a maximum value of a protrusion dimension (height dimension) from the opposite main surface 15C is set smaller than a corresponding protrusion dimension of the second light guide plate lens 21. Thus, even the third light guide plate lens 22 located on the farthest side from the LED 13 in the Y-axis direction does not protrude farther toward the back side than the second light guide plate lens 21.

Figure 6:
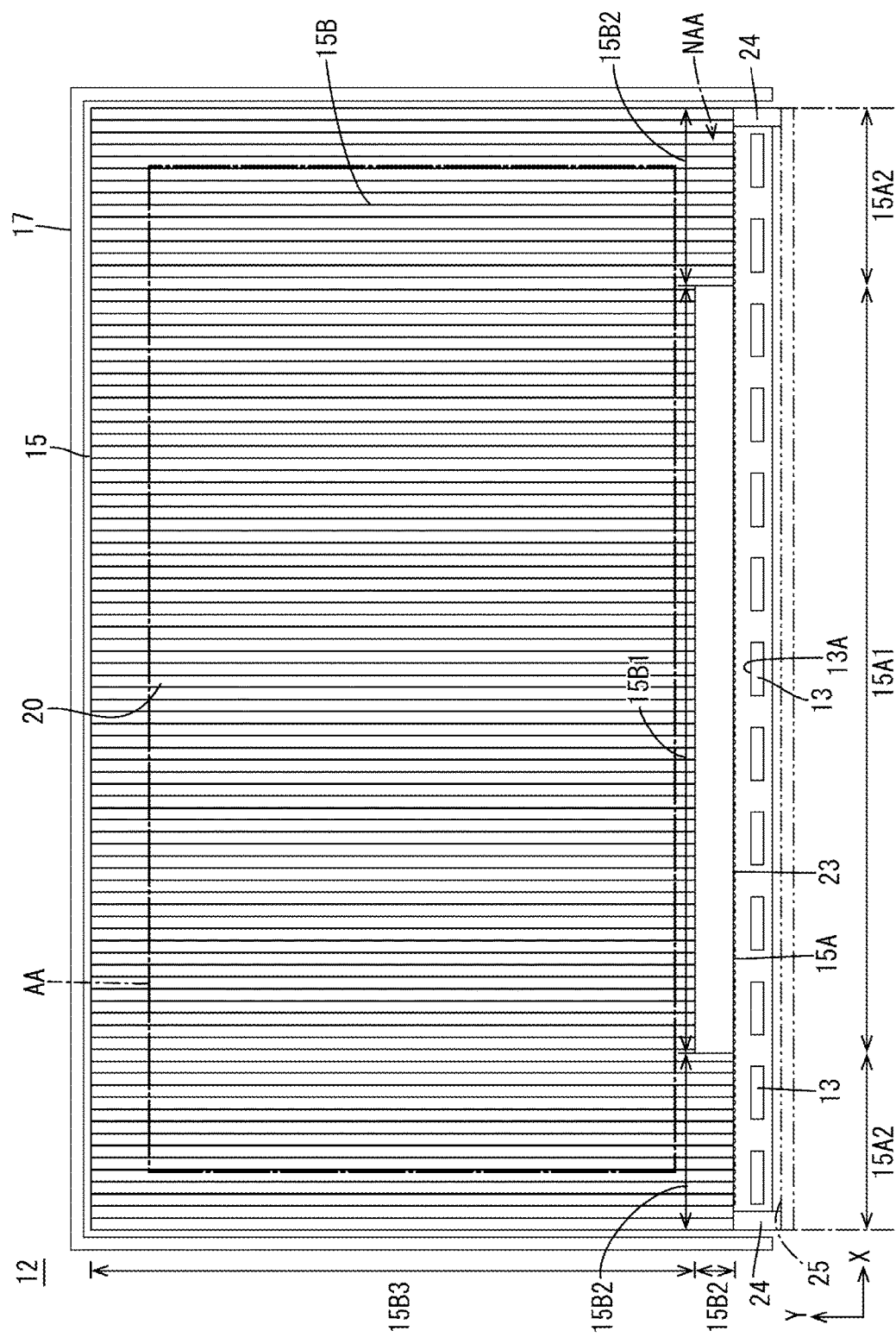
FIG. 6 is a plan view of the backlight device.

As illustrated in FIGS. 1 and 6, the fourth light guide plate lens 23 is provided on the light incident end face 15A of the light guide plate 15. The fourth light guide plate lens 23 extends along the Z-axis direction (third direction), and a plurality of fourth light guide plate lenses 23 are arranged side by side along the X-axis direction (first direction). The plurality of fourth light guide plate lenses 23 are arranged side by side at predetermined intervals along the X-axis direction. In the present embodiment, the fourth light guide plate lens 23 is a so-called cylindrical lens. The fourth light guide plate lens 23 has a convex shape protruding from the light incident end face 15A to the side of the LED 13. Specifically, the fourth light guide plate lens 23 has a semi-circular shape (arch shape) in a cross section taken along the X-axis direction and the Y-axis direction and a semi-cylindrical shape linearly extending along the Z-axis direction, and a surface of the fourth light guide plate lens 23 is a second circular arc-shaped face 23A. When an angle formed by a tangent line at a base end portion of the fourth light guide plate lens 23 with respect to the X-axis direction is defined as a "contact angle", the contact angle of the fourth light guide plate lens 23 is, for example, approximately 38°. The arrangement interval between the fourth light guide plate lenses 23 (interval between center positions along the X-axis direction) is, for example, approximately 0.0235 mm. All the plurality of fourth light guide plate lenses 23 arranged along the X-axis direction have substantially the same contact angle, substantially the same width dimension, substantially the same arrangement interval, and substantially the same height dimension. In order to integrally provide the light guide plate 15 with the fourth light guide plate lens 23 having such a configuration, for example, the light guide plate 15 may be manufactured by injection molding, and a transfer shape for transferring the fourth light guide plate lens 23 may be formed in advance in a molding die for the light guide plate 15 at a molding face for molding the light incident end face 15A. The fourth light guide plate lens 23 having such a configuration can impart a refracting action to light incident on the light incident end face 15A so as to be diffused widely in the X-axis direction by the second circular arc-shaped face 23A. The light imparted with the refracting action travels while being diffused widely in the X-axis direction inside the light guide plate 15, compared to light that is not imparted with the refracting action.

As illustrated in FIG. 6, the light guide plate 15 is provided with a protruding portion 24 in addition to the lenses 21 to 23 described above. The protruding portion 24 is provided at both end portions of the light incident end face 15A of the light guide plate 15 along the Z-axis direction (third direction), and protrudes from the light incident end face 15A along the Y-axis direction. A protrusion dimension of the protruding portion 24 from the light incident end face 15A is larger than the sum of the distance between the LED 13 and the light incident end face 15A and the thickness of the LED 13. That is, a protruding tip face of the protruding portion 24 is located on the side opposite to the light incident end face 15A in the Y-axis direction (lower side in FIG. 6) with respect to a surface of the LED 13 opposite to the light-emitting face 13A. The backlight device 12 is provided with a receiving portion 25 for receiving the protruding portion 24. In FIG. 6, the receiving portion 25 is indicated by a dashed-two dotted line. The receiving portion 25 extends along the X-axis direction and is disposed spaced apart from the light incident end face 15A in the Y-axis direction. The distance between the receiving portion 25 and the light incident end face 15A is equal to the protrusion dimension of the protruding portion 24 from the light incident end face 15A. The LED 13 is interposed between the receiving portion 25 and the light incident end face 15A. The receiving portion 25 may be composed of, for example, a part of a housing of the liquid crystal display device 10. As described above, since the protruding portions 24 are received by the receiving portion 25, the positional relationship between the LED 13 and the light incident end face 15A in the Y-axis direction is stably maintained. Accordingly, since the temperature of the LED 13, which generates heat in association with the light emission, is less likely to rise and since the LED 13 is less likely to physically interfere with the light incident end face 15A, the LED 13 is less likely to fail. In particular, it is suitable for a case where the LED 13 has a high brightness and generates a large amount of heat. In addition, light incidence on the light incident end face 15A from the LED 13 is stabilized.

As described above, when a pair of the protruding portions 24 are provided at both end portions of the light incident end face 15A of the light guide plate 15 along the Z-axis direction, the LEDs 13 need to be disposed so as to avoid both protruding portions 24. In addition, since both end portions of the light incident end face 15A along the Z-axis direction are occupied by the pair of the protruding portions 24, both end portions hardly function as light introduction portions. For this reason, there is a concern that the amount of light introduced into both end portions of the light incident end face 15A of the light guide plate 15 along the Z-axis direction is reduced, and in particular, that the amount of emission light is reduced at or near portions corresponding to both end portions along the Z-axis direction as well as an end portion on the side of the LED 13 along the X-axis direction in the light emission main surface 15B. As described above, when the amount of emission light from both corner portions of the light emission main surface 15B on the side of the LED 13 is locally reduced, brightness unevenness is likely to be visually recognized. In particular, in the present embodiment, since the LED 13 used is of a type having high brightness and a narrow light distribution and the front brightness of the backlight device 12 is improved by the first prism sheet 18 and the second prism sheet 19, the brightness unevenness tends to be visually recognized more.

Figure 7:
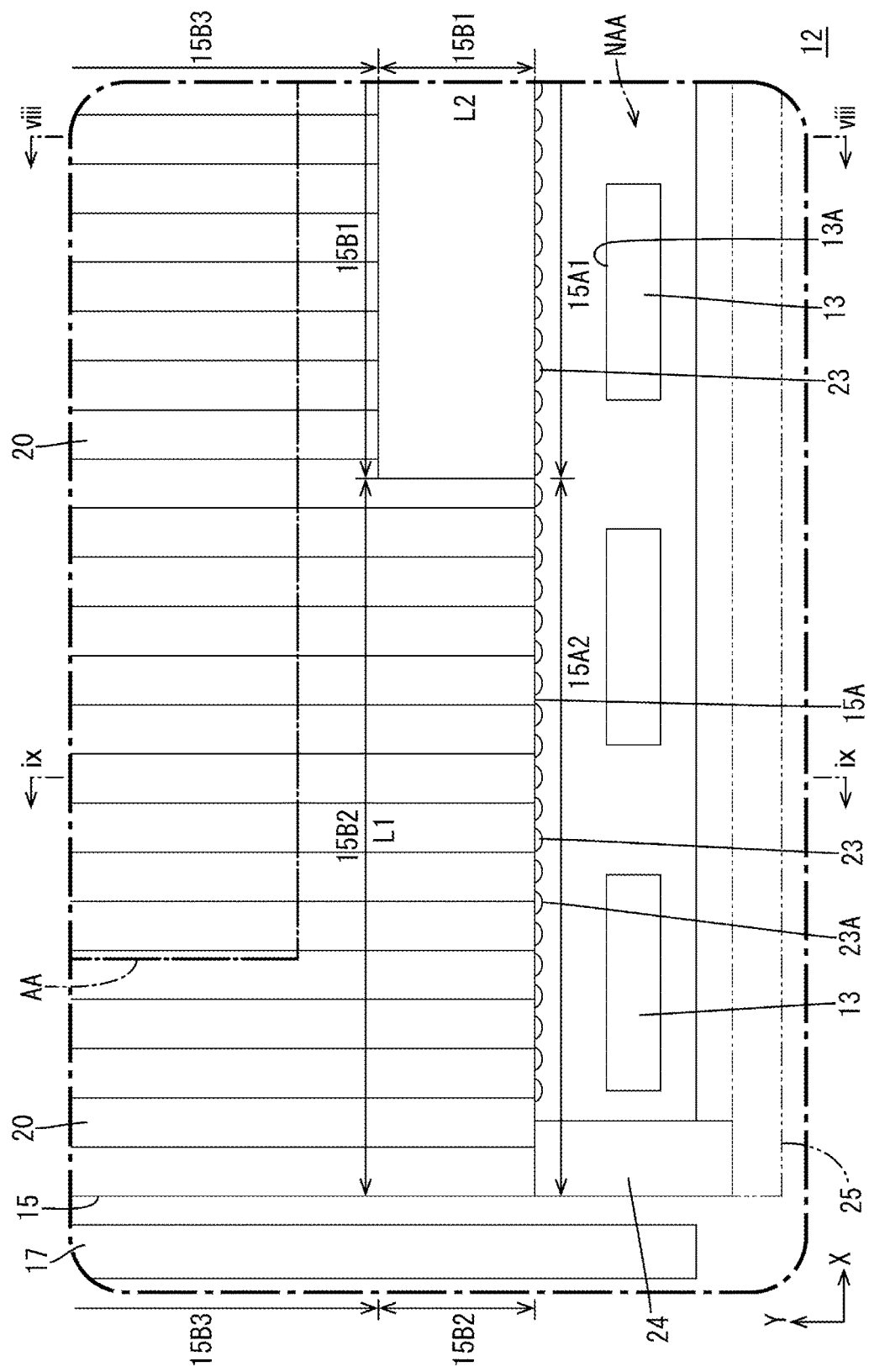
FIG. 7 is a plan view of the backlight device in which the vicinity of a corner portion of the light guide plate on the side of a light incident end face is enlarged.
Figure 8:
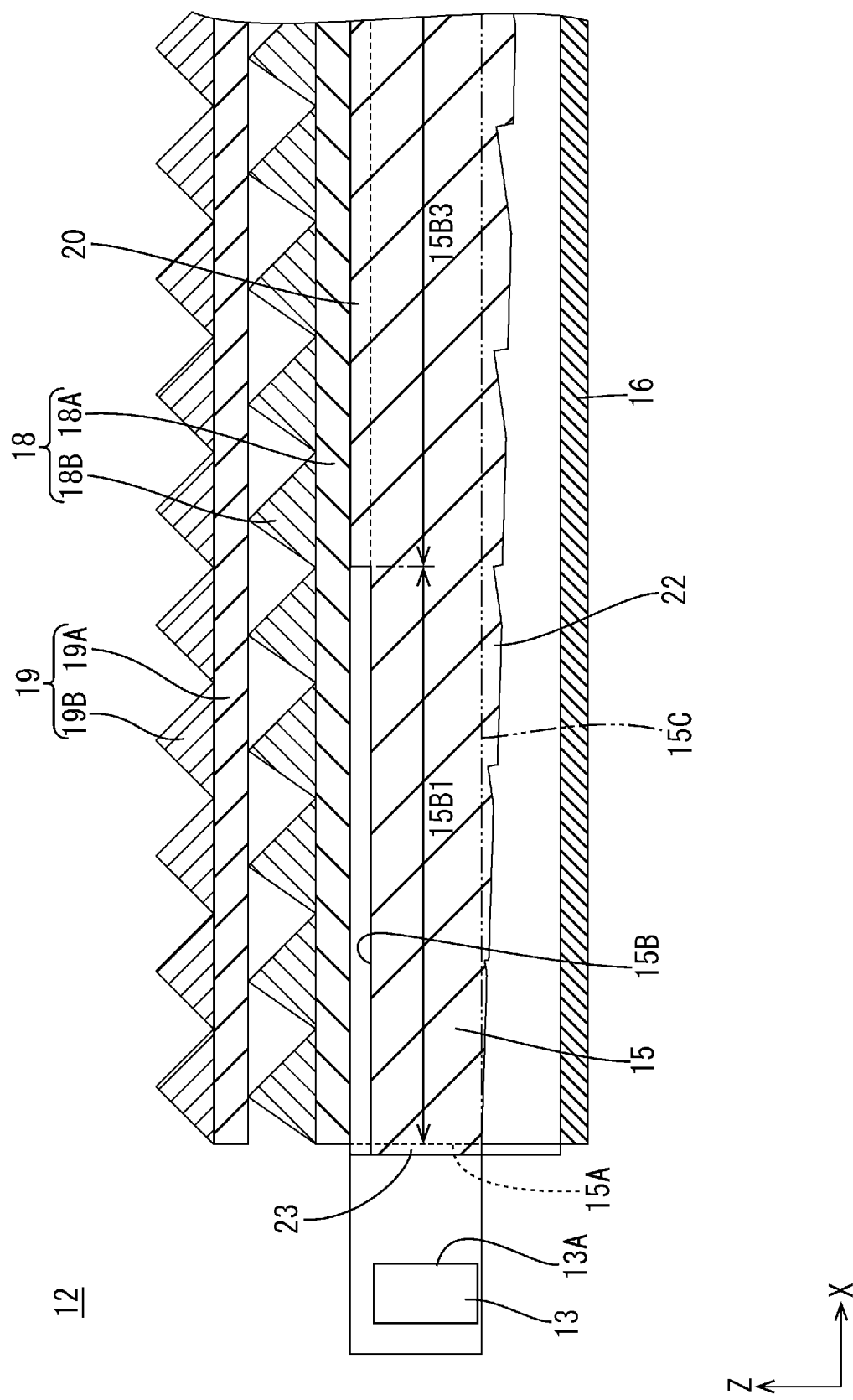
FIG. 8 is a cross-sectional view of the backlight device taken along a line viii-viii in FIG. 7.
Figure 9:
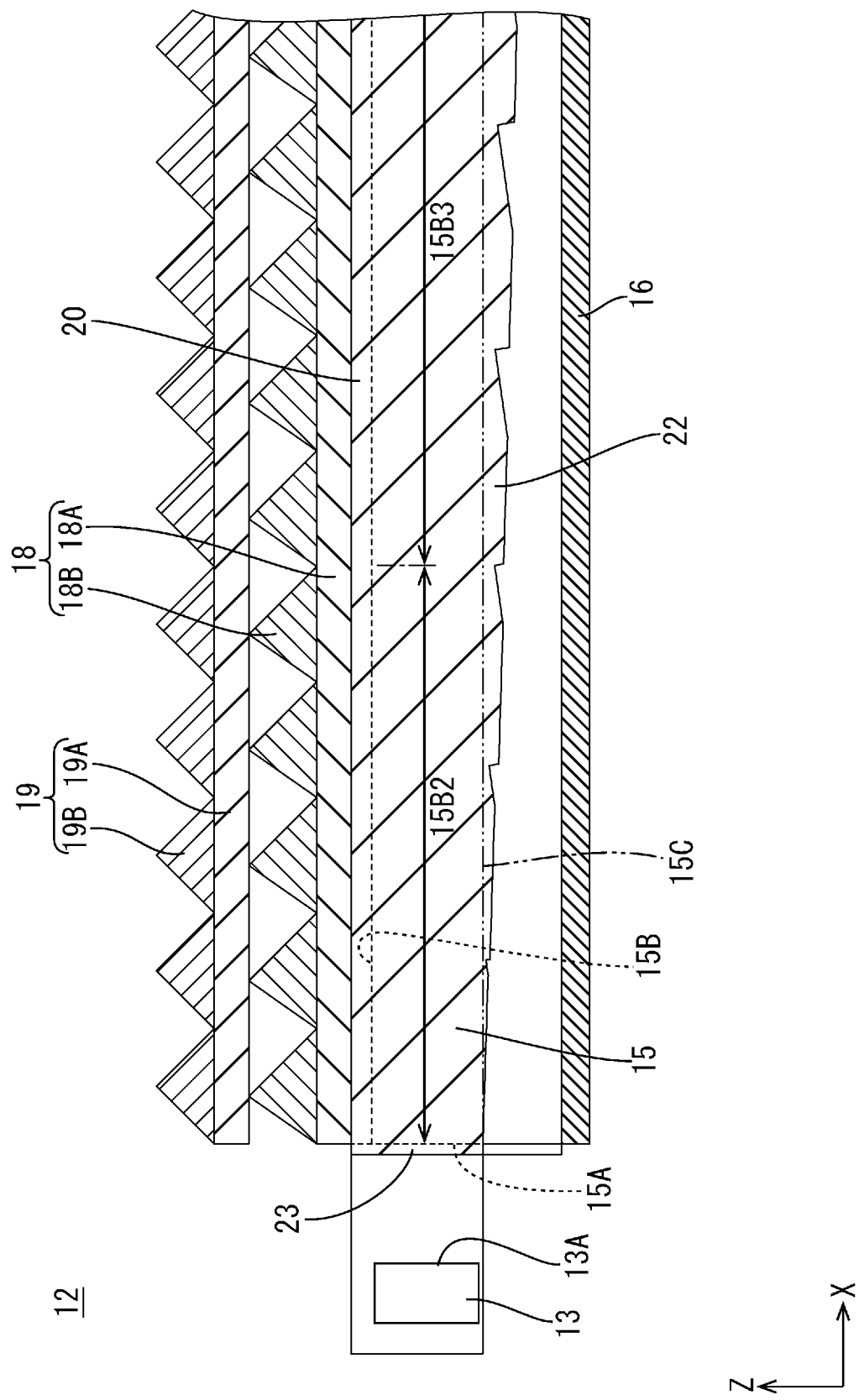
FIG. 9 is a cross-sectional view of the backlight device taken along a line ix-ix in FIG. 7.

As illustrated in FIGS. 6 to 9, the first light guide plate lenses 20 according to the present embodiment are provided partially on the light emission main surface 15B, and the distribution of the first light guide plate lenses 20 on the light emission main surface 15B will be described in detail below. First, the end portion of the light emission main surface 15B on the side of the LED 13 along the X-axis direction is divided into a first region 15B1 located on a center side along the X-axis direction and two second regions 15B2 located on end sides along the X-axis direction. Further, a portion other than the first region 15B1 and the second region 15B2 (a portion excluding the end portion on the side of the LED 13 along the X-axis direction) of the light emission main surface 15B is defined as an other region 15B3. In FIGS. 6 and 7, the boundary between the first region 15B1 and the other region 15B3 is indicated by a thick dashed-dotted line.

As illustrated in FIGS. 6 to 9, in the distribution of the first light guide plate lenses 20 on the light emission main surface 15B, a first occupancy of the first light guide plate lenses 20 in the first region 15B1 is lower than a second occupancy of the first light guide plate lenses 20 in the second region 15B2. The "occupancy" here is a ratio obtained by dividing an area of an arrangement region (formation region) in which the first light guide plate lenses 20 are arranged in the light emission main surface 15B by the sum of areas of the above-described arrangement region and a non-arrangement region (non-formation region) in which no first light guide plate lens 20 is arranged. The occupancy can also be said to be a distribution density of the first light guide plate lenses 20. In the present embodiment, the arrangement interval of the first light guide plate lenses 20 is constant. Thus, it can be said that the "occupancy" is a ratio obtained by dividing the width dimension of the first light guide plate lens 20 by the arrangement interval of the first light guide plate lenses 20. When the occupancy is "100%" in percentage, the width dimension of the first light guide plate lens 20 and the arrangement interval of the first light guide plate lenses 20 have the same value. An occupancy of 100% means that each of the regions 15B1 to 15B3 is constituted exclusively by the arrangement region of the first light guide plate lens 20 and there is no non-arrangement region of the first light guide plate lens 20. An occupancy of "0%" in percentage means that each of the regions 15B1 to 15B3 is constituted exclusively by the non-arrangement region of the first light guide plate lens 20 and there is no arrangement region of the first light guide plate lens 20.

Specifically, in the present embodiment, the first occupancy is 0% and the second occupancy is 100%. The occupancy of the first light guide plate lenses 20 in the other region 15B3 is the same as the second occupancy, that is, 100%. In respective portions on both end sides of the light emission main surface 15B in the X-axis direction, the first light guide plate lens 20 is provided over the entire length in the Y-axis direction. On the other hand, in a portion on a center side of the light emission main surface 15B in the X-axis direction, the first light guide plate lens 20 is provided in a great majority of the side of the LED 13 except on the end portion along the X-axis direction and is not formed selectively in the end portion on the side of the LED 13 along the X-axis direction. Here, in the end portion of the light emission main surface 15B on the side of the LED 13 along the X-axis direction, the amount of light reaching the first region 15B1 located on a center side along the X-axis direction is larger than the amount of light reaching the second regions 15B2 located on the end sides along the X-axis direction. On the other hand, the first occupancy of the first light guide plate lenses 20 in the first region 15B1 is 0%, which is lower than the second occupancy in the second region 15B2. Accordingly, in the first region 15B1, even when a large amount of light reaches, the emission of the light is suppressed, and thus the amount of emission light is less likely to be excessive. In the end portion of the light emission main surface 15B on the side of the LED 13 along the X-axis direction, the amount of light reaching the second regions 15B2 located on the end sides along the X-axis direction is smaller than the amount of light reaching the first region 15B1 located on the center side along the X-axis direction. On the other hand, the second occupancy of the first light guide plate lenses 20 in the second region 15B2 is 100%, which is higher than the first occupancy in the first region 15B1. Accordingly, in the second region 15B2, even when a small amount of light reaches, the emission of the light is promoted, and thus the amount of emission light is less likely to be insufficient. In this way, a difference that may occur in the amount of emission light between the first region 15B1 and the second region 15B2 is reduced, and thus brightness unevenness is less likely to occur in emission light from the light emission main surface 15B.

As illustrated in FIGS. 6 and 7, in the first light guide plate lenses 20, a length L1 of the second region 15B2 along the X-axis direction is, for example, 10 mm, and a length L2 of the first region 15B1 along the Y-axis direction is, for example, 3 mm. The second region 15B2 having the length L1 along the X-axis direction is supplied mainly with light emitted from the LED 13 located at an end in the X-axis direction and the LED 13 located second from the end in the X-axis direction among the plurality of the LEDs 13 arranged in the X-axis direction. That is, the second region 15B2 is located at a portion of the light guide plate 15 facing the above-described two LEDs 13. From this, it can be said that the first region 15B1 is present at a portion of the light guide plate 15 facing a plurality of LEDs 13 located on the center side excluding the two LEDs 13 on both end sides in the X-axis direction. A ratio obtained by dividing the length L1 (10 mm) of the second region 15B2 along the X-axis direction by the arrangement interval (4.84 mm) of the LEDs 13 is 2.07. The first region 15B1 having the length L2 along the Y-axis direction overlaps with a part (a long side portion on the side of the LED 13) of the non-display region NAA having a frame-like shape in a plan view, and does not overlap with the display region AA. Accordingly, emission light from the first region 15B1 is hardly supplied to the display region AA. In this way, since the length L2 of the first region 15B1 along the Y-axis direction is equal to or greater than 2 mm, the amount of light in a center side portion in the X-axis direction of an end portion of the display region AA on the side of the LED 13 along the X-axis direction is sufficiently suppressed, and brightness unevenness can be sufficiently reduced. In addition, since the first region 15B1 overlaps with a part of the non-display region NAA and does not overlap with the display region AA, it is possible to avoid a situation in which the amount of light becomes insufficient in the center side portion in the X-axis direction of the end portion of the display region AA on the side of the LED 13 along the X-axis direction, and good display quality can be maintained.

Next, the distribution of the fourth light guide plate lenses 23 on the light incident end face 15A will be described in detail below. First, the light incident end face 15A is divided into a third region 15A1 located on a center side along the X-axis direction and corresponding to the first region 15B1, and two fourth regions 15A2 located on end sides along the X-axis direction and corresponding to the two second regions 15B2. As illustrated in FIGS. 6 and 7, a plurality of fourth light guide plate lenses 23 are arranged in each of the third region 15A1 and the fourth region 15A2 on the light incident end face 15A. That is, the distribution of the fourth light guide plate lenses 23 on the light incident end face 15A is substantially uniform over the entire length of the light incident end face 15A. The fourth light guide plate lenses 23 distributed as described above can satisfactorily diffuse light incident on the third region 15A1 and the fourth region 15A2 of the light incident end face 15A in the X-axis direction. Accordingly, the amount of light supplied to the second region 15B2 corresponding to the fourth region 15A2 is sufficiently secured, and as a result, brightness unevenness is less likely to occur in emission light emitted from the light emission main surface 15B.

Next, assuming that the distribution of the first light guide plate lenses 20 on the light emission main surface 15B of the light guide plate 15 is made uniform, Verification Experiment 1 was performed in order to obtain knowledge about how brightness distribution changes when the configuration of the fourth light guide plate lenses 23 on the light incident end face 15A is changed. In Verification Experiment 1, the light guide plate 15 was used in which the occupancy of the first light guide plate lenses 20 was 100% in all the first region 15B1, the second region 15B2, and the other region 15B3 in the light emission main surface 15B. In Verification Experiment 1, Comparative Examples 1 to 5 were used in which, among the plurality of fourth light guide plate lenses 23 arranged along the X-axis direction on the light incident end face 15A of the light guide plate 15 having the assumed structure described above, a contact angle θc1 of the fourth light guide plate lens 23 located in the third region 15A1 and a contact angle θc2 of the fourth light guide plate lens 23 located in the fourth region 15A2 were set as follows. In Comparative Example 1, the contact angle θc1 was 38° and the contact angle θc2 was 38°. In Comparative Example 2, the contact angle θc1 was 47° and the contact angle θc2 was 47°. In Comparative Example 3, the contact angle θc1 was 53° and the contact angle θc2 was 53°. In Comparative Example 4, the contact angle θc1 was 38° and the contact angle θc2 was 47°. In Comparative Example 5, the contact angle θc1 was 38° and the contact angle θc2 was 53°. In each of Comparative Examples 1 to 3, the numerical value of the contact angle θc1 was the same as the numerical value of the contact angle θc2. In each of Comparative Examples 4 and 5, the numerical value of the contact angle θc1 and the numerical value of the contact angle θc2 were different from each other.

In Verification Experiment 1, light from the LEDs 13 was incident on the light incident end face 15A of the light guide plate 15 according to each of Comparative Examples 1 to 5 described above, and the brightness of emission light from the light emission main surface 15B was measured. Based on the measured brightness, a graph of brightness distribution (light distribution) of emission light along the X-axis direction in the vicinity of the LEDs 13 along the X-axis direction in the display region AA was created. Further, in Verification Experiment 1, a ratio (with no unit) obtained by dividing minimum brightness of calculated brightness by maximum brightness was calculated. The calculated ratio indicates that uniformity of the brightness distribution is higher with a greater numerical value (closer to a maximum value of 1), and uniformity of the brightness distribution is lower with a smaller numerical value (closer to a minimum value of 0). With regard to this ratio, a reference for evaluating the uniformity of the brightness distribution is "0.8", and it can be said that the uniformity of the brightness distribution is sufficiently high when the ratio is "0.8" or greater, and the uniformity of the brightness distribution is insufficient when the ratio is less than "0.8".

Figure 10:
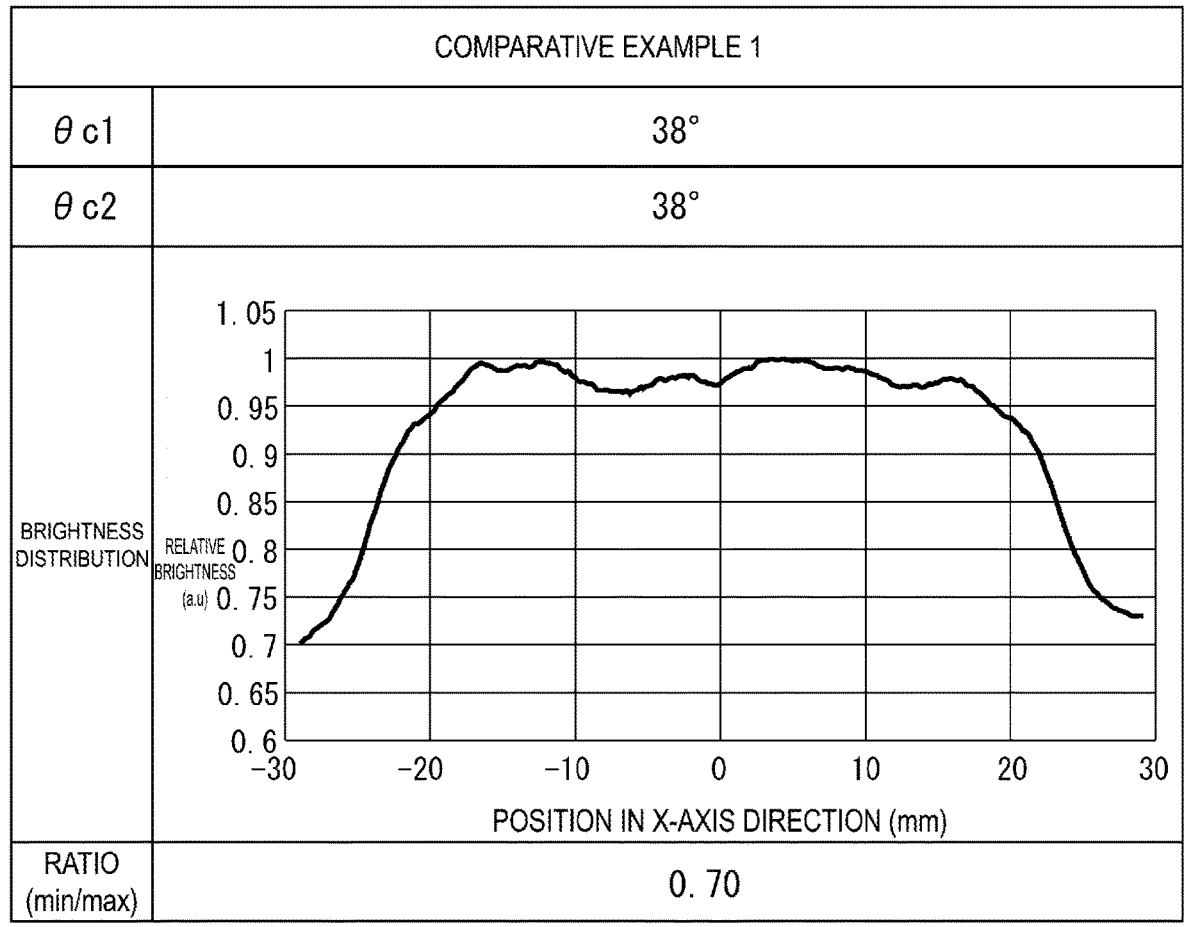
FIG. 10 is a table showing an experimental result of Comparative Example 1 in Verification Experiment 1.
Figure 11:
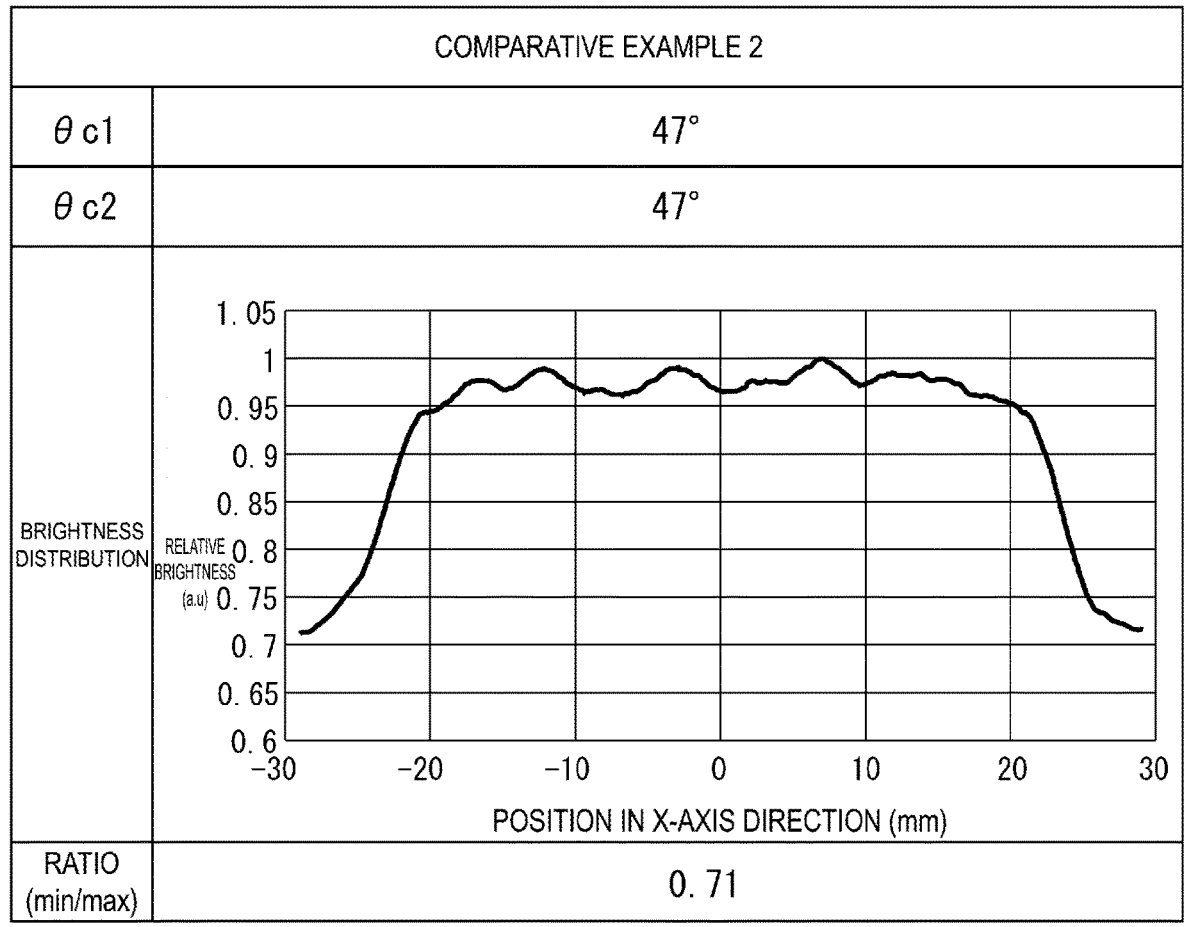
FIG. 11 is a table showing an experimental result of Comparative Example 2 in Verification Experiment 1.
Figure 12:
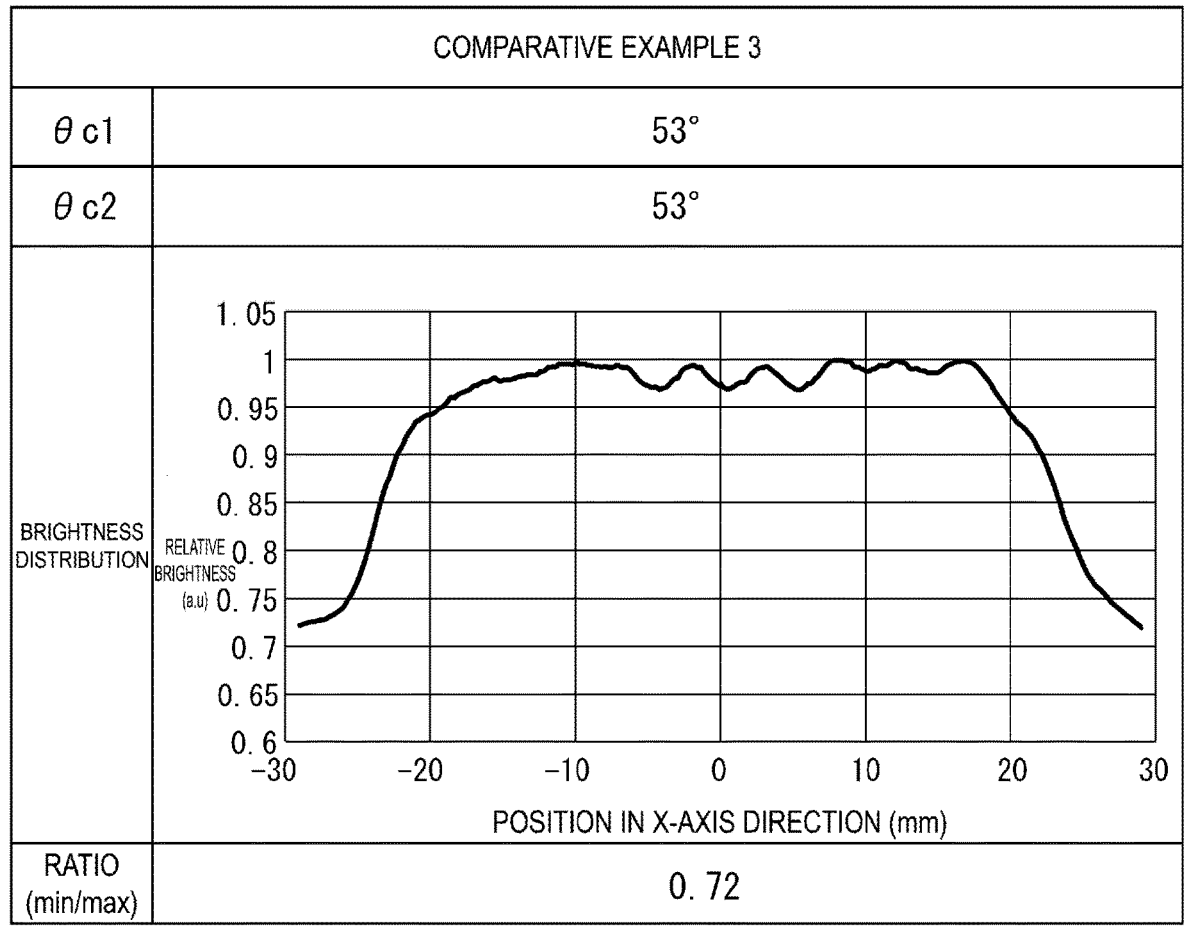
FIG. 12 is a table showing an experimental result of Comparative Example 3 in Verification Experiment 1.
Figure 13:
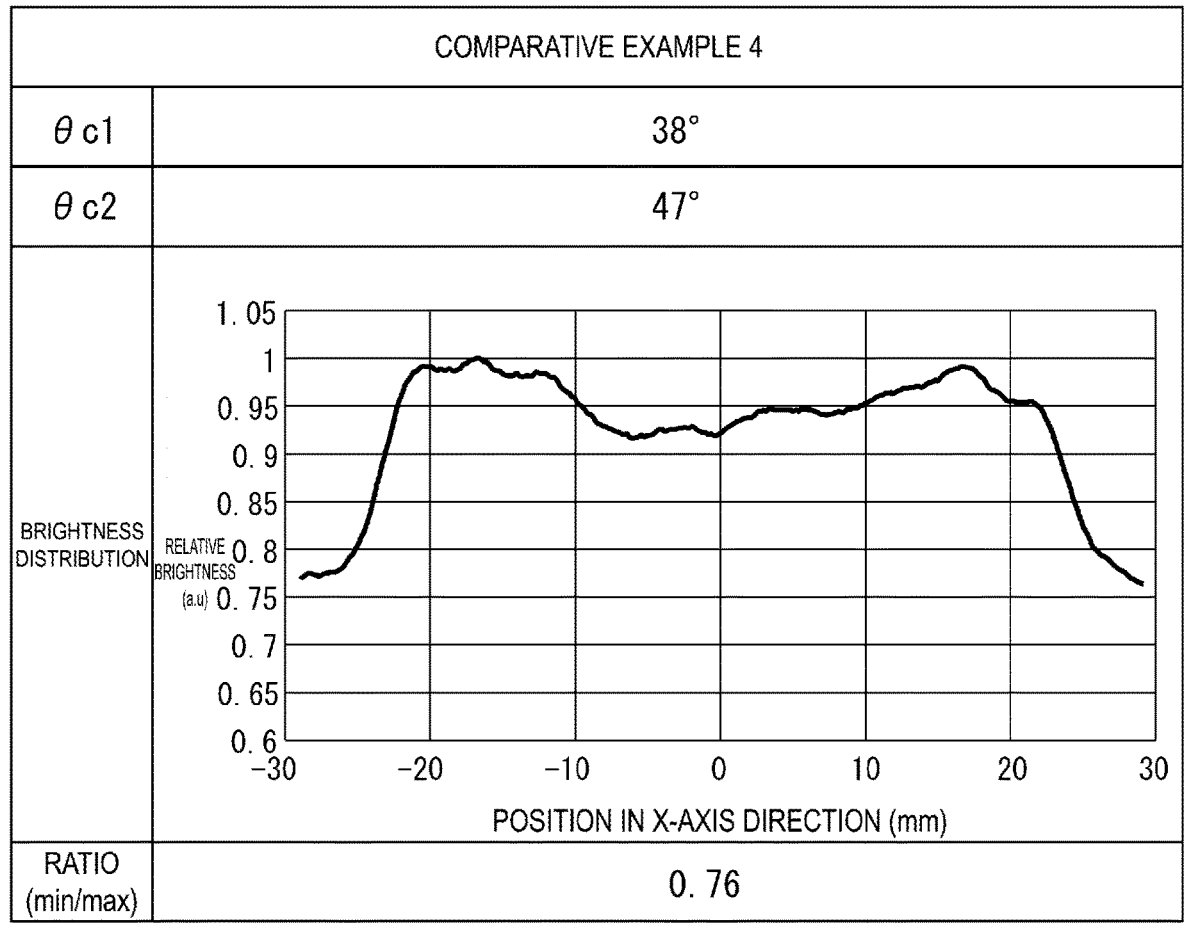
FIG. 13 is a table showing an experimental result of Comparative Example 4 in Verification Experiment 1.
Figure 14:
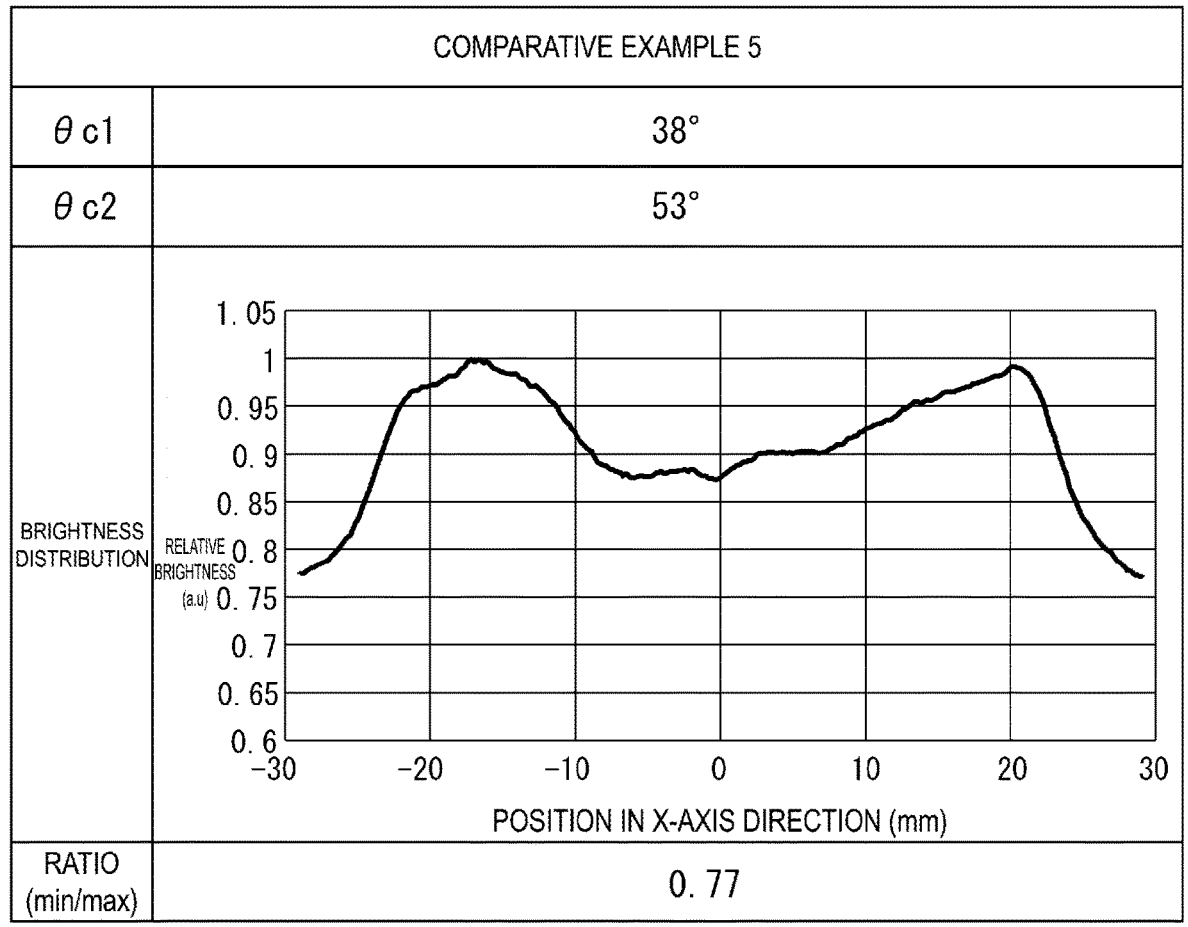
FIG. 14 is a table showing an experimental result of Comparative Example 5 in Verification Experiment 1.

Experimental results of Verification Experiment 1 are as shown in the respective tables in FIGS. 10 to 14. FIG. 10 shows the experimental results of Comparative Example 1, FIG. 11 shows the experimental results of Comparative Example 2, FIG. 12 shows the experimental results of Comparative Example 3, FIG. 13 shows the experimental results of Comparative Example 4, and FIG. 14 shows the experimental results of Comparative Example 5. In each table in FIGS. 10 to 14, a numerical value of the contact angle θc1, a numerical value of the contact angle θc2, a graph of brightness distribution along the X-axis direction, and a ratio obtained by dividing the minimum brightness by the maximum brightness are shown in order from top to bottom. The graphs of brightness distribution along the X-axis direction in FIGS. 10 to 14 show the brightness from one end position to another end position along the X-axis direction at a position on the light emission main surface 15B at which the distance from the light incident end face 15A is 5.5 mm. In Verification Experiment 1, the distance from the light incident end face 15A to the display region AA was 5 mm. The horizontal axis of each of the graphs illustrated in FIGS. 10 to 14 represents a position with reference to the center position (0 mm) in the X-axis direction, and the unit thereof is "mm". Of the positive and negative symbols assigned to the horizontal axis of each of the graphs illustrated in FIGS. 10 to 14, "− (minus)" means a left side along the X-axis direction with respect to the center position in the X-axis direction, and "+ (plus)" means a right side along the X-axis direction with respect to the center position in the X-axis direction. The vertical axis of each of the graphs illustrated in FIGS. 10 to 14 represents relative brightness (with no unit). The relative brightness is a relative value with the maximum brightness as a reference (1).

The light guide plate 15 for Verification Experiment 1 has a long-side dimension (dimension in the X-axis direction) of, for example, approximately 62 mm, and a short-side dimension (dimension in the Y-axis direction) of, for example, approximately 35 mm. Thirteen LEDs 13 arranged along the X-axis direction are disposed facing the light incident end face 15A of the light guide plate 15 for Verification Experiment 1. The distance between the light incident end face 15A and the LEDs 13 of the light guide plate 15 for Verification Experiment 1 is, for example, approximately 0.4 mm. The arrangement interval between the LEDs 13 (interval between center positions along the X-axis direction) for Verification Experiment 1 is, for example, approximately 4.84 mm. The arrangement interval between the first light guide plate lenses 20 (interval between center positions along the X-axis direction) included in the light guide plate 15 for Verification Experiment 1 is, for example, approximately 0.041 mm. The contact angle of the first light guide plate lens 20 included in the light guide plate 15 for Verification Experiment 1 is, for example, approximately 51°. The arrangement interval between the fourth light guide plate lenses 23 (interval between center positions along the X-axis direction) included in the light guide plate 15 for Verification Experiment 1 is, for example, approximately 0.0235 mm.

The experimental results of Verification Experiment 1 will be described with reference to FIGS. 10 to 14. According to FIGS. 10 to 12, comparison between Comparative Examples 1 to 3 shows that, as the numerical values of the contact angles θc1 and θc2 increase, the ratio obtained by dividing the minimum brightness by the maximum brightness tends to increase. However, Comparative Examples 1 to 3 are not significantly different from each other in the ratio obtained by dividing the minimum brightness by the maximum brightness, and in the uniformity of the brightness distribution. That is, when the contact angles θc1 and θc2 are equal to each other, there is almost no change in the balance of brightness between end sides and a center side in the X-axis direction. According to FIGS. 10, 13, 14, comparison between Comparative Examples 1, 4, and 5 shows that the ratio obtained by dividing the minimum brightness by the maximum brightness is higher and the uniformity of the brightness distribution is better in Comparative Examples 4 and 5 in which the contact angle θc2 is larger than the contact angle θc1 than in Comparative Example 1 in which the contact angles θc1 and θc2 are the same value. In comparison with the fourth light guide plate lenses 23 present in the third region 15A1 located on the center side along the X-axis direction, it can be assumed that since the degree of diffusion of light by the fourth light guide plate lenses 23 present in the fourth regions 15A2 located on the end sides along the X-axis direction was increased, the amount of emission light on the end sides of the light emission main surface 15B in the X-axis direction was increased, and as a result, the difference in brightness between the end sides and the center side in the X-axis direction was reduced. However, in Comparative Examples 4 and 5, the maximum brightness was obtained at positions near ±20 mm, and the brightness was relatively reduced on the center side (the range from 0 mm to ±10 mm) in the X-axis direction. In addition, even in Comparative Example 5 in which the numerical value of the ratio was the highest, the numerical value was "0.77", which was lower than "0.8" which is the reference for evaluating the uniformity of the brightness distribution. Thus, it can be said that the uniformity of the brightness distribution was not sufficient in any of Comparative Examples 1 to 5. That is, even if only the design concerning the contact angles θc1 and θc2 of the fourth light guide plate lens 23 is devised, a sufficient effect of improving the uniformity of the brightness distribution cannot be expected.

Next, using the light guide plate 15 described in the paragraphs before Verification Experiment 1, Comparative Experiment 1 was performed in order to obtain knowledge about how the brightness distribution changes when the length L2 along the Y-axis direction of the first region 15B1 in the light emission main surface 15B is changed. In Comparative Experiment 1, the light guide plate 15 was used in which the occupancy of the first light guide plate lenses 20 was 0% in the first region 15B1, and the occupancy of the first light guide plate lenses 20 was 100% in the second region 15B2 and the other region 15B3 in the light emission main surface 15B. In Comparative Experiment 1, Examples 1 to 3 in which the length L2 of the first region 15B1 along the Y-axis direction was set as follows were used. In Example 1, the length L2 is 1 mm. In Example 2, the length L2 is 2 mm. In Example 3, the length L2 is 3 mm. In Examples 1 to 3, the length L1 of the second region 15B2 along the X-axis direction is 10 mm. In Examples 1 to 3, all numerical values of the long-side dimension and the short-side dimension of the light guide plate 15, the number of LEDs 13 installed, the distance between the light incident end face 15A and the LEDs 13, the arrangement interval of the LEDs 13, the arrangement interval of the first light guide plate lenses 20, the contact angle of the first light guide plate lens 20, and the arrangement interval of the fourth light guide plate lenses 23 are the same as those in Verification Experiment 1.

Figure 15:
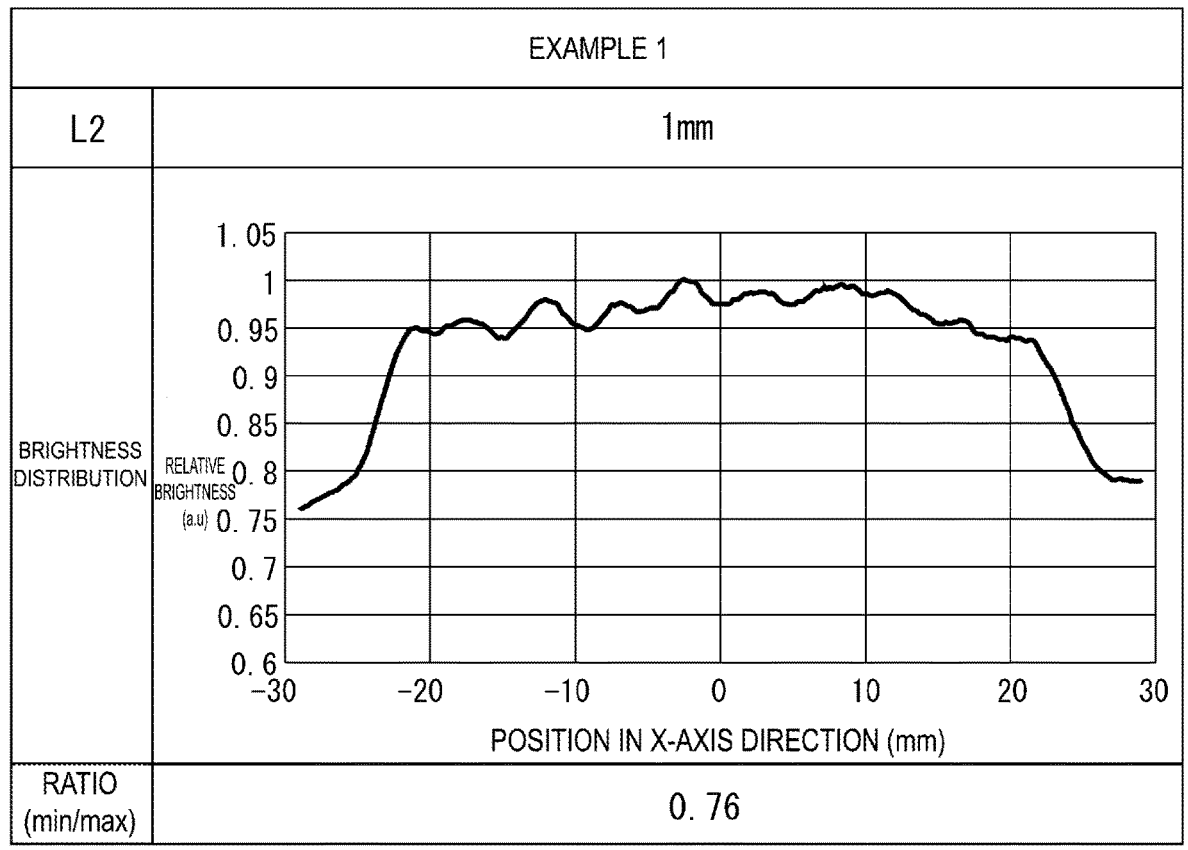
FIG. 15 is a table showing an experimental result of Example 1 in Comparative Experiment 1.
Figure 16:
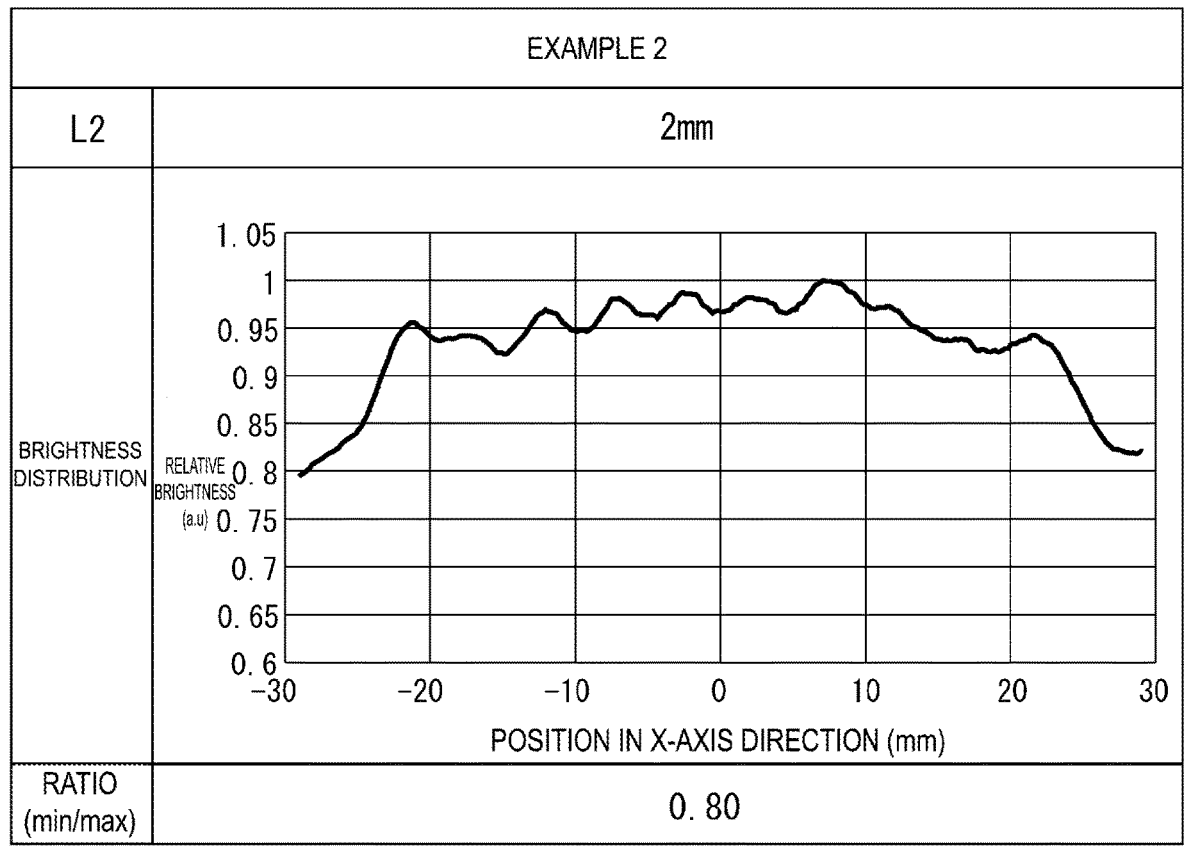
FIG. 16 is a table showing an experimental result of Example 2 in Comparative Experiment 1.
Figure 17:
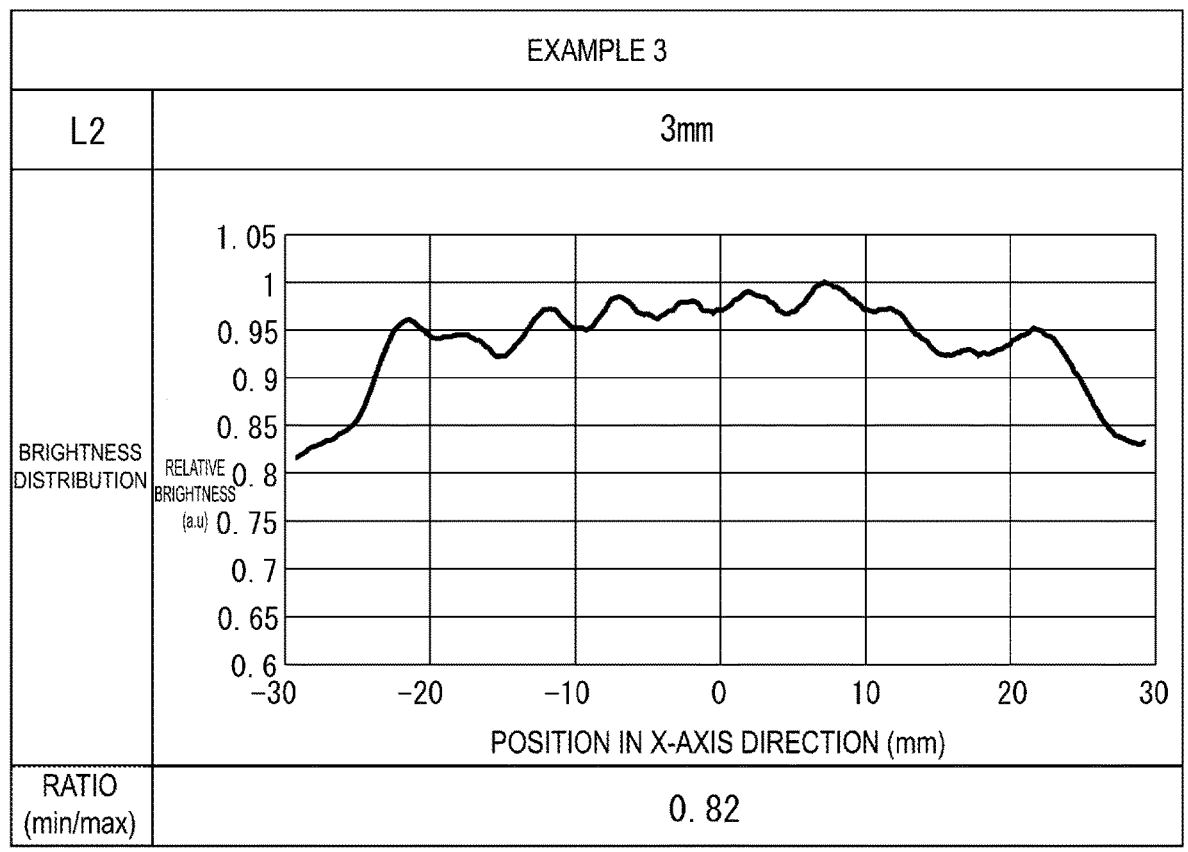
FIG. 17 is a table showing an experimental result of Example 3 in Comparative Experiment 1.

In Comparative Experiment 1, light from the LEDs 13 was incident on the light incident end face 15A of the light guide plate 15 according to each of Examples 1 to 3 described above, and the brightness of emission light from the light emission main surface 15B was measured. Based on the measured brightness, a graph of brightness distribution (light distribution) of emission light along the X-axis direction in the vicinity of the LEDs 13 along the X-axis direction in the display region AA was created. Further, in Comparative Experiment 1, a ratio (with no unit) obtained by dividing minimum brightness of calculated brightness by maximum brightness was calculated. The calculated ratio is as described in Verification Experiment 1. Experimental results of Comparative Experiment 1 are as shown in the tables in FIGS. 15 to 17. FIG. 15 shows the experimental results of Example 1, FIG. 16 shows the experimental results of Example 2, and FIG. 17 shows the experimental results of Example 3. In each table in FIGS. 15 to 17, a numerical value of the length L2, a graph of brightness distribution along the X-axis direction, and a ratio obtained by dividing the minimum brightness by the maximum brightness are shown in order from top to bottom. The graphs of the brightness distribution along the X-axis direction illustrated in FIGS. 15 to 17 are as described in Verification Experiment 1.

The experimental results of Comparative Experiment 1 will be described with reference to FIGS. 15 to 17. According to FIGS. 15 to 17, in all of Examples 1 to 3, the maximum brightness was obtained on a center side (range from 0 mm to ±10 mm) in the X-axis direction, and reduction in brightness on the center side in the X-axis direction which occurred in Comparative Examples 4 and 5 (see FIGS. 13 and 14) in Verification Experiment 1 was not observed. However, in Example 1, since the numerical value of the ratio obtained by dividing the minimum brightness by the maximum brightness was lower than "0.8" which is the reference for evaluating the uniformity of the brightness distribution, it can be said that the uniformity of the brightness distribution was not sufficiently improved. On the other hand, in each of Examples 2 and 3, since the numerical value of the ratio was 0.8 or higher, it can be said that the uniformity of the brightness distribution was sufficiently improved. Therefore, the length L2 is preferably equal to or greater than 2 mm. Further, comparing Examples 2 and 3, as the length L2 increased, the ratio obtained by dividing the minimum brightness by the maximum brightness increased, and thus it can be said that the uniformity of the brightness distribution was further improved. Therefore, the length L2 is more preferably equal to or greater than 3 mm. As the length L2 increases, the uniformity of the brightness distribution tends to be further improved. However, when the length L2 exceeds the width of a side portion of the non-display region NAA on the side of the LED 13, a relationship in which a part of the first region 15B1 overlaps with the display region AA is established. In such a relationship, a local dark portion is generated in a portion of the display region AA overlapping with the first region 15B1, and there is a concern that the display quality is significantly deteriorated. Thus, the upper limit value of the length L2 is preferably a numerical value at which the first region 15B1 is maintained in a state of not overlapping with the display region AA.

Next, using the light guide plate 15 described in the paragraphs before Verification Experiment 1, Comparative Experiment 2 was performed in order to obtain knowledge about how the brightness distribution changes when the length L1 along the X-axis direction of the second region 15B2 in the light emission main surface 15B is changed. In Comparative Experiment 2, the light guide plate 15 was used in which the occupancy of the first light guide plate lenses 20 was 0% in the first region 15B1, and the occupancy of the first light guide plate lenses 20 was 100% in the second region 15B2 and the other region 15B3 in the light emission main surface 15B. In Comparative Experiment 2, Examples 4 to 6 in which the length L1 of the second region 15B2 along the X-axis direction was set as follows were used. In Example 4, the length L1 is 5 mm. In Example 5, the length L1 is 10 mm. In Example 6, the length L1 is 15 mm. A ratio obtained by dividing the length L1 of the second region 15B2 along the X-axis direction by the arrangement interval (4.84 mm) of the LEDs 13 is 1.03 in Example 4, 2.07 in Example 5, and 3.1 in Example 6. Thus, the second region 15B2 in Example 4 was supplied mainly with light emitted from one LED 13 located at an end in the X-axis direction, the second region 15B2 in Example 5 was supplied mainly with light emitted from two LEDs 13 from an end in the X-axis direction, and the second region 15B2 in Example 6 was supplied mainly with light emitted from three LEDs 13 from an end in the X-axis direction. Note that, in all of Examples 4 to 6, the length L2 of the first region 15B1 along the Y-axis direction is 3 mm. Thus, Example 5 in Comparative Experiment 2 has the same structure as Example 3 in Comparative Experiment 1. In Examples 4 to 6, all numerical values of the long-side dimension and the short-side dimension of the light guide plate 15, the number of LEDs 13 installed, the distance between the light incident end face 15A and the LEDs 13, the arrangement interval of the LEDs 13, the arrangement interval of the first light guide plate lenses 20, the contact angle of the first light guide plate lens 20, and the arrangement interval of the fourth light guide plate lenses 23 are the same as those in Verification Experiment 1.

Figure 18:
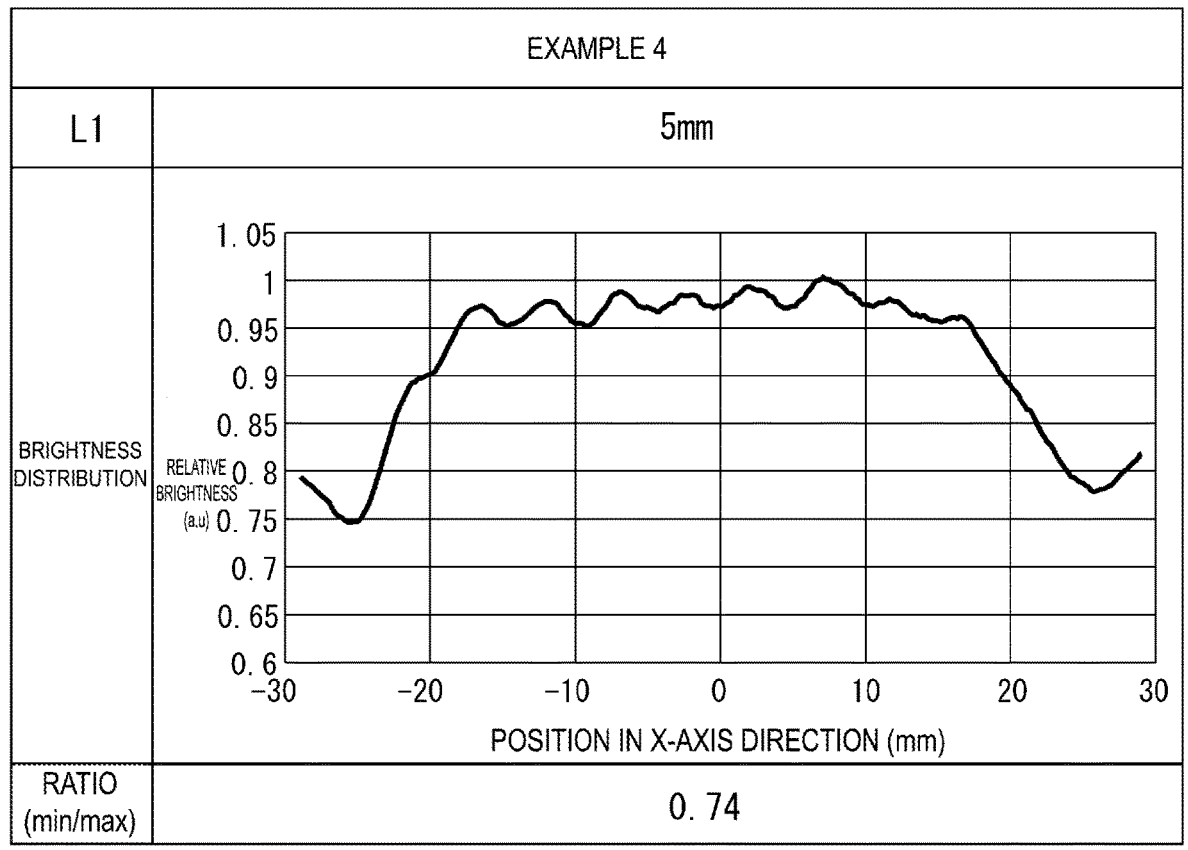
FIG. 18 is a table showing an experimental result of Example 4 in Comparative Experiment 2.
Figure 19:
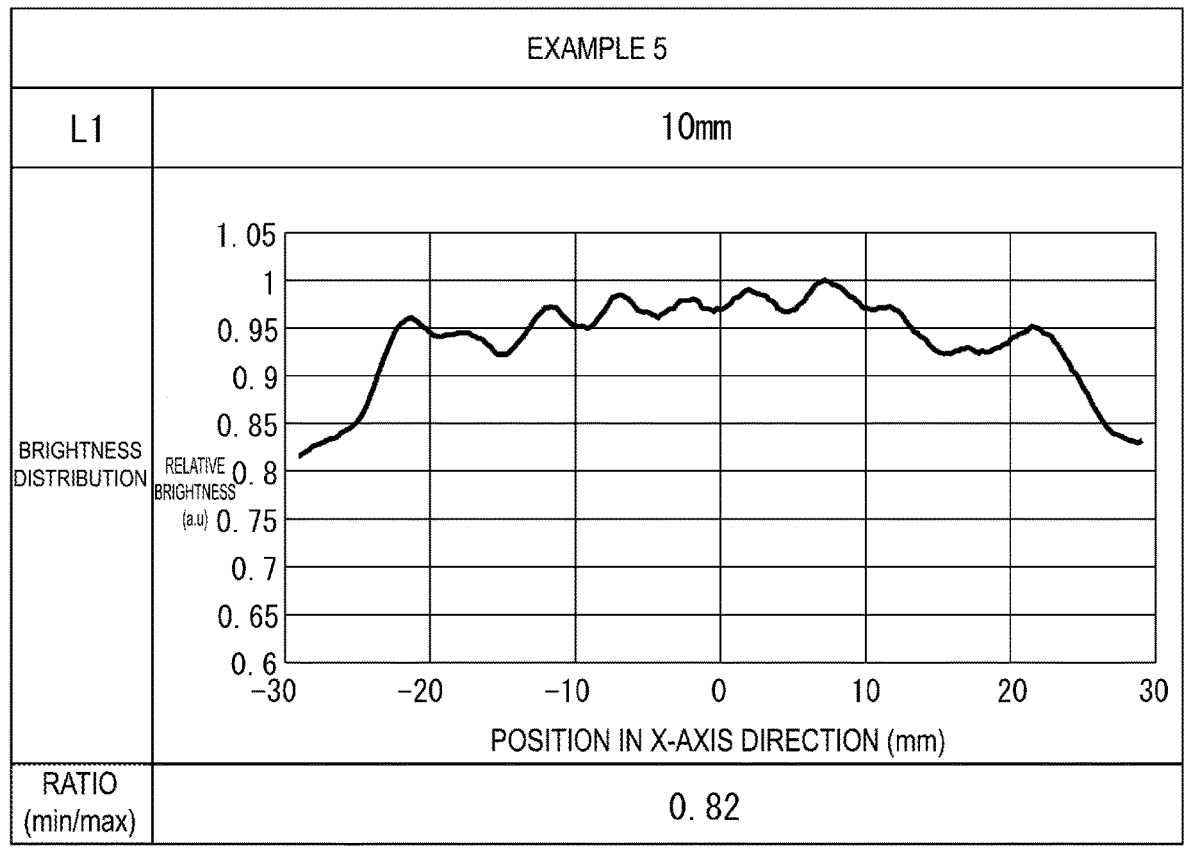
FIG. 19 is a table showing an experimental result of Example 5 in Comparative Experiment 2.
Figure 20:
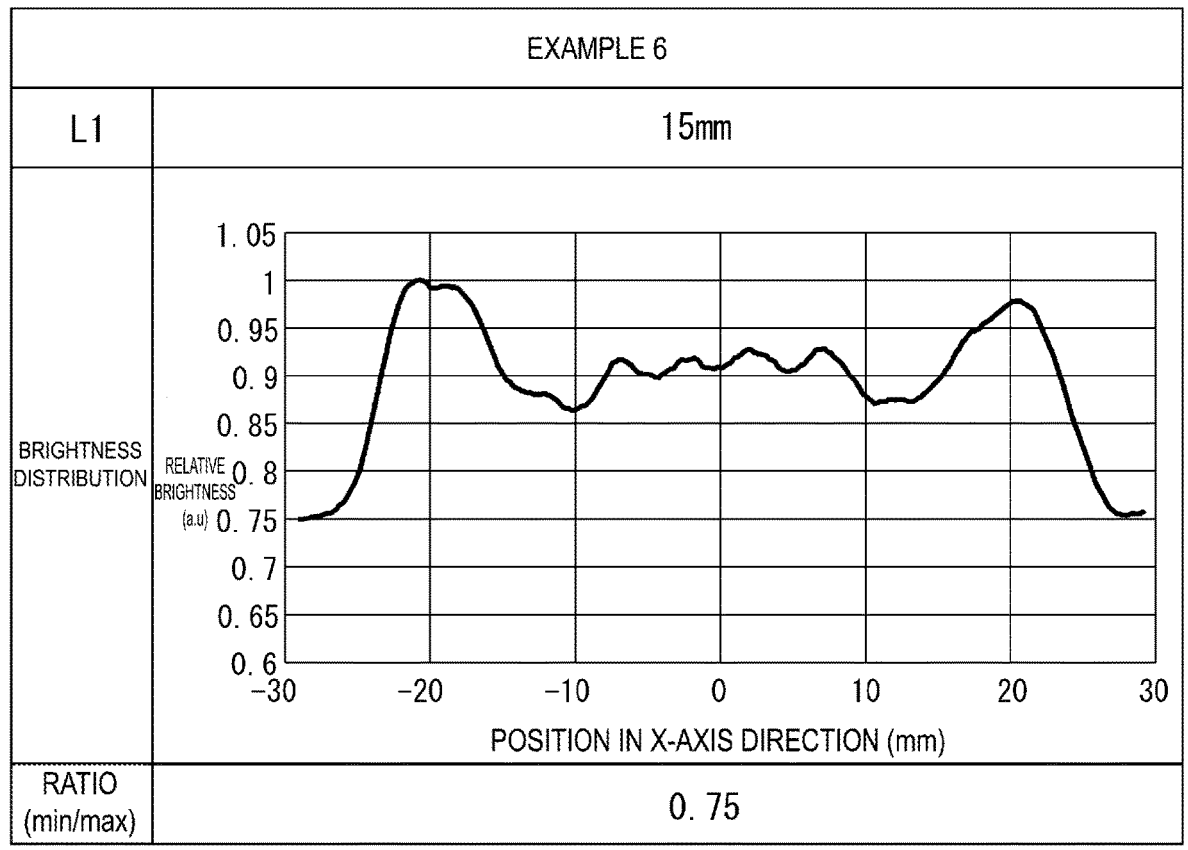
FIG. 20 is a table showing an experimental result of Example 6 in Comparative Experiment 2.

In Comparative Experiment 2, light from the LEDs 13 was incident on the light incident end face 15A of the light guide plate 15 according to each of Examples 4 to 6 described above, and the brightness of emission light from the light emission main surface 15B was measured. Based on the measured brightness, a graph of brightness distribution (light distribution) of emission light along the X-axis direction in the vicinity of the LEDs 13 along the X-axis direction in the display region AA was created. Further, in Comparative Experiment 2, a ratio (with no unit) obtained by dividing minimum brightness of calculated brightness by maximum brightness was calculated. The calculated ratio is as described in Verification Experiment 1. Experimental results of Comparative Experiment 2 are as shown in the tables in FIGS. 18 to 20. FIG. 18 shows the experimental results of Example 4, FIG. 19 shows the experimental results of Example 5, and FIG. 20 shows the experimental results of Example 6. In each table in FIGS. 18 to 20, a numerical value of the length L1, a graph of brightness distribution along the X-axis direction, and a ratio obtained by dividing the minimum brightness by the maximum brightness are shown in order from top to bottom. The graphs of the brightness distribution along the X-axis direction illustrated in FIGS. 18 to 20 are as described in Verification Experiment 1.

The experimental results of Comparative Experiment 2 will be described with reference to FIGS. 18 to 20. According to FIGS. 18 and 19, in both Examples 4 and 5, the maximum brightness was obtained on a center side (range from 0 mm to ±10 mm) in the X-axis direction, and reduction in brightness on the center side in the X-axis direction which occurred in Comparative Examples 4 and 5 (see FIGS. 13 and 14) in Verification Experiment 1 was not observed. On the other hand, according to FIG. 20, in Example 6, the maximum brightness was obtained at positions near ±20 mm, and the brightness was relatively reduced on the center side in the X-axis direction. Further, in Example 6, since the numerical value of the ratio obtained by dividing the minimum brightness by the maximum brightness was lower than "0.8" which is the reference for evaluating the uniformity of the brightness distribution, it can be said that the uniformity of the brightness distribution was not sufficiently improved. Such a result is considered to be attributable to an excessive amount of light supplied to the second region 15B2. Therefore, in order to avoid the reduction in brightness on the center side in the X-axis direction, the number of LEDs 13 mainly supplying light to the second region 15B2 is preferably less than three.

Examples 4 and 5 are compared with each other. According to FIG. 18, in Example 4, there was a significant reduction in brightness, that is, a relative brightness less than 0.8, on both end sides (near ±25 mm) in the X-axis direction. On the other hand, according to FIG. 19, in Example 5, the relative brightness was 0.8 or higher on both end sides in the X-axis direction. In Example 4, the numerical value of the ratio obtained by dividing the minimum brightness by the maximum brightness was 0.74 which is lower than the reference value. On the other hand, in Example 5, the numerical value of the ratio was 0.82 which exceeds the reference value. Note that the experimental results of Example 5 are the same as the experimental results of Example 3 in Comparative Experiment 1. Based on the above examination, it can be said that the uniformity of the brightness distribution was sufficiently improved in Example 5. Poor uniformity of the brightness distribution in Example 4 is considered to be attributable to an insufficient amount of light supplied to the second region 15B2. Therefore, in order to avoid the reduction in brightness on the center side in the X-axis direction, and to secure sufficient brightness on both end sides in the X-axis direction, the number of LEDs 13 mainly supplying light to the second region 15B2 is more than one and less than three. That is, when a ratio obtained by dividing the length L1 of the second region 15B2 along the X-axis direction by the arrangement interval of the LEDs 13 is defined as "r1", the ratio r1 preferably satisfies a range of "1<r1<3".

As described above, the backlight device (illumination device) 12 according to the present embodiment includes: the plurality of LEDs 13 (light sources) arranged in a row; the light guide plate 15 having a plate shape and including the light incident end face (first end face) 15A at an outer peripheral end face of the light guide plate 15 and the light emission main surface (first main surface) 15B included in a pair of main surfaces of the light guide plate 15, the light incident end face 15A facing the plurality of LEDs 13 and being configured to receive incident light, the light emission main surface 15B being configured to emit light; and the plurality of first light guide plate lenses (first lenses) 20 disposed at the light emission main surface 15B, arranged along a first direction, and extending along a second direction, the first direction being an arrangement direction of the plurality of LEDs 13, the second direction intersecting the first direction and extending along the light emission main surface 15B. The first light guide plate lenses 20 are configured such that, when an end portion of the light emission main surface 15B on the side of the LEDs 13 along the first direction is divided into the first region 15B1 located on a center side along the first direction and the second region 15B2 located on an end side along the first direction, a first occupancy of the first light guide plate lenses 20 in the first region 15B1 is lower than a second occupancy of the first light guide plate lenses 20 in the second region 15B2.

Light emitted from the plurality of LEDs 13 is incident on the light incident end face 15A of the light guide plate 15, propagates inside the light guide plate 15, and the reaches the light emission main surface 15B. The light having reached the light emission main surface 15B includes light totally reflected or refracted by the first light guide plate lenses 20. The light totally reflected by the first light guide plate lenses 20 travels in a direction away from the LEDs 13 along the second direction. The light refracted by the first light guide plate lenses 20 is promoted to be emitted from the light emission main surface 15B. In the end portion of the light emission main surface 15B on the side of the LED 13 along the first direction, the amount of light reaching the first region 15B1 located on the center side along the first direction is larger than the amount of light reaching the second region 15B2 located on the end side along the first direction. On the other hand, the first occupancy of the first light guide plate lenses 20 in the first region 15B1 is lower than the second occupancy in the second region 15B2. Accordingly, in the first region 15B1, even when a large amount of light reaches, the emission of the light is suppressed, and thus the amount of emission light is less likely to be excessive. In the end portion of the light emission main surface 15B on the side of the LED 13 along the first direction, the amount of light reaching the second region 15B2 located on the end side along the first direction is smaller than the amount of light reaching the first region 15B1 located on the center side along the first direction. On the other hand, the second occupancy of the first light guide plate lenses 20 in the second region 15B2 is higher than the first occupancy in the first region 15B1. Accordingly, in the second region 15B2, even when a small amount of light reaches, the emission of the light is promoted, and thus the amount of emission light is less likely to be insufficient. In this way, a difference that may occur in the amount of emission light between the first region 15B1 and the second region 15B2 is reduced, and thus brightness unevenness is less likely to occur in emission light from the light emission main surface 15B.

In addition, the plurality of fourth light guide plate lenses (second lenses) 23 are provided at the light incident end face 15A, arranged along the first direction, and extend along a third direction, the third direction intersecting the first direction and extending along the light incident end face 15A. Light emitted from the LEDs 13 and having reached the light incident end face 15A includes light refracted by the fourth light guide plate lenses 23. The light refracted by the fourth light guide plate lenses 23 is incident inside the light guide plate 15 while being diffused in the first direction. Accordingly, in the end portion of the light emission main surface 15B on the side of the LED 13 along the first direction, the amount of light supplied to the second region 15B2 located on the end side along the first direction increases. As a result, brightness unevenness is even less likely to occur in emission light emitted from the light emission main surface 15B.

In addition, when the light incident end face 15A is divided into the third region 15A1 located on a center side along the first direction and corresponding to the first region 15B1 and the fourth region 15A2 located on an end side along the first direction and corresponding to the second region 15B2, more than one of the fourth light guide plate lenses 23 are disposed in each of the third region 15A1 and the fourth region 15A2. Light incident on the third region 15A1 and the fourth region 15A2 of the light incident end face 15A is diffused in the first direction by the plurality of fourth light guide plate lenses 23 disposed in each of the third region 15A1 and the fourth region 15A2. Accordingly, the amount of light supplied to the second region 15B2 corresponding to the fourth region 15A2 is further increased. As a result, brightness unevenness is even less likely to occur in emission light emitted from the light emission main surface 15B.

The first light guide plate lens 20 is not disposed in the first region 15B1 and the first occupancy is 0%. In the first region 15B1, emission of light is not promoted by the first light guide plate lens 20. Accordingly, in the first region 15B1, even when a large amount of light reaches, the emission of the light is efficiently suppressed, and thus an excessive amount of emission light can be avoided. As a result, brightness unevenness is even less likely to occur in emission light emitted from the light emission main surface 15B.

In addition, the protruding portion 24 disposed at an end portion of the light incident end face 15A of the light guide plate 15 along the third direction and protruding from the light incident end face 15A along the second direction, and the receiving portion 25 spaced apart from the light incident end face 15A of the light guide plate 15 in the second direction and configured to receive the protruding portion 24, are provided. Since the protruding portion 24 is received by the receiving portion 25, the positional relationship between the LEDs 13 and the light incident end face 15A in the second direction is stably maintained. Accordingly, since the temperature of the LED 13, which generates heat in association with the light emission, is less likely to rise, the LED 13 is less likely to fail. In particular, it is suitable for a case where the LED 13 has a high brightness and generates a large amount of heat. On the other hand, when the protruding portion 24 is provided at the end portion of the light incident end face 15A of the light guide plate 15 along the third direction, the LEDs 13 need to be disposed avoiding the protruding portion 24, and thus the amount of light supplied to the second region 15B2 of the light emission main surface 15B2 tends to be reduced. In this regard, since the second occupancy of the first light guide plate lenses 20 in the second region 15B2 is higher than the first occupancy in the first region 15B1, emission of light is promoted even when the amount of light reaching the second region 15B2 is small. Accordingly, the amount of emission light in the second region 15B2 is less likely to be insufficient, and brightness unevenness is less likely to occur in emission light emitted from the light emission main surface 15B.

In addition, the first prism sheet 18 disposed facing the light emission main surface 15B with respect to the light guide plate 15, and the second prism sheet 19 disposed on the side opposite to the light guide plate 15 with respect to the first prism sheet 18, are provided. The first prism sheet 18 includes the light emission main surface (third main surface) 18A1 facing the side opposite to the light guide plate 15. The light emission main surface 18A1 is provided with the plurality of first prisms 18B extending along the first direction and arranged along the second direction. The second prism sheet 19 includes the light emission main surface (fourth main surface) 19A1 facing the side opposite to the first prism sheet 18. The light emission main surface 19A1 is provided with the plurality of second prisms 19B extending along the first direction and arranged along the second direction. When light emitted from the light emission main surface 15B of the light guide plate 15 is incident on the first prism sheet 18, the light is selectively imparted with a condensing action in the second direction by the plurality of first prisms 18B extending along the first direction on the light emission main surface 18A1, and is then emitted toward the second prism sheet 19. When the light emitted from the first prism sheet 18 is incident on the second prism sheet 19, the light is selectively imparted with the condensing action in the second direction by the plurality of second prisms 19B extending along the first direction on the light emission main surface 19A1, and is then emitted to the outside. By adjusting the angles or the like of respective oblique sides of the first prism 18B and the second prism 19B, the condensing action imparted to the light can be controlled, and thus the front brightness of emission light and the usage efficiency of light can be improved. In the above-described configuration in which light having a high light-condensing property is emitted in the second direction, a difference in the amount of emission light between the first region 15B1 and the second region 15B2 of the light emission main surface 15B of the light guide plate 15 tends to be more easily visually recognized as brightness unevenness. In this regard, since the first occupancy of the first light guide plate lenses 20 in the first region 15B1 is lower than the second occupancy of the first light guide plate lenses 20 in the second region 15B2, the amount of emission light from the first region 15B1 to which a large amount of light is supplied is less likely to be excessive, and the emission of light from the second region 15B2 to which a small amount of light is supplied is promoted. Accordingly, a difference that may occur in the amount of emission light between the first region 15B1 and the second region 15B2 is reduced, and consequently brightness unevenness is less likely to be visually recognized.

In addition, the liquid crystal display device (display device) 10 according to the present embodiment includes the backlight device 12 described above, and the liquid crystal panel (display panel) 11 disposed overlapping with the light emission main surface 15B and configured to perform display by using light from the backlight device 12. According to the liquid crystal display device 10 having such a configuration, brightness unevenness is unlikely to occur in emission light from the backlight device 12, and thus, display can be achieved with excellent display quality.

In addition, the liquid crystal panel 11 includes the display region AA in which an image is displayed and the non-display region NAA surrounding the display region AA. In the first light guide plate lenses 20, the first region 15B1 overlaps with a part of the non-display region NAA and does not overlap with the display region AA, and the length of the first region 15B1 along the second direction is 2 mm or more. If the length of the first region 15B1 along the second direction is shorter than 2 mm, there is a concern that, even if the first occupancy of the first light guide plate lenses 20 in the first region 15B1 is lower than the second occupancy, the amount of light tends to become excessive in a center side portion in the first direction of an end portion of the display region AA on the side of the LED 13 along the first direction, and brightness unevenness is not sufficiently reduced. If the first region 15B1 is expanded in the first direction so as to overlap with the display region AA, there is a concern that the amount of light becomes insufficient in the center side portion in the first direction of the end portion of the display region AA on the side of the LED 13 along the first direction, and display quality is significantly deteriorated. In this regard, since the length of the first region 15B1 along the second direction is equal to or greater than 2 mm, the amount of light in the center side portion in the first direction of the end portion of the display region AA on the side of the LED 13 along the first direction is sufficiently suppressed, and brightness unevenness can be sufficiently reduced. In addition, since the first region 15B1 overlaps with a part of the non-display region NAA and does not overlap with the display region AA, it is possible to avoid a situation in which the amount of light becomes insufficient in the center side portion in the first direction of the end portion of the display region AA on the side of the LED 13 along the first direction, and good display quality can be maintained.

Second Embodiment

A second embodiment will be described with reference to FIGS. 21 to 24. In the second embodiment, a case in which a configuration of a fourth light guide plate lens 123 is changed will be described. Further, repetitive descriptions of structures, actions, and effects similar to those of the first embodiment described above will be omitted.

Figure 21:
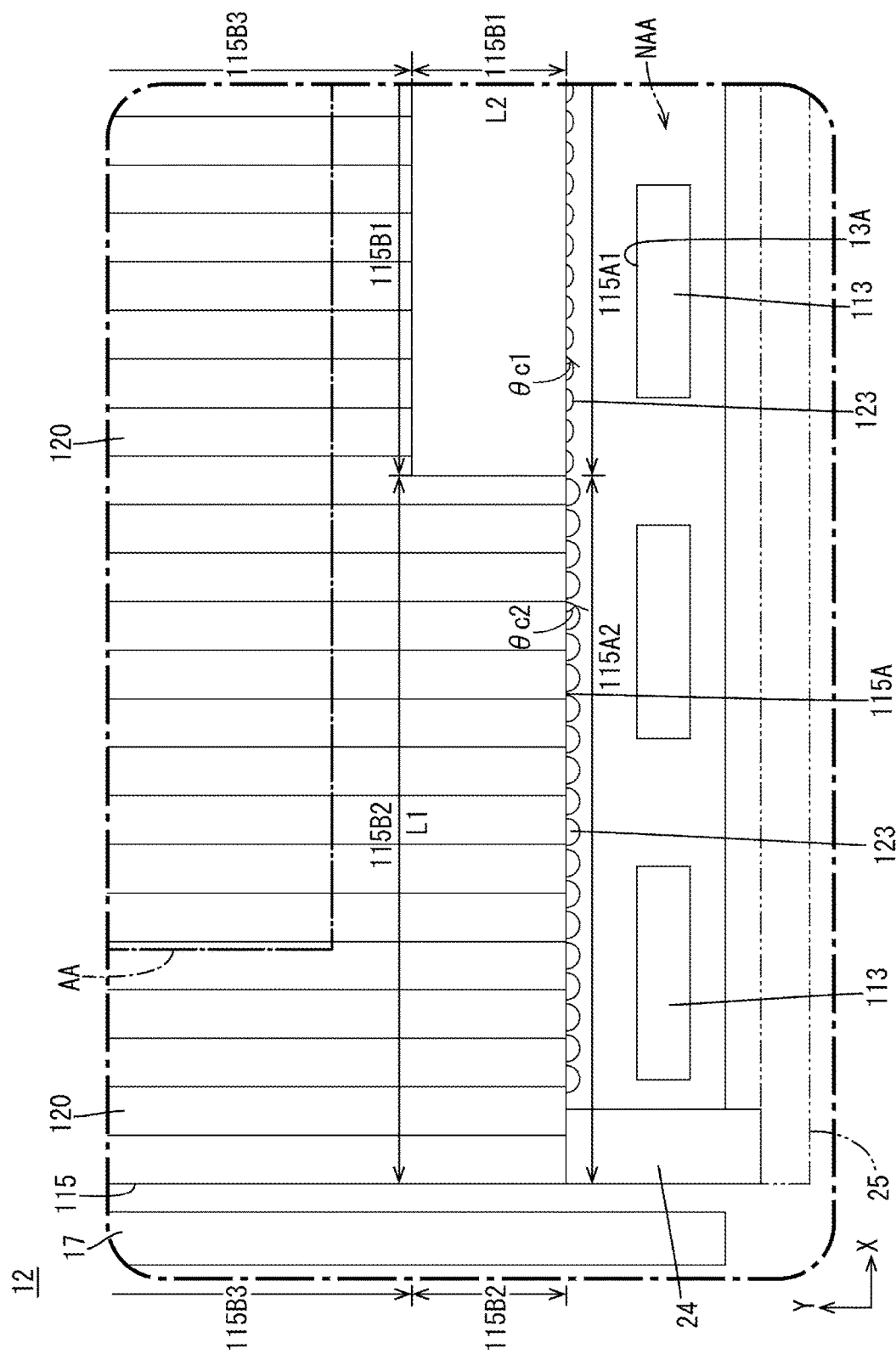
FIG. 21 is a plan view of a backlight device according to a second embodiment, in which the vicinity of a corner portion of a light guide plate on the side of a light incident end face is enlarged.

As illustrated in FIG. 21, a plurality of fourth light guide plate lenses 123 included in a light guide plate 115 according to the present embodiment are configured to have different contact angles depending on positions along the X-axis direction on a light incident end face 115A. The fourth light guide plate lens 123 is a cylindrical lens as in the first embodiment. When a contact angle θc1 of the fourth light guide plate lens 123 located in a third region 115A1 of the light incident end face 115A is compared with a contact angle θc2 of the fourth light guide plate lens 123 located in a fourth region 115A2, the former is smaller than the latter. Specifically, the contact angle θc1 of the fourth light guide plate lens 123 located in the third region 115A1 is, for example, 38°, whereas the contact angle θc2 of the fourth light guide plate lens 123 located in the fourth region 115A2 is, for example, 47°. As in the first embodiment, a light emission main surface 115B includes a first region 115B1, a second region 115B2, and an other region 115B3. With this configuration, light emitted from LEDs 113 and incident on the fourth region 115A2 of the light incident end face 115A is imparted with a diffusing action in the X-axis direction by the fourth light guide plate lens 123 having a large contact angle θc2 at a higher degree of diffusion than light incident on the third region 115A1. Accordingly, the amount of light supplied to the second region 115B2 corresponding to the fourth region 115A2 is further increased. As a result, brightness unevenness is even less likely to occur in emission light emitted from the light emission main surface 115B.

Next, using the light guide plate 115 according to the present embodiment, Comparative Experiment 3 was performed in order to obtain knowledge about how the brightness distribution changes when the contact angle θc2 of the fourth light guide plate lens 123 located in the fourth region 115A2 is changed. In Comparative Experiment 3, the light guide plate 115 was used in which the occupancy of first light guide plate lenses 120 was 0% in the first region 115B1, and the occupancy of the first light guide plate lenses 120 was 100% in the second region 115B2 and the other region 115B3 in the light emission main surface 115B. In Comparative Experiment 3, Examples 7 to 9 in which the contact angles θc2 of the fourth light guide plate lens 123 located in the fourth region 115A2 was set as follows were used. In Example 7, the contact angle θc2 is 44°. In Example 8, the contact angle θc2 is 47°. In Example 9, the contact angle θc2 is 53°. In all of Examples 7 to 9, the contact angle θc1 of the fourth light guide plate lens 123 located in the third region 115A1 is 38°. In all of Examples 7 to 9, in the light emission main surface 115B, the length L2 of the first region 115B1 along the Y-axis direction is 3 mm, and the length L1 of the second region 115B2 along the X-axis direction is 10 mm. In Examples 7 to 9, all numerical values of the long-side dimension and the short-side dimension of the light guide plate 115, the number of LEDs 113 installed, the distance between the light incident end face 115A and the LEDs 113, the arrangement interval of the LEDs 113, the arrangement interval of the first light guide plate lenses 120, the contact angle of the first light guide plate lens 120, and the arrangement interval of the fourth light guide plate lenses 123 are the same as those in Verification Experiment 1.

Figure 22:
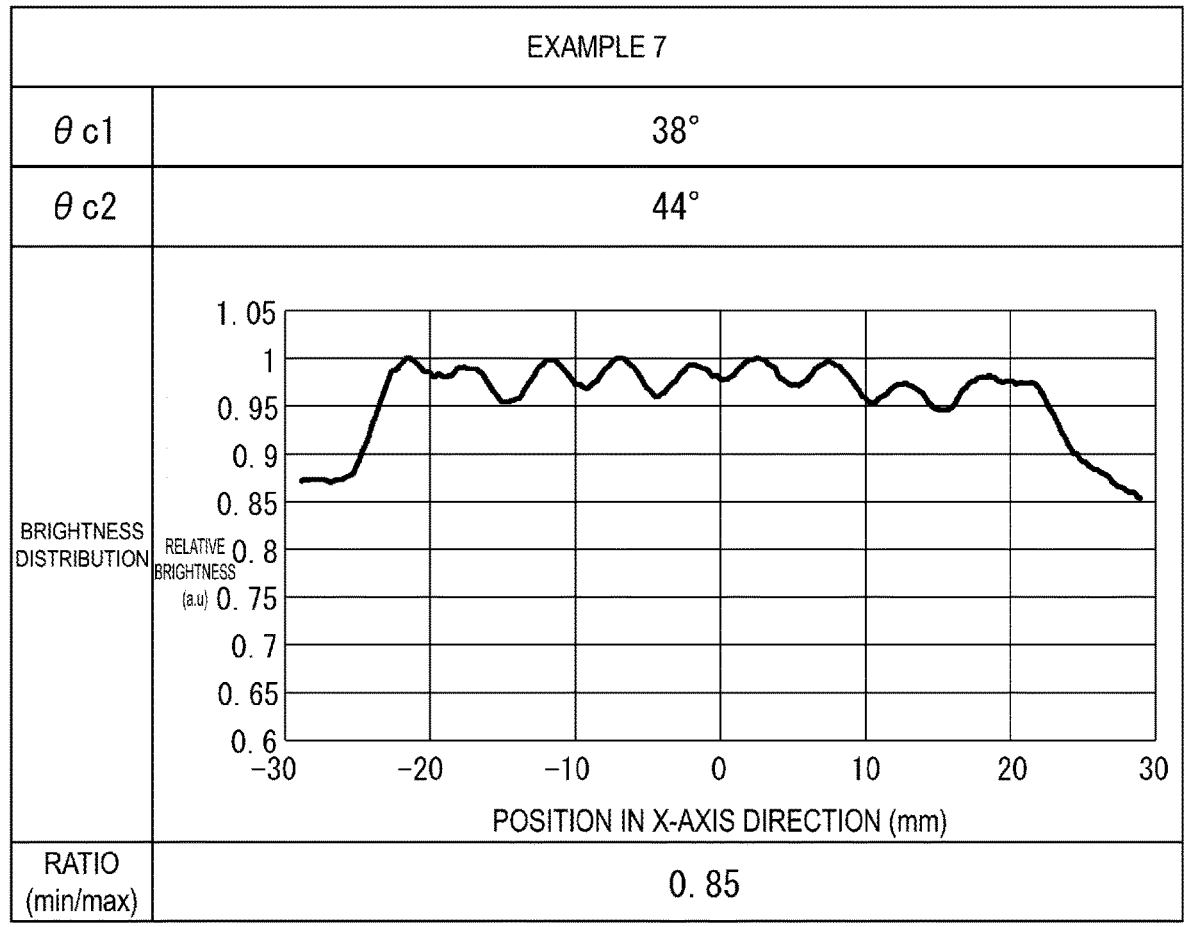
FIG. 22 is a table showing an experimental result of Example 7 in Comparative Experiment 3.
Figure 23:
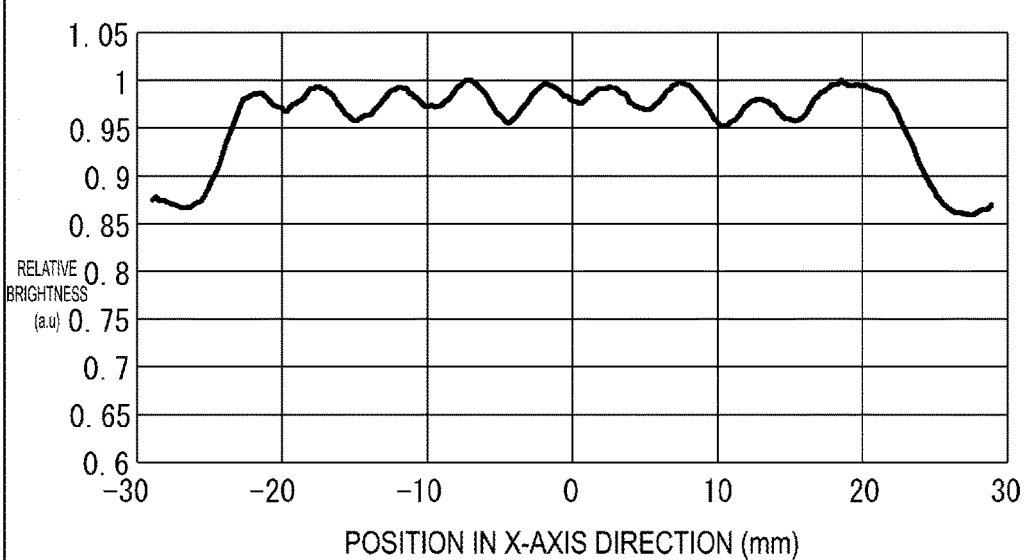
FIG. 23 is a table showing an experimental result of Example 8 in Comparative Experiment 3.
Figure 24:
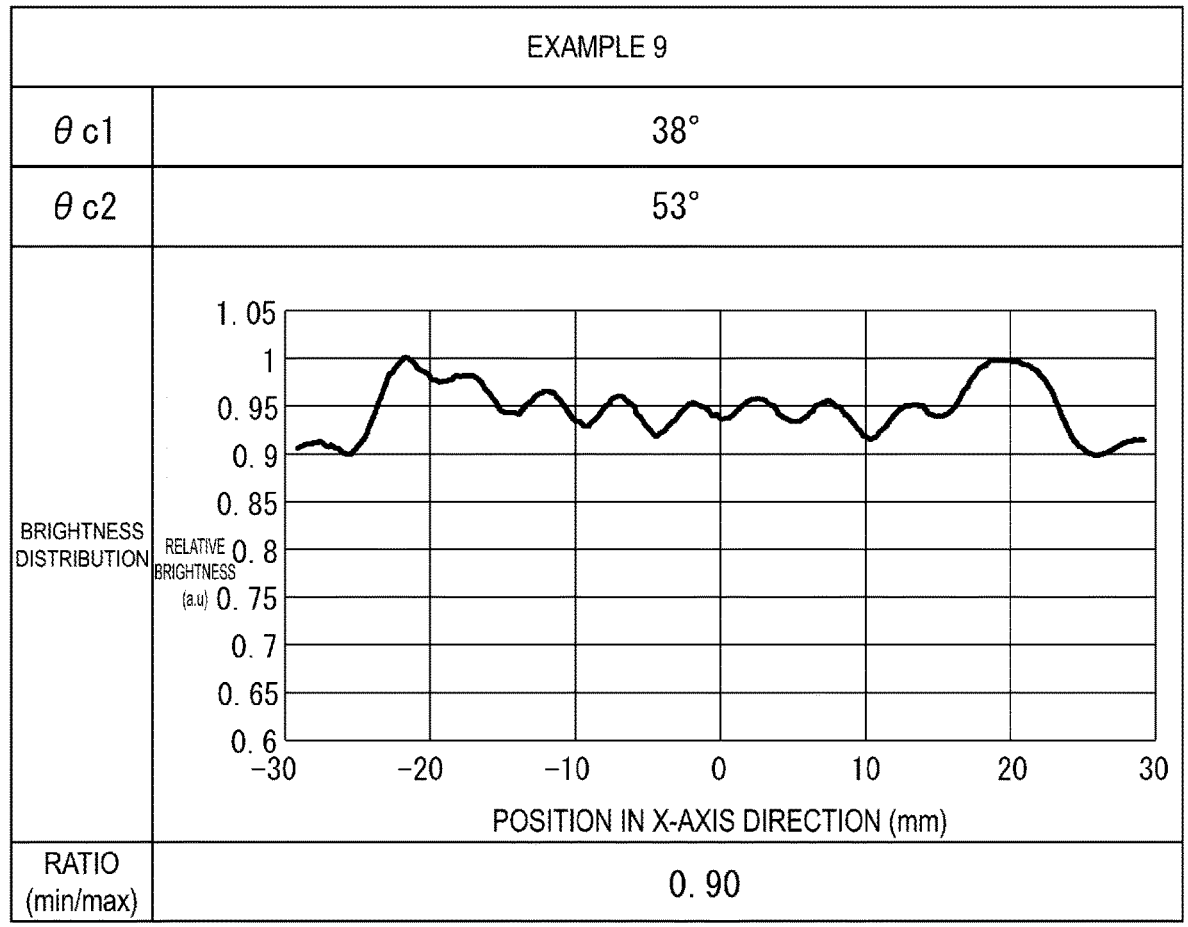
FIG. 24 is a table showing an experimental result of Example 9 in Comparative Experiment 3.

In Comparative Experiment 3, light from the LEDs 113 was incident on the light incident end face 115A of the light guide plate 115 according to each of Examples 7 to 9 described above, and the brightness of emission light from the light emission main surface 115B was measured. Based on the measured brightness, a graph of brightness distribution (light distribution) of emission light along the X-axis direction in the vicinity of the LEDs 13 along the X-axis direction in the display region AA was created. Further, in Comparative Experiment 3, a ratio (with no unit) obtained by dividing minimum brightness of calculated brightness by maximum brightness was calculated. The calculated ratio is as described in Verification Experiment 1. The experimental results of Comparative Experiment 3 are as shown in the tables in FIG. 22 to FIG. 24. FIG. 22 shows the experimental results of Example 7, FIG. 23 shows the experimental results of Example 8, and FIG. 24 shows the experimental results of Example 9. In each table in FIGS. 22 to 24, a numerical value of the contact angle θc1, a numerical value of the contact angle θc2, a graph of brightness distribution along the X-axis direction, and a ratio obtained by dividing the minimum brightness by the maximum brightness are shown in order from top to bottom. The graphs of the brightness distribution along the X-axis direction illustrated in FIGS. 22 to 24 are as described in Verification Experiment 1.

The experimental results of Comparative Experiment 3 will be described with reference to FIGS. 22 to 24. According to FIGS. 22 to 24, in all of Examples 7 to 9, since the numerical value of the ratio obtained by dividing the minimum brightness by the maximum brightness was significantly higher than "0.8" which is the reference for evaluating the uniformity of the brightness distribution, it can be said that the uniformity of the brightness distribution was sufficiently improved. The reason for the above results will be described. First, incident light incident on the fourth region 115A2 of the light incident end face 115A was diffused at a relatively wide angle in the X-axis direction by the fourth light guide plate lenses 123 having a relatively large contact angle θc2. It is assumed that, in the second region 115B2 of the light emission main surface 115B, emission of light was promoted by the first light guide plate lenses 120 having an occupancy of 100%, and thus the amount of emission light from the second region 115B2 was increased. Incident light incident on the third region 115A1 was diffused in a relatively narrow range in the X-axis direction by the fourth light guide plate lenses 123 having a relatively small contact angle θc1, and emission of light was not promoted by the first light guide plate lens 120 in the first region 115B1, and thus the amount of emission light from the first region 115B1 was suppressed. Accordingly, a difference that may occur between the amount of emission light from the first region 115B1 and the amount of emission light from the second region 115B2 is considered to be satisfactorily reduced.

According to FIGS. 22 and 23, in both Examples 7 and 8, the maximum brightness was obtained on a center side (range from 0 mm to ±10 mm) in the X-axis direction, and reduction in brightness on the center side in the X-axis direction which occurred in Comparative Examples 4 and 5 (see FIGS. 13 and 14) in Verification Experiment 1 was not observed. It can be said that Examples 7 and 8 have the same degree of uniformity of the brightness distribution. On the other hand, according to FIG. 24, in Example 9, the maximum brightness was obtained at positions near ±20 mm, and the minimum brightness was as high as about 0.9 on both end sides (near ±25 mm) in the X-axis direction, but the relative brightness was relatively slightly reduced as about 0.95 on the center side in the X-axis direction. Such a result is considered to be attributable to slightly excessive diffusion of light by the fourth light guide plate lenses 123 located in the fourth region 115A2. Therefore, in order to prevent a reduction in brightness on the center side in the X-axis direction from being greater than the experimental results of Example 9, the contact angle θc2 of the fourth light guide plate lens 123 located in the fourth region 115A2 is preferably set to 53° or less.

As described above, according to the present embodiment, each of the fourth light guide plate lenses 123 is a cylindrical lens including a peripheral surface having an arc shape, and when an angle formed by a tangent line at a base end portion of the peripheral surface of the cylindrical lens with respect to the first direction is defined as the contact angle θc2 of the cylindrical lens, the contact angle θc2 of the cylindrical lens disposed in the fourth region 115A2 is larger than the contact angle θc1 of the cylindrical lens disposed in the third region 115A1. The larger the contact angle of the cylindrical lens that is the fourth light guide plate lens 123 is, the higher the degree of diffusion in the first direction of light refracted by the peripheral surface of the cylindrical lens tends to be. By making the contact angle θc2 of the cylindrical lens disposed in the fourth region 115A2 larger than the contact angle θc1 of the cylindrical lens disposed in the third region 115A1, light incident on the fourth region 115A2 is diffused in the first direction with a higher degree of diffusion than light incident on the third region 115A1. Accordingly, the amount of light supplied to the second region 115B2 corresponding to the fourth region 115A2 is further increased. As a result, brightness unevenness is even less likely to occur in emission light emitted from the light emission main surface 115B.

Third Embodiment

A third embodiment will be described with reference to FIGS. 25 to 29. In the third embodiment, a case in which a configuration of a third light guide plate lens 222 is changed from that in the second embodiment described above will be described. Further, repetitive descriptions of structures, actions, and effects similar to those of the second embodiment described above will be omitted.

Figure 25:
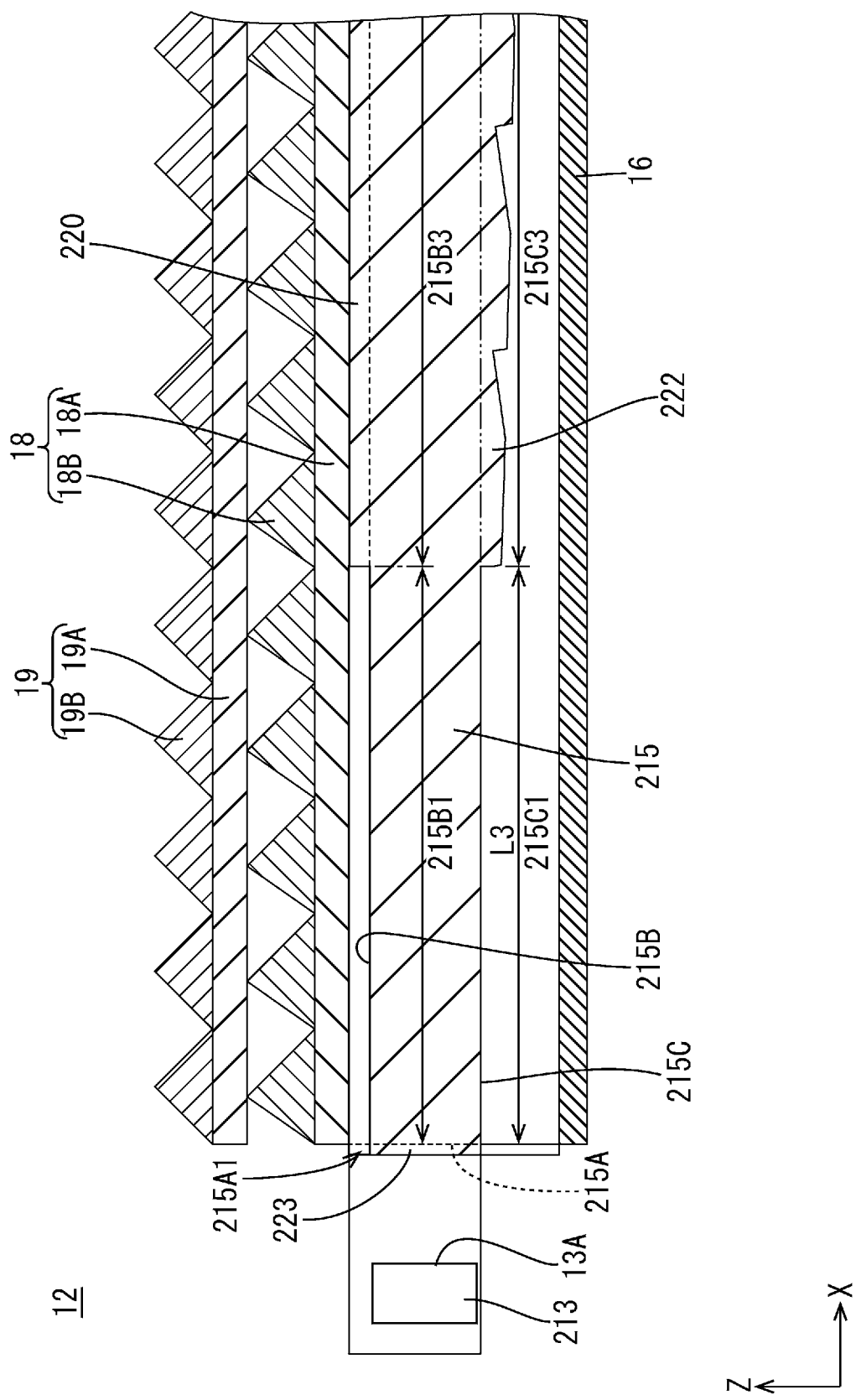
FIG. 25 is a cross-sectional view of a backlight device according to a third embodiment taken at the same cutting position as that in FIG. 8 (along the line viii-viii in FIG. 7).
Figure 26:
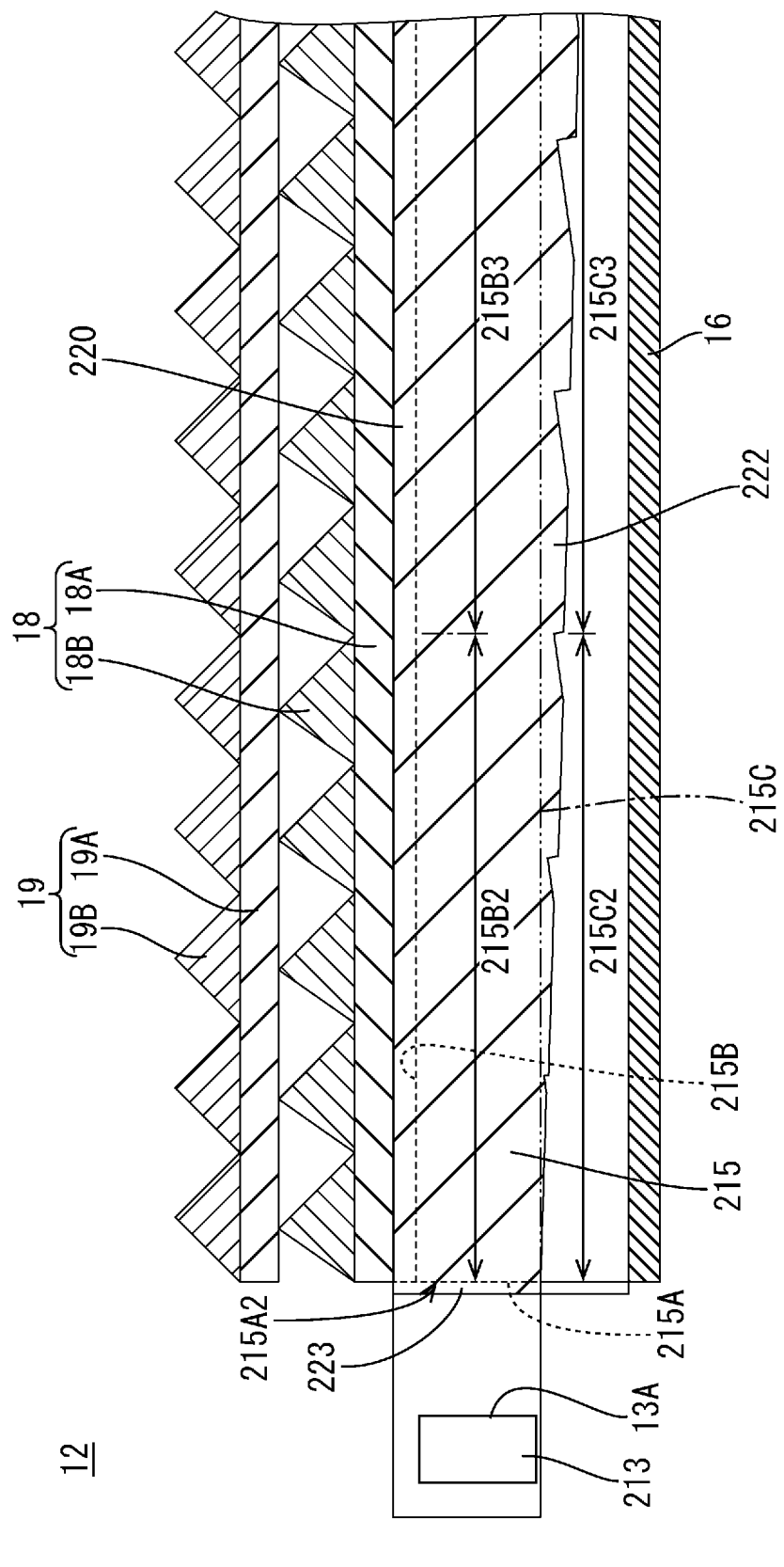
FIG. 26 is a cross-sectional view of the backlight device taken at the same cutting position as that in FIG. 9 (along the line ix-ix in FIG. 7).

As illustrated in FIGS. 25 and 26, third light guide plate lenses 222 included in a light guide plate 215 according to the present embodiment are provided partially on an opposite main surface 215C, and the distribution of the third light guide plate lenses 222 on the opposite main surface 215C will be described in detail below. First, an end portion of the opposite main surface 215C on the side of LEDs 213 along the X-axis direction is divided into a fifth region 215C1 located on a center side along the X-axis direction and two sixth regions 215C2 located on end sides along the X-axis direction. Further, a portion other than the fifth region 215C1 and the sixth region 215C2 (a portion excluding the end portion on the side of the LEDs 213 along the X-axis direction) of the opposite main surface 215C is defined as an other region 215C3. In the present embodiment, in the third light guide plate lens 222, a length L3 of the fifth region 215C1 along the Y-axis direction is, for example, 3 mm, and a length of the sixth region 215C2 along the X-axis direction is, for example, 10 mm. A contact angle θc1 of the fourth light guide plate lens 223 located in a third region 215A1 of a light incident end face 215A is, for example, 38°, whereas a contact angle θc2 of the fourth light guide plate lens 223 located in a fourth region 215A2 is, for example, 44°.

In the distribution of the third light guide plate lenses 222 on the opposite main surface 215C, a third occupancy of the third light guide plate lenses 222 in the fifth region 215C1 is lower than a fourth occupancy of the third light guide plate lenses 222 in the sixth region 215C2. The "occupancy" here is a ratio obtained by dividing an area of an arrangement region (formation region) in which the third light guide plate lenses 222 are arranged in the opposite main surface 215C by the sum of areas of the above-described arrangement region and a non-arrangement region (non-formation region) in which no third light guide plate lens 222 is arranged. The occupancy can also be said to be a distribution density of the third light guide plate lenses 222. In the present embodiment, the arrangement interval of the third light guide plate lenses 222 is constant. Thus, it can be said that the "occupancy" is a ratio obtained by dividing the width dimension of the third light guide plate lens 222 by the arrangement interval of the third light guide plate lenses 222. When the occupancy is "100%" in percentage, the width dimension of the third light guide plate lens 222 and the arrangement interval of the third light guide plate lenses 222 have the same value. An occupancy of 100% means that each of the regions 215C1 to 215C3 is constituted exclusively by the arrangement region of the third light guide plate lens 222 and there is no non-arrangement region of the third light guide plate lens 222. An occupancy of "0%" in percentage means that each of the regions 215C1 to 215C3 is constituted exclusively by the non-arrangement region of the third light guide plate lens 222 and there is no arrangement region of the third light guide plate lens 222.

Specifically, in the present embodiment, the third occupancy is 0% and the fourth occupancy is 100%. The occupancy of the third light guide plate lenses 222 in the other region 215C3 is the same as the fourth occupancy, that is, 100%. In respective portions on both end sides of the opposite main surface 215C in the X-axis direction, the third light guide plate lens 222 is provided over the entire length in the Y-axis direction. On the other hand, in a portion on a center side of the opposite main surface 215C in the X-axis direction, the third light guide plate lens 222 is provided in a great majority of the side of the LED 213 except on the end portion along the X-axis direction and is not formed selectively in the end portion on the side of the LED 213 along the X-axis direction. Here, in the end portion of the opposite main surface 215C on the side of the LED 213 along the X-axis direction, the amount of light reaching the fifth region 215C1 located on the center side along the X-axis direction is larger than the amount of light reaching the sixth regions 215C2 located on the end sides along the X-axis direction. On the other hand, the third occupancy of the third light guide plate lenses 222 in the fifth region 215C1 is 0%, which is lower than the fourth occupancy in the sixth region 215C2. Accordingly, in the fifth region 215C1, even when a large amount of light reaches, the emission of the light is suppressed, and thus the amount of emission light is less likely to be excessive. In the end portion of the opposite main surface 215C on the side of the LED 213 along the X-axis direction, the amount of light reaching the sixth regions 215C2 located on the end sides along the X-axis direction is smaller than the amount of light reaching the fifth region 215C1 located on the center side along the X-axis direction. On the other hand, the fourth occupancy of the third light guide plate lenses 222 in the sixth region 215C2 is 100%, which is higher than the third occupancy in the fifth region 215C1. Accordingly, in the sixth region 215C2, even when a small amount of light reaches, the emission of light from a second region 215B2 of a light emission main surface 215B is promoted, and thus the amount of emission light is less likely to be insufficient. As described above, a difference that may occur in the amount of emission light between the fifth region 215C1 and the sixth region 215C2 is reduced, and thus brightness unevenness is less likely to occur in emission light from the light emission main surface 215B.

Next, using the light guide plate 215 according to the present embodiment, Comparative Experiment 4 was performed in order to obtain knowledge about how the brightness distribution changes when the length L3 along the Y-axis direction of the fifth region 215C1 in the opposite main surface 215C is changed. In Comparative Experiment 4, the light guide plate 215 was used in which the occupancy of first light guide plate lenses 220 was 0% in a first region 215B1 and the occupancy of the first light guide plate lenses 220 was 100% in the second region 215B2 and an other region 215B3 in the light emission main surface 215B, whereas the occupancy of the third light guide plate lenses 222 was 0% in the fifth region 215C1 and the occupancy of the third light guide plate lenses 222 was 100% in the sixth region 215C2 and the other region 215C3 in the opposite main surface 215C. In Comparative Experiment 4, Examples 10 to 12 in which the length L3 of the fifth region 215C1 along the Y-axis direction was set as follows were used. In Example 10, the length L3 is 2 mm. In Example 11, the length L3 is 3 mm. In Example 12, the length L3 is 4 mm. In all of Examples 10 to 12, a length L2 of the second region 215B2 along the Y-axis direction is 3 mm, a length L1 of the second region 15B2 along the X-axis direction is 10 mm, and a length of the sixth region 215C2 along the X-axis direction is 10 mm. In all of Examples 10 to 12, the contact angle θc1 of the fourth light guide plate lens 223 located in the third region 215A1 of the light incident end face 215A is 38°, and the contact angle θc2 of the fourth light guide plate lens 223 located in the fourth region 215A2 is 44°. In Examples 10 to 12, all numerical values of the long-side dimension and the short-side dimension of the light guide plate 215, the number of LEDs 213 installed, the distance between the light incident end face 215A and the LEDs 213, the arrangement interval of the LEDs 213, the arrangement interval of the first light guide plate lenses 220, the contact angle of the first light guide plate lens 220, and the arrangement interval of the fourth light guide plate lenses 223 are the same as those in Verification Experiment 1.

Figure 27:
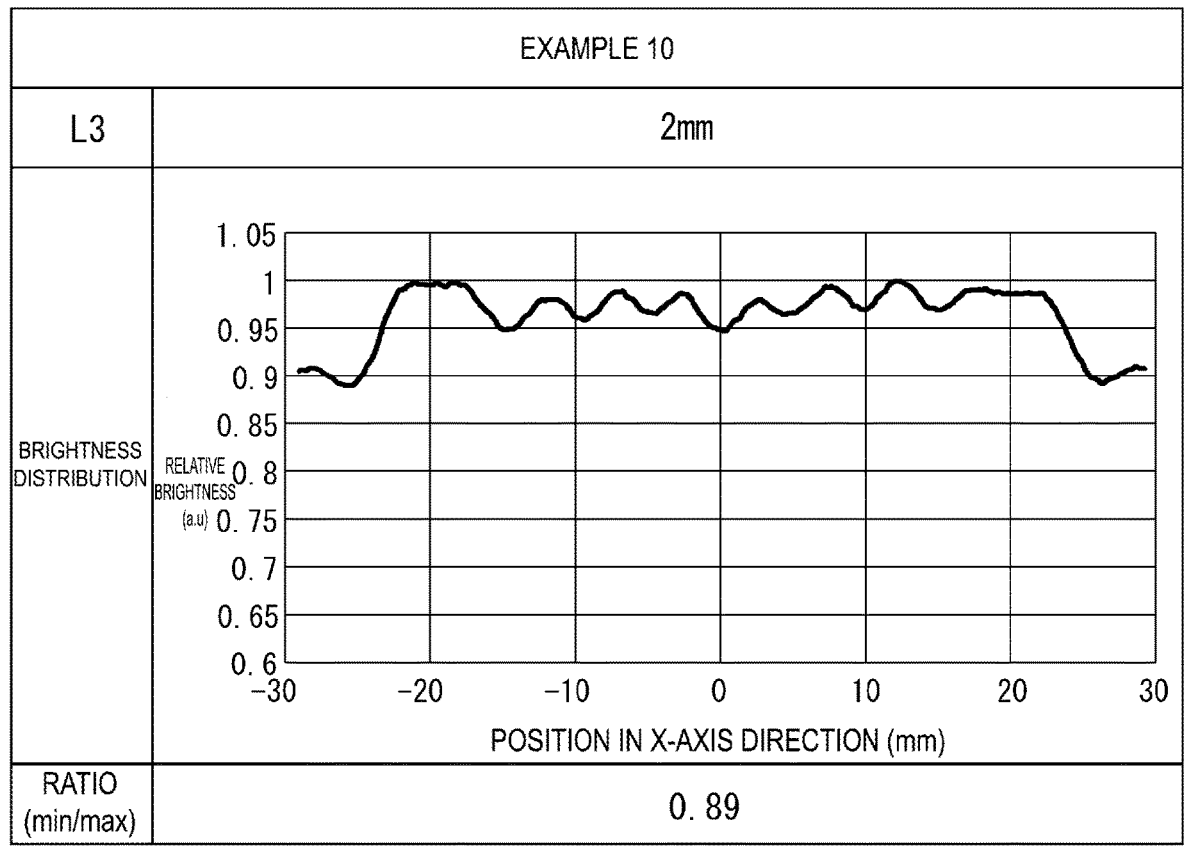
FIG. 27 is a table showing an experimental result of Example 10 in Comparative Experiment 4.
Figure 28:
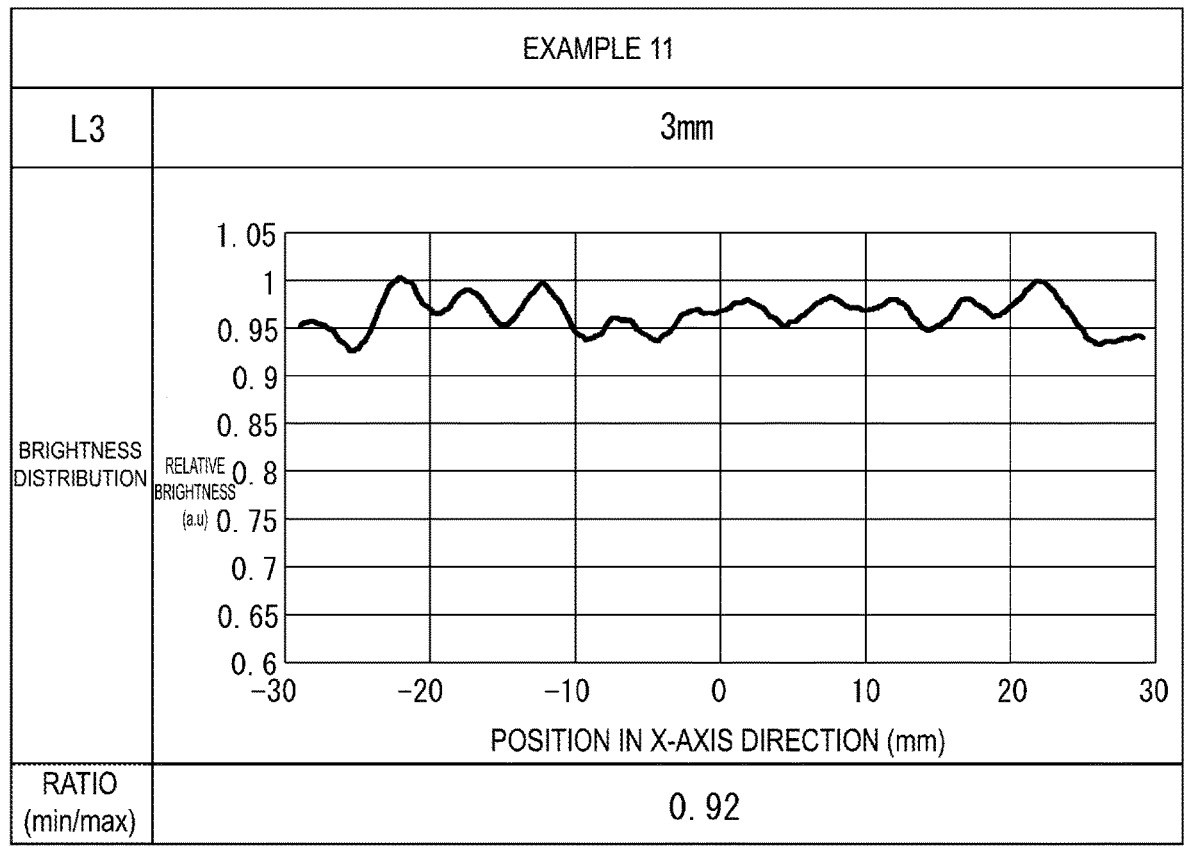
FIG. 28 is a table showing an experimental result of Example 11 in Comparative Experiment 4.
Figure 29:
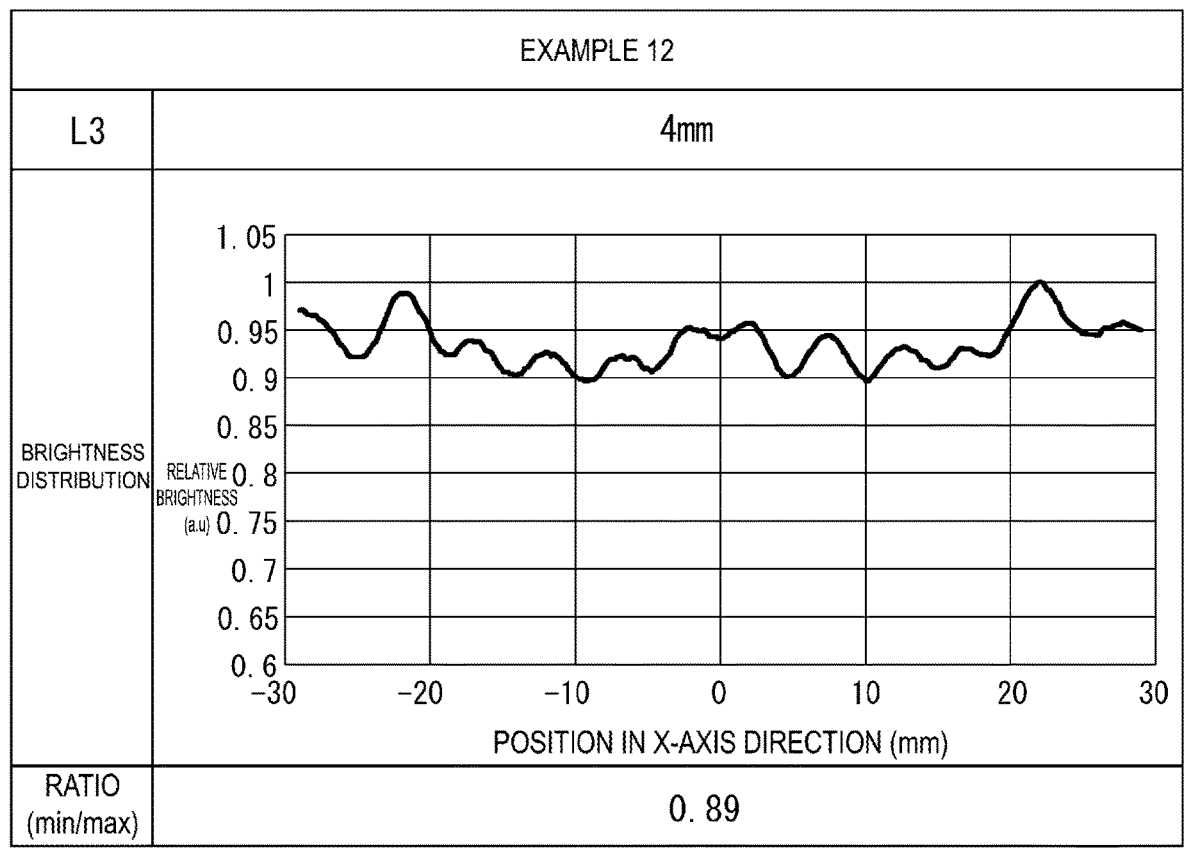
FIG. 29 is a table showing an experimental result of Example 12 in Comparative Experiment 4.

In Comparative Experiment 4, light from the LEDs 213 was incident on the light incident end face 215A of the light guide plate 215 according to each of Examples 10 to 12 described above, and the brightness of emission light from the light emission main surface 215B was measured. Based on the measured brightness, a graph of brightness distribution (light distribution) of emission light along the X-axis direction in the vicinity of the LEDs 213 along the X-axis direction in the display region AA was created. Further, in Comparative Experiment 4, a ratio (with no unit) obtained by dividing minimum brightness of calculated brightness by maximum brightness was calculated. The calculated ratio is as described in Verification Experiment 1. The experimental results of Comparative Experiment 4 are as shown in the tables in FIG. 27 to FIG. 29. FIG. 27 shows the experimental results of Example 10, FIG. 28 shows the experimental results of Example 11, and FIG. 29 shows the experimental results of Example 12. In each table in FIGS. 27 to 29, a numerical value of the length L3, a graph of brightness distribution along the X-axis direction, and a ratio obtained by dividing the minimum brightness by the maximum brightness are shown in order from top to bottom. The graphs of the brightness distribution along the X-axis direction illustrated in FIGS. 27 to 29 are as described in Verification Experiment 1.

The experimental results of Comparative Experiment 4 will be described with reference to FIGS. 27 to 29. According to FIGS. 27 to 29, in all of Examples 10 to 12, the numerical value of the ratio obtained by dividing the minimum brightness by the maximum brightness was significantly higher than "0.8" which is the reference for evaluating the uniformity of the brightness distribution, and substantially higher than the experimental results of Comparative Experiment 3 described in the second embodiment. That is, it can be said that the uniformity of the brightness distribution was sufficiently improved in Examples 10 to 12 for Comparative Experiment 4 as compared with Examples 7 to 9 for Comparative Experiment 3. The reason for the above results will be described. First, incident light incident on the fourth region 215A2 of the light incident end face 215A was diffused at a relatively wide angle in the X-axis direction by the fourth light guide plate lenses 223 having a relatively large contact angle θc2. It is assumed that, since emission of light was promoted by the first light guide plate lenses 220 having an occupancy of 100% in the second region 215B2 of the light emission main surface 215B, and emission of light was also promoted by the third light guide plate lenses 222 having an occupancy of 100% in the sixth region 215C2 of the opposite main surface 215C, the amount of emission light from the second region 215B2 was further increased. Incident light incident on the third region 215A1 was diffused in a relatively narrow range in the X-axis direction by the fourth light guide plate lenses 223 having a relatively small contact angle θc1. Emission of light was not promoted by the first light guide plate lens 220 in the first region 215B1, and also emission of light was not promoted by the third light guide plate lens 222 in the fifth region 215C1. Accordingly, the amount of emission light from the first region 215B1 was further suppressed. Accordingly, a difference that may occur between the amount of emission light from the first region 215B1 and the amount of emission light from the second region 215B2 is considered to be satisfactorily reduced.

According to FIGS. 27 and 28, in both Examples 10 and 11, reduction in brightness on a center side (range from 0 mm to ±10 mm) in the X-axis direction which occurred in Comparative Examples 4 and 5 (see FIGS. 13 and 14) in Verification Experiment 1 was not observed. As compared with Example 10, in Example 11, although slight reduction in brightness was observed on the center side in the X-axis direction, the numerical value of the ratio obtained by dividing the minimum brightness by the maximum brightness was 0.92, which was very high, and thus it can be said that the uniformity of the brightness distribution was the best. On the other hand, according to FIG. 29, in Example 12, the maximum brightness was obtained at a position near ±23 mm, and the minimum brightness (about 0.89) was obtained near ±10 mm. That is, in Example 12, the brightness was slightly reduced on the center side in the X-axis direction. The reason for such a result is considered to be that the fifth region 215C1 in which emission of light was not promoted by the third light guide plate lens 222 was too large in the Y-axis direction. Therefore, in order to prevent the reduction in brightness on the center side in the X-axis direction from being greater than the experimental results of Example 12, the length L3 of the fifth region 215C1 along the Y-axis direction is preferably set to 4 mm or less.

As described above, according to the present embodiment, the light guide plate 215 includes the opposite main surface (second main surface) 215C on the side opposite to the light emission main surface 215B, and the plurality of third light guide plate lenses (third lenses) 222 disposed at the opposite main surface 215C, extending along the first direction, and arranged along the second direction. The third light guide plate lenses 222 are configured such that, when an end portion of the opposite main surface 215C on the side of the LEDs 213 along the first direction is divided into the fifth region 215C1 located on a center side along the first direction and the sixth region 215C2 located on an end side along the first direction, the third occupancy of the third light guide plate lenses 222 in the fifth region 215C1 is lower than the fourth occupancy of the third light guide plate lenses 222 in the sixth region 215C2. Light propagated inside the light guide plate 215 and having reached the opposite main surface 215C includes light totally reflected by the third light guide plate lenses 222. The light totally reflected by the third light guide plate lenses 222 is raised toward the light emission main surface 215B, and promoted to be emitted from the light emission main surface 215B. In the end portion of the opposite main surface 215C on the side of the LED 213 along the first direction, the amount of light reaching the fifth region 215C1 located on the center side along the first direction is larger than the amount of light reaching the sixth region 215C2 located on the end side along the first direction. On the other hand, the third occupancy of the third light guide plate lenses 222 in the fifth region 215C1 is lower than the fourth occupancy in the sixth region 215C2. Accordingly, in the fifth region 215C1, even when a large amount of light reaches, the emission of light from the first region 215B1 of the light emission main surface 215B is suppressed, and thus the amount of emission light is less likely to be excessive. In the end portion of the opposite main surface 215C on the side of the LED 213 along the first direction, the amount of light reaching the sixth region 215C2 located on the end side along the first direction is smaller than the amount of light reaching the fifth region 215C1 located on the center side along the first direction. On the other hand, the fourth occupancy of the third light guide plate lenses 222 in the sixth region 215C2 is higher than the third occupancy in the fifth region 215C1. Accordingly, in the sixth region 215C2, even when a small amount of light reaches, the emission of light from the second region 215B2 of the light emission main surface 215B is promoted, and thus the amount of emission light is less likely to be insufficient. In this way, a difference that may occur in the amount of emission light between the first region 215B1 and the second region 215B2 is reduced, and thus brightness unevenness is less likely to occur in emission light from the light emission main surface 215B.

Fourth Embodiment

A fourth embodiment will be described with reference to FIG. 30. In the fourth embodiment, a case in which a configuration of a backlight device 312 is changed from that in the first embodiment described above will be described. Further, repetitive descriptions of structures, actions, and effects similar to those of the first embodiment described above will be omitted.

Figure 30:
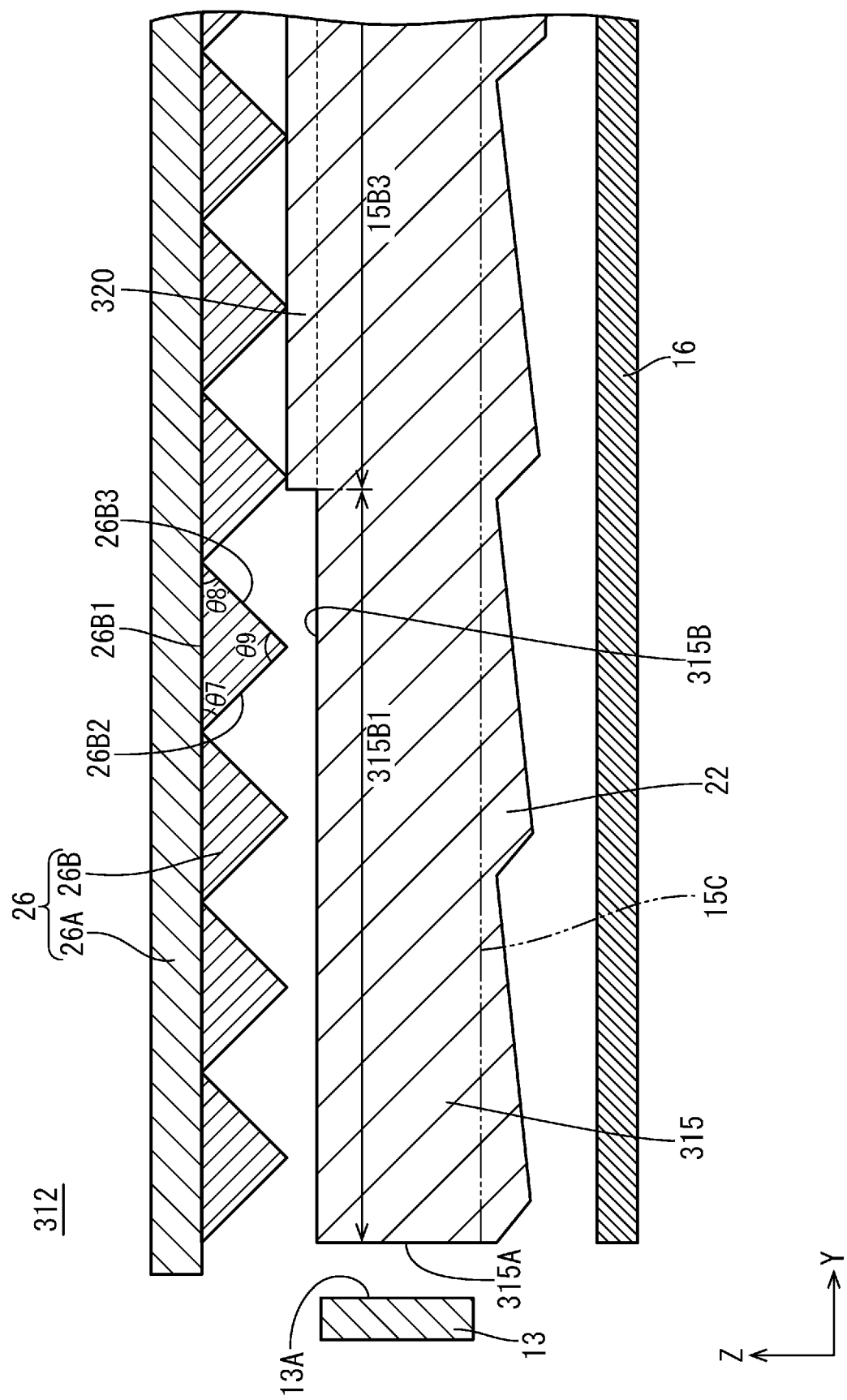
FIG. 30 is a cross-sectional view of a backlight device according to a fourth embodiment taken at the same cutting position as that in FIG. 8 (along the line viii-viii in FIG. 7).

As illustrated in FIG. 30, the backlight device 312 according to the present embodiment includes a third prism sheet (turning lens sheet) 26 instead of the first prism sheet 18 and the second prism sheet 19 (see FIG. 2) described in the first embodiment. The third prism sheet 26 includes a third base material 26A having a sheet shape, and a third prism 26B provided on a light incident main surface (fifth main surface) 26A1 on the back side (light incidence side) of the third base material 26A. The third base material 26A is made of substantially transparent synthetic resin, and specifically, is formed of, for example, a crystalline transparent resin material such as PET. The third prism 26B is formed of an ultraviolet-curing resin material being substantially transparent and being a type of photo-curable resin material. A manufacturing method of the third prism sheet 26 is similar to the manufacturing method of the first prism sheet 18 and the second prism sheet 19 described in the first embodiment. The ultraviolet-curing resin material constituting the third prism 26B is, for example, an acrylic resin such as PMMA. The third prism 26B is provided so as to protrude from the light incident main surface 26A1 of the third base material 26A toward the back side along the Z-axis direction, that is, toward a light guide plate 315.

The third prism 26B has a substantially triangular shape (is substantially mountain shaped) in a cross section taken along the Y-axis direction and extends linearly along the X-axis direction, and a plurality of the third prisms 26B are continuously arranged side by side with substantially no interval along the Y-axis direction on a main surface of the third base material 26A. The third prism 26B includes a base 26B1 parallel to the Y-axis direction (the main surface of the third base material 26A), and a pair of oblique sides 26B2 and 26B3 rising from both ends of the base 26B1. Of the pair of oblique sides 26B2 and 26B3 of the third prism 26B, the oblique side located on the side of an LED 313 in the Y-axis direction is referred to as a third LED-side oblique side (fifth oblique side) 26B2, and the oblique side located on the side opposite to the LED 313 is referred to as a third opposite-to-LED-side oblique side (sixth oblique side) 26B3. Of the pair of oblique sides, the third opposite-to-LED-side oblique side 26B3 is exposed mainly to light traveling in a direction away from the LED 313 in the Y-axis direction out of light incident on the third prism 26B, refracting the light. On the other hand, the third LED-side oblique side 26B2 is exposed mainly to light traveling in a direction approaching the LED 313 in the Y-axis direction out of the light incident on the third prism 26B, refracting the light. In any case, most of the light refracted by the pair of oblique sides 26B2 and 26B3 of the third prism 26B is selectively raised in the Y-axis direction and condensed. In the third prism 26B, an inclination angle (fifth bottom angle) θ7 of the third LED-side oblique side 26B2 with respect to the base 26B1, and an inclination angle (sixth bottom angle) θ8 of the third opposite-to-LED-side oblique side 26B3 with respect to the base 26B1, are identical. That is, the third prism 26B has a symmetric cross-sectional shape, which is that of an isosceles triangle, and an apex angle (third apex angle) θ9 thereof is, for example, approximately 90°.

Light incident on a light incident end face 315A of the light guide plate 315 from the LED 313 is emitted from a light emission main surface 315B while traveling in a direction away from the light incident end face 315A in the Y-axis direction, and is incident on the third prism sheet 26. Thus, since most of the incident light incident on the third prism sheet 26 is incident on the third prism 26B while traveling in the direction away from the light incident end face 315A in the Y-axis direction, most of the incident light is imparted with a refracting action by the third opposite-to-LED-side oblique side 26B3 of the pair of oblique sides 26B2 and 26B3. Here, since the apex angle θ9 of the third prism 26B is approximately 90°, most of the light refracted by the third opposite-to-LED-side oblique side 26B3 is raised and emitted so as to be directed toward a front direction. Further, light once emitted from an end face opposite to the light incident end face 315A of the light guide plate 315, and then reflected by the frame 17 (see FIG. 6) and incident again on the end face opposite to the light incident end face 315A, is emitted from the light emission main surface 315B and incident on the third prism sheet 26 while traveling in a direction approaching the light incident end face 315A in the Y-axis direction. Thus, since some of the incident light incident on the third prism sheet 26 is incident on the third prism 26B while traveling in the direction approaching the light incident end face 315A in the Y-axis direction, some of the incident light is imparted with a refracting action by the third LED-side oblique side 26B2 of the pair of oblique sides 26B2 and 26B3, and is raised so as to be directed toward the front direction. As described above, emission light from the light guide plate 315 is selectively imparted with a condensing action in the Y-axis direction by the third prism sheet 26, and thus the front brightness of emission light from the backlight device 312 is improved and the usage efficiency of light is improved.

As described above, according to the present embodiment, the third prism sheet 26 is provided facing the light emission main surface 315B with respect to the light guide plate 315. The third prism sheet 26 includes the light incident main surface (fifth main surface) 26A1 facing the light emission main surface 315B. The light incident main surface 26A1 is provided with the plurality of third prisms 26B extending along the first direction and arranged along the second direction. When light emitted from the light emission main surface 315B of the light guide plate 315 is incident on the third prism sheet 26, the light is selectively imparted with a condensing action in the second direction by the plurality of third prisms 26B extending along the first direction on the light incident main surface 26A1 facing the light emission main surface 315B, and is then emitted to the outside. By adjusting the angles or the like of respective oblique sides of the third prism 26B, the condensing action imparted to the light can be controlled, and thus the front brightness of emission light and the usage efficiency of light can be improved. In the above-described configuration in which light having a high light-condensing property is emitted in the second direction, a difference in the amount of emission light between a first region 315B1 of the light emission main surface 315B of the light guide plate 315 and the second region 15B2 (see FIG. 9) tends to be more easily visually recognized as brightness unevenness. In this regard, since a first occupancy of first light guide plate lenses 320 in the first region 315B1 is lower than a second occupancy of the first light guide plate lenses 320 in the second region 15B2, the amount of emission light from the first region 315B1 to which a large amount of light is supplied is less likely to be excessive, and the emission of light from the second region 15B2 to which a small amount of light is supplied is promoted. Accordingly, a difference that may occur in the amount of emission light between the first region 315B1 and the second region 15B2 is reduced, and consequently brightness unevenness is less likely to be visually recognized.

Other Embodiments

The techniques disclosed in the present specification are not limited to the embodiments described above and illustrated in the drawings, and the following embodiments, for example, are also included within the technical scope.

(1) The first occupancy of the first light guide plate lens 20, 120, 220, 320 in the first region 15B1, 115B1, 215B1, 315B1 of the light emission main surface 15B, 115B, 215B, 315B may be higher than 0%.

(2) The second occupancy of the first light guide plate lens 20, 120, 220, 320 in the second region 15B2, 115B2, 215B2 of the light emission main surface 15B, 115B, 215B, 315B may be lower than 100%. In that case, the second occupancy in the second region 15B2, 115B2, 215B2 may be lower than the occupancy in the other region 15B3, 115B3, 215B3, may be equal to the occupancy in the other region 15B3, 115B3, 215B3, or may further be higher than the occupancy in the other region 15B3, 115B3, 215B3.

(3) In the configurations described in the first embodiment and the fourth embodiment, the numerical value of the contact angle θc1 of the fourth light guide plate lens 23 located in the third region 15A1 of the light incident end face 15A, 315A and the numerical value of the contact angle θc2 of the fourth light guide plate lens 23 located in the fourth region 15A2 can be changed as appropriate.

(4) In the configurations described in the second embodiment and the third embodiment, the numerical value of the contact angle θc1 of the fourth light guide plate lens 123, 223 located in the third region 115A1, 215A1 of the light incident end face 115A, 215A and the numerical value of the contact angle θc2 of the fourth light guide plate lens 123, 223 located in the fourth region 115A2, 215A2 can be changed as appropriate.

(5) In the configuration described in the third embodiment, the third occupancy of the third light guide plate lens 222 in the fifth region 215C1 of the opposite main surface 215C may be higher than 0%.

(6) In the configuration described in the third embodiment, the fourth occupancy of the third light guide plate lens 222 in the sixth region 215C2 of the opposite main surface 215C may be lower than 100%. In that case, the fourth occupancy in the sixth region 215C2 may be lower than the occupancy in the other region 215C3, may be equal to the occupancy in the other region 215C3, or may further be higher than the occupancy in the other region 215C3.

(7) In the configuration described in the third embodiment, all the fourth light guide plate lenses 223 may have the same contact angle regardless of the position on the light incident end face 215A along the X-axis direction.

(8) In the configuration described in the third embodiment, the end portion of the opposite main surface 215C on the side of the LED 213 along the X-axis direction may be entirely set as the fifth region 215C1, and the sixth region 215C2 may be omitted.

(9) The specific cross-sectional shape of the first light guide plate lens 20, 120, 220, 320 can be changed as appropriate. For example, the cross-sectional shape of the first light guide plate lens 20, 120, 220, 320 may be a triangular shape or the like.

(10) The specific cross-sectional shape of the second light guide plate lens 21 can be changed as appropriate. For example, the cross-sectional shape of the second light guide plate lens 21 may be a semi-circular shape (cylindrical lens) or the like.

(11) The specific cross-sectional shape of the third light guide plate lens 22, 222 can be changed as appropriate.

(12) The specific cross-sectional shape of the fourth light guide plate lens 23, 123, 223 can be changed as appropriate. For example, the cross-sectional shape of the fourth light guide plate lens 23, 123, 223 may be a triangular shape or the like.

(13) The first region 15B1, 115B1, 215B1, 315B1 may include a portion that does not overlap with the non-display region NAA of the liquid crystal panel 11.

(14) The numerical values of the length L1 of the second region 15B2, 115B2, 215B2 along the X-axis direction, the length L2 of the first region 15B1, 115B1, 215B1, 315B1 along the Y-axis direction, and the length L3 of the fifth region 215C1 along the Y-axis direction can be changed as appropriate.

(15) Each numerical value of the long-side dimension and the short-side dimension of the light guide plate 15, 115, 215, 315, the number of LEDs 13, 113, 213 installed, the distance between the light incident end face 15A, 115A, 215A, 315A and the LED 13, 113, 213, the arrangement interval of the LEDs 13, 113, 213, the arrangement interval of the first light guide plate lenses 20, 120, 220, 320, the contact angle of the first light guide plate lens 20, 120, 220, 320, and the arrangement interval of the fourth light guide plate lenses 23, 123, 223 can be changed as appropriate.

(16) In addition to a configuration in which the thickness of the light guide plate 15, 115, 215, 315 is constant throughout its entire length, there may be a configuration in which the thickness of the light guide plate 15, 115, 215, 315 decreases while getting farther from the LED 13, 113, 213, and the opposite main surface is inclined.

(17) The planar shape of the light guide plate 15, 115, 215, 315 may be a trapezoidal shape, inverted trapezoidal shape, arch shape, semi-circular shape, semi-elliptical shape, trapezoidal shape with an arc-shaped upper base, or the like in addition to a rectangular shape. Along with the change of the planar shape of the light guide plate 15, 115, 215, 315, the planar shapes of the backlight device 12, 312 and the liquid crystal display device 10 can also be changed.

(18) The frame 17 may have a frame-like shape surrounding the light guide plate 15, 115, 215, 315 over the entire periphery thereof.

(19) There may be a configuration in which the protruding portion 24 and the receiving portion 25 are not provided.

(20) The LED 13, 113, 213 may be a top light emitting type in addition to the side light emitting type. In addition to the LED 13, 113, 213, an Organic Light Emitting Diode (OLED) or the like may also be used as the light source.

(21) A reflective polarizing sheet instead of a polarizer may be attached to the main surface on the back side (outer side) of the array substrate constituting the liquid crystal panel 11. The reflective polarizing sheet includes a polarization layer having a specific polarization axis (transmission axis), a multilayer film in which layers having mutually different refractive indices are alternately layered, a protection layer, and the like. The polarization layer has a polarization axis and an absorption axis orthogonal to the polarization axis, so that linearly polarized light parallel to the polarization axis can be selectively transmitted and circularly polarized light can be converted to linearly polarized light along the polarization axis. The polarization axis of the polarization layer has an orthogonal relationship to the polarization axis of the polarizer attached to the main surface at the outer side of the CF substrate. The multilayer film has a multilayer structure, and has a reflection characteristic that the reflectivity for the s-waves included in light is generally higher than the reflectivity for the p-waves. The reflective polarizing sheet being provided with the multilayer film can reflect s-waves that are originally to be absorbed by the polarization layer toward the back side to allow the s-waves to be reused, thereby enhancing the usage efficiency (and then, brightness) of light.

(22) The disclosure is also applicable to the liquid crystal display device 10 used for applications other than vehicle application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An illumination device comprising:
a plurality of light sources arranged in a row;
a light guide plate having a plate shape and including a first end face at an outer peripheral end face of the light guide plate and a first main surface included in a pair of main surfaces of the light guide plate, the first end face facing the plurality of light sources and being configured to receive incident light, the first main surface being configured to emit light; and
a plurality of first lenses disposed at the first main surface, arranged along a first direction, and extending along a second direction, the first direction being an arrangement direction of the plurality of light sources, the second direction intersecting the first direction and extending along the first main surface,
wherein the plurality of first lenses are configured such that, when an end portion of the first main surface on a side of the plurality of light sources along the first direction is divided into one first region located on a center side along the first direction and two second regions located on two end sides along the first direction, respectively, the plurality of first lenses uniformly occupies the one first region and the two second regions, and a first occupancy of the plurality of first lenses in the one first region is lower than a second occupancy of the plurality of first lenses in the two second regions.

2. The illumination device according to claim 1, further comprising:
a plurality of second lenses disposed at the first end face, arranged along the first direction, and extending along a third direction, the third direction intersecting the first direction and extending along the first end face.

3. The illumination device according to claim 2,
wherein when the first end face is divided into a third region located on the center side along the first direction and corresponding to the first region and two fourth regions located on the two end sides along the first direction, respectively, and corresponding to the two second regions, more than one of the plurality of second lenses are disposed in each of the third region and the two fourth regions.

4. The illumination device according to claim 3,
wherein each of the plurality of second lenses is a cylindrical lens including a peripheral surface having an arc shape, and
when an angle, formed by a tangent line at a base end portion of the peripheral surface of the cylindrical lens with respect to the first direction, is defined as a contact angle of the cylindrical lens, the contact angle of the cylindrical lens disposed in the two fourth regions is larger than the contact angle of the cylindrical lens disposed in the third region.

5. The illumination device according to claim 1,
wherein the plurality of first lenses is disposed in regions other than the one first region and the first occupancy is 0%.

6. The illumination device according to claim 1, further comprising:
a protruding portion disposed at an end portion of the first end face of the light guide plate along a third direction and protruding from the first end face along the second direction; and
a receiving portion spaced apart from the first end face of the light guide plate in the second direction and configured to receive the protruding portion.

7. The illumination device according to claim 1,
wherein the light guide plate further includes a second main surface on a side opposite the first main surface, and a plurality of third lenses is disposed at the second main surface, extends along the first direction, and arranges along the second direction, and
the plurality of third lenses is configured such that, when an end portion of the second main surface on the side of the plurality of light sources along the first direction is divided into a fifth region located on the center side along the first direction and two sixth regions located on the two end sides along the first direction, respectively, a third occupancy of the plurality of third lenses in the fifth region is lower than a fourth occupancy of the plurality of third lenses in the two sixth regions.

8. The illumination device according to claim 1, further comprising:
a first prism sheet disposed facing the first main surface with respect to the light guide plate; and
a second prism sheet disposed on a side opposite the light guide plate with respect to the first prism sheet,
wherein the first prism sheet includes a third main surface facing the side opposite the light guide plate, and the third main surface is provided with a plurality of first prisms extending along the first direction and arranged along the second direction, and
the second prism sheet includes a fourth main surface facing a side opposite the first prism sheet, and the fourth main surface is provided with a plurality of second prisms extending along the first direction and arranged along the second direction.

9. The illumination device according to claim 1, further comprising:
a third prism sheet disposed facing the first main surface with respect to the light guide plate,
wherein the third prism sheet includes a fifth main surface facing the first main surface, and the fifth main surface is provided with a plurality of third prisms extending along the first direction and arranged along the second direction.

10. A display device comprising:
the illumination device according to claim 1; and
a display panel disposed overlapping with the first main surface and configured to perform display by using light from the illumination device.

11. The display device according to claim 10,
wherein the display panel includes a display region in which an image is displayed and a non-display region surrounding the display region, and
in the plurality of first lenses, the one first region entirely overlaps the non-display region, and a length of the one first region along the second direction is 2 mm or more.

* * * * *